(12) United States Patent
Yoshikawa et al.

(10) Patent No.: US 6,476,578 B2
(45) Date of Patent: Nov. 5, 2002

(54) STEPPING MOTOR DRIVING APPARATUS AND IMAGE FORMING APPARATUS HAVING SUCH DRIVING APPARATUS

(75) Inventors: Tomoyasu Yoshikawa, Toride (JP); Masahiro Kurahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/725,110

(22) Filed: Nov. 29, 2000

(65) Prior Publication Data

US 2001/0035730 A1 Nov. 1, 2001

(30) Foreign Application Priority Data

Dec. 1, 1999 (JP) .......................... 11-341560
Dec. 2, 1999 (JP) .......................... 11-342852
Dec. 2, 1999 (JP) .......................... 11-342853
Dec. 2, 1999 (JP) .......................... 11-342979

(51) Int. Cl.$^7$ ............................................. H02P 8/32
(52) U.S. Cl. ........................................ 318/685; 318/696
(58) Field of Search ................... 318/696, 685; 388/847, 910, 917, 920

(56) References Cited

U.S. PATENT DOCUMENTS 3,732,480 A * 5/1973 Hendrickson et al. ...... 318/696
5,059,833 A * 10/1991 Takahashi ................... 318/696
6,285,155 B1 * 9/2001 Maske et al. ............... 318/685

* cited by examiner

*Primary Examiner*—Khanh Dang
(74) *Attorney, Agent, or Firm*—Fitzpatrick, Cella, Harper & Scinto

(57) ABSTRACT

In an image forming apparatus, change in electrical current value flowing through an exciting coil of a motor is measured for a predetermined time period, and, if a measurement result of the change in electrical current value obtained by the measuring means by the measurement for the predetermined time period exceeds a predetermined value, it is judged that loss of synchronism is generated. There are provided loss of synchronism detecting means, sheet detecting means disposed in a sheet conveying path of a sheet conveying system driven by the motor, and jam detecting means for judging that jam is generated if a sheet detecting condition of the sheet detecting means is continued for a certain time period or if the sheet is not detected by the sheet detecting means while the motor is being driven. It is judged that the jam is caused on the basis of the loss of synchronism of the motor if the jam is detected by the jam detecting means when the loss of synchronism is judged by the loss of synchronis detecting means.

24 Claims, 29 Drawing Sheets

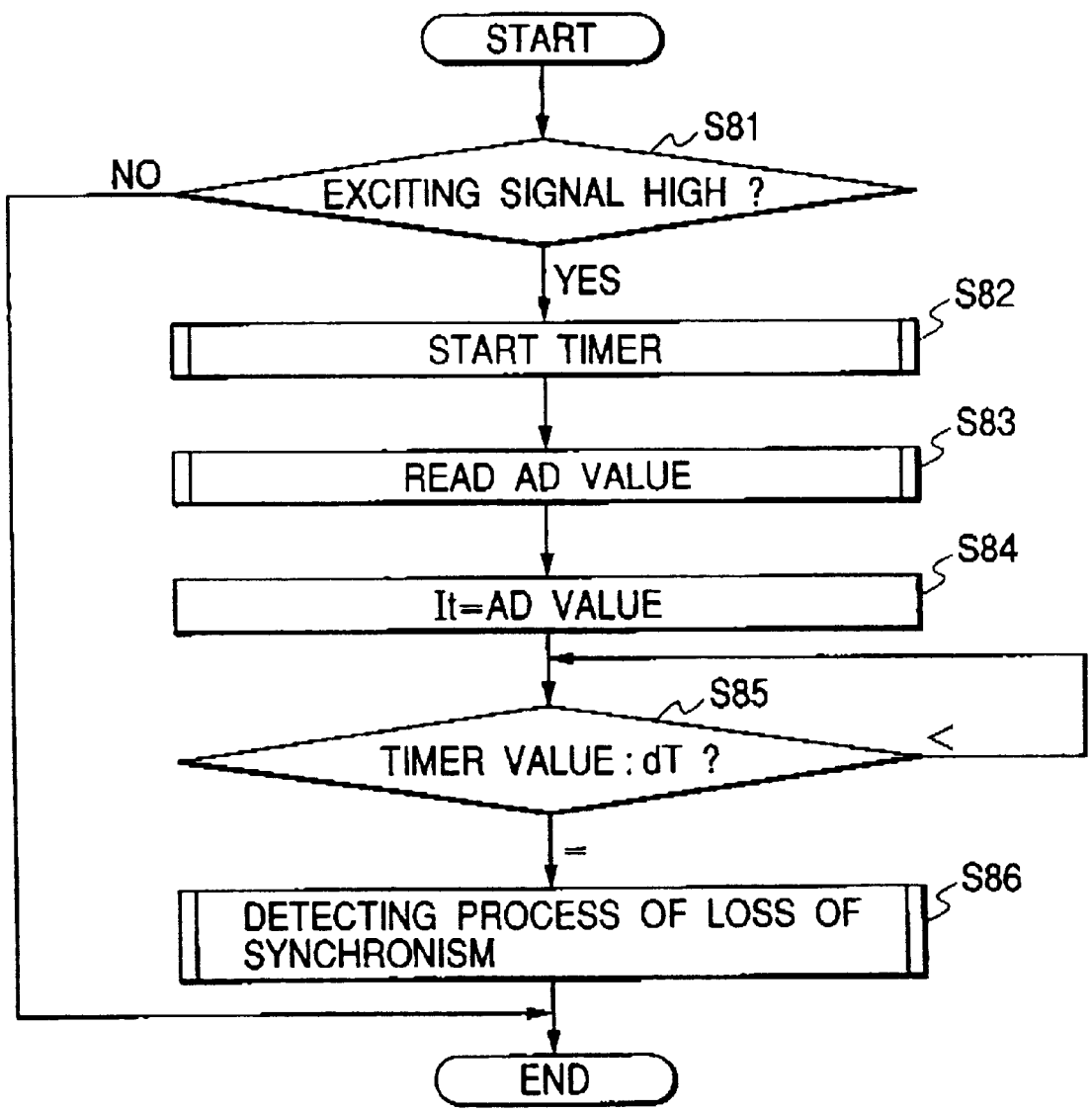

STEPPING MOTOR DRIVING APPARATUS AND IMAGE FORMING APPARATUS HAVING SUCH DRIVING APPARATUS

BACKGROUND OF THE INVENTION

1. Field of the Invention

The present invention relates to a stepping motor driving apparatus capable of detecting out-of-phase (loss of synchronism) and an image forming apparatus having such a driving apparatus.

2. Related Background Art

In mechatronics systems having electric driving sources, a motor driving apparatus for driving a stepping motor being rotated while switching its exciting phases successively under open loop control is sometimes used. Recently, due to cost effectiveness, such a technique has widely been used.

In the open loop motor control, since it is not required to effect feedback of information such as rotational angle and rotational speed of the motor obtained from a sensor such as an encoder or a tachometer generator, such a sensor can be omitted.

However, when the sensor such as the encoder is omitted, for any reason, it is difficult to detect a phenomenon (a phenomenon of loss of synchronism; referred to merely as "loss of synchronism" hereinafter) that the rotation of the stepping motor does not synchronous with a phase exciting signal.

Accordingly, in the system having the stepping motor subjected to the open loop control, detection of the loss of synchronism of the stepping motor is performed by providing a sensor and by detecting the fact that a driven object is not moved nevertheless the motor is being rotated by the sensor.

However, in the system using the stepping motor, since the sensor for detecting the fact that the driven object is not moved to recognize occurrence of the loss of synchronism is required, cost is increased. Further, since the detection of the loss of synchronism effected by the sensor is an indirect detecting method in which motion of the driven object driven by the stepping motor is detected to judge presence/absence of the loss of synchronism, it takes a relatively long term until the loss of synchronism is judged.

Accordingly, the detection of the loss of synchronism of the stepping motor in a sensor-less and high speed fashion give the great merit to the system. On the other hand, a micro-computer has widely been used in a motor control field due to low cost, electric power savings and multi-function.

In conventional image forming apparatuses such as copying machines, a sheet conveying apparatus in which a DC motor is used as a drive source in a sheet conveying system through which a recording paper (sheet) is actually passed and a plurality of conveying rollers in the sheet conveying path are driven via a transmitting mechanism such as gears and/or an electromagnetic clutch was widely used. In such a sheet conveying apparatus, sheet conveying control was effected by controlling the sheet conveying rollers by energizing or disenergizing the electromagnetic clutch.

Recently, needs for high speed processing in the image forming apparatus has been increased, and, accordingly, high speed sheet conveyance in the sheet conveying system has been requested more and more. However, the disadvantage of the conventional sheet conveying method in which the driving of the conveying rollers is ON/OFF by using the electromagnetic clutch is slow response of the electromagnetic clutch, which results in bottle neck for high speed sheet conveyance. On the other hand, as a drive source in a compact servo system capable of effecting open loop control, a stepping motor has widely been used.

The stepping motor is a motor in which a magnetic field is rotated by successively switching phase exciting electrical currents of windings and torque is generated by attracting and repelling magnetic poles of a rotor with respect to the rotating magnetic field thereby to rotate the rotor while being squeezed by the magnetic field. Accordingly, when the switching of the exciting phases is effected by inputting pulse signals, the stepping motor is rotated by a predetermined fundamental angle for each pulse.

Thus, in the stepping motor, the open loop control can be performed, and the system can greatly be simplified and cost can be reduced, in comparison with other servo actuators requiring a feedback system.

Therefore, also among the image forming apparatuses such as copying machines, there is an image forming apparatus in which the same number of stepping motors as the number of conveying rollers are used as drive sources in the sheet conveying system thereby to drive the conveying rollers without an electromagnetic clutch.

However, in the stepping motor, unlike to the conventional servo motor, although the motor can be manufactured in a compact and cheap manner, a phenomenon that the rotation of the rotor of the motor does not synchronous with the pulse signals may occur. This phenomenon is referred to as a phenomenon of loss of synchronism. In general, the phenomenon of loss of synchronism is generated in a overload condition regarding pulse rate supplied to the motor.

When the stepping motor is used in the sheet conveying system of the image forming apparatus, if the phenomenon of loss of synchronism is generated during the sheet conveyance, the sheet conveyance is stopped, which causes new sheet jam. Further, also in the sheet jam caused by the loss of synchronism of the stepping motor, since only the jam detection by the sensing of the sheet sensor can be effected, it is difficult to judge whether the sheet jam is caused by the loss of synchronism of the stepping motor or by other factors.

By attaching a sensor such as an encoder for detecting the rotation of the motor to the stepping motor to monitor the rotation of the motor, the loss of synchronism can be detected. In this case, however, the system becomes complicated not to utilize the merit of the stepping motor effectively. Accordingly, high speed detection of the loss of synchronism of the stepping motor without using the sensor gives great merit to the image forming apparatus.

Further, when the stepping motor is used in the sheet conveying system of the image forming apparatus, if the phenomenon of loss of synchronism is generated during the sheet conveyance, the sheet conveyance is stopped, which causes new sheet jam. On the other hand, in the sheet conveying system, the stepping motor is driven before the sheet reaches the associated sheet conveying roller. In the conventional sheet conveying system of the image forming apparatus, if the phenomenon of loss of synchronism is generated before the sheet reaches the conveying roller, after the sheet reaches the conveying roller driven by the stepping motor generating the phenomenon of loss of synchronism, the sheet is not conveyed, and, in this case, the sheet jam is detected.

Thus, even if the loss of synchronism of the stepping motor is generated and the associated conveying roller is stopped, so long as the sheet exists at that conveying roller, the stepping motor can be driven again and the arrival of the sheet can be waiting, which leads to enhancement of processing efficiency of the image forming apparatus.

SUMMARY OF THE INVENTION

The present invention is made in consideration of the above-mentioned circumstances, and an object of the present invention is to provide a stepping motor driving apparatus in which a phenomenon of loss of synchronism of the stepping motor can correctly be detected with a simple construction.

Another object of the present invention is to provide an image forming apparatus using a stepping motor to convey a sheet, in which a phenomenon of loss of synchronism of the stepping motor can positively be detected with a simple construction.

A further object of the present invention is to provide an image forming apparatus using a stepping motor to convey a sheet, in which interruption of sheet conveyance caused by a phenomenon of loss of synchronism of the stepping motor can be ceased to start sheet conveyance again efficiently.

A still further object of the present invention is to provide a stepping motor driving controlling apparatus which can detect a phenomenon of loss of synchronism quickly without using a detecting sensor for detecting the fact that a driven object is not moved.

A further object of the present invention is to provide an image forming apparatus in which, when a stepping motor is used in a conveying system of the image forming apparatus, a phenomenon of loss of synchronism of the stepping motor can be judged without using a sensor such as an encoder, and, if sheet jam is generated, it can be judged whether the sheet jam is caused by the phenomenon of loss of synchronism of the stepping motor or not.

A still further object of the present invention is to provide an image forming apparatus in which a phenomenon of loss of synchronism of a stepping motor can be detected, and, when the phenomenon of loss of synchronism is detected, if there is no sheet jam at a conveying roller driven by the stepping motor generating the phenomenon of loss of synchronism, processing efficiency can be enhanced by driving the stepping motor again after the stepping motor is once stopped.

That is to say, the present invention provides a stepping motor driving controlling apparatus for effecting driving by switching phase exciting of exciting electrical current supplied to an exciting coil of a stepping motor whenever a drive signal is applied to a motor drive circuit, which controlling apparatus comprises measuring means for measuring change in electrical current value flowing through the exciting coil of the motor for a predetermined time period, and control means for generating a signal of loss of synchronism when a measurement result of the change in electrical current value obtained by measurement of the measuring means during the predetermined time period exceeds a predetermined value.

A further object of the present invention is to provide a stepping motor driving controlling apparatus in which the change in electrical current value measured by the measuring means is an increasing ratio of electrical current flowing through the exciting coil.

A still further object of the present invention is to provide a stepping motor driving controlling apparatus in which supplying of the electrical current to the exciting coil of the motor is effected under constant electric current chopper control, and the change in electrical current value measured by the measuring means is chopping number of the electrical current within one phase exciting area of the motor.

A further object of the present invention is to provide an image forming apparatus using a stepping motor for effecting driving by switching phase exciting of exciting electrical current supplied to the exciting coil of the motor whenever a driving signal is applied as a drive source in a sheet conveying system, in which there are provided measuring means for measuring change in electrical current value flowing through the exciting coil of the motor for a predetermined time period set by a timer, loss of synchronism detecting means for judging that the loss of synchronism occurs when a measurement result of the change in electrical current value obtained by measurement of the measuring means during the predetermined time period exceeds a predetermined value, sheet detecting means disposed in a sheet conveying path of the sheet conveying system driven by the motor, jam detecting means for judging occurrence of jam if the sheet is detected by the sheet detecting means for a predetermined time period or if the sheet is not detected by the sheet detecting means, and control means for judging the occurrence of jam caused by the loss of synchronism of the motor if the jam is detected by the jam detecting means when the occurrence of the loss of synchronism is judged by the loss of synchronism detecting means.

A still further object of the present invention is to provide an Image forming apparatus having a loss of synchronism of a stepping motor detecting apparatus, in which the change in electrical current value measured by the measuring means is an increasing ratio of electrical current flowing through the exciting coil A further object of the present invention is to provide an image forming apparatus having a loss of synchronism of a stepping motor detecting apparatus, in which supplying of the electrical current to the exciting coil of the motor is effected under constant electrical current chopper control, and the change in electrical current value measured by the measuring means is chopping number of the electrical current within one phase exciting area of the motor.

A still further object of the present invention is to provide an image forming apparatus using a stepping motor for effecting driving by switching phase exciting of exciting electrical current supplied to the exciting coil of the motor whenever a driving signal is applied as a drive source in a sheet conveying system, in which there are provided measuring means for measuring change in electrical current value flowing through the exciting coil of the motor for a predetermined time period, loss of synchronism detecting means for judging that the loss of synchronism occurs when a measurement result of the change in electrical current value obtained by measurement of the measuring means during the predetermined time period exceeds a predetermined value, sheet detecting means disposed in a sheet conveying path of the sheet conveying system driven by the motor, and control means for driving the motor again after the supplying of the electrical current to the motor is stopped, if the sheet is not detected by the sheet detecting means when the occurrence of the loss of synchronism is judged by the loss of synchronism detecting means.

The other objects and features of the present invention will be apparent from the following explanation of preferred embodiments referring to the accompanying drawings

BRIEF DESCRIPTION OF THE DRAWINGS

FIG. 14 is a flow chart showing a sequence for calling out a detecting process of loss of synchronism in a fourth embodiment of the present invention;

DESCRIPTION OF THE PREFERRED EMBODIMENTS

The present invention will now be explained concretely in connection with embodiments thereof with reference to the accompanying drawings.

First Embodiment

Figure 1:
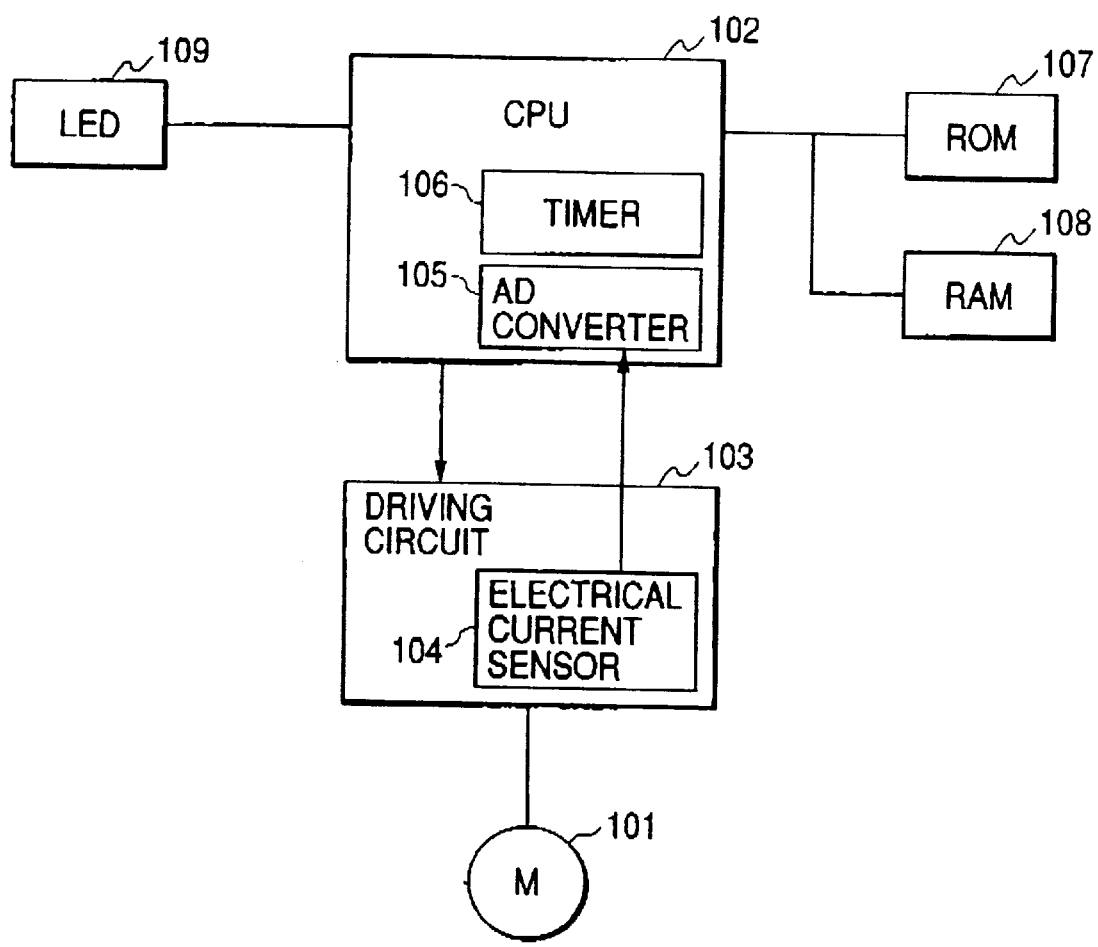
FIG. 1 is a circuit diagram of a stepping motor driving controlling apparatus according to embodiments of the present invention.

FIG. 1 is a circuit diagram of a stepping motor driving controlling apparatus according to an embodiment of the present invention. The apparatus includes a stepping motor 101 to be controlled, a central processing unit (referred to as "CPU" hereinafter) 102, a driving circuit 103 for supplying electrical current required for rotating the stepping motor, an electrical current sensor 104 for measuring an electrical current value, an A/D converter 105 for converting the electrical current value measured by the electrical current sensor into a digital signal, a timer 106 for measuring a sufficient short time, a ROM device 107 in which motor control program was stored, a RAM device 108 which is temporarily used by the CPU as a storing area, and an LED 109.

First of all, the stepping motor of the motor driving apparatus to be controlled will be explained. The greatest feature of the stepping motor is that a rotational angle is changed in proportion to input pulse and a rotational speed is changed in proportion to frequency of input pulse. Thus, the CPU 102 serves to call out the motor control program stored in the ROM device 107 without feedback of the rotational angle and the rotational speed and to output a phase exciting signal as a driving signal for the stepping motor 101 to the driving circuit 103, i.e., output a phase exciting signal having frequency corresponding to the target number of revolutions of the motor.

Further, the CPU 102 includes the timer 106 which can be called out and used by the program. The timer is used when the time is measured or when specific interruption processing is generated for energy period. A detecting process of loss of synchronism of the stepping motor 101 is performed by calculation in the CPU 102.

On the other hand, in place of a conventional CPU called as a microcomputer, a CPU of RISC type realizing high speed operation and low power consumption due to reduction of instruction number and uniformity of instruction lengths and a DSP specially designed for real time digital signal processing have been popularized, and, these calculating devices can be incorporated into the motor driving apparatus of the present invention.

In the driving circuit 103, constant electrical current chopping control is constituted by hardware so that the electrical current supplied to the stepping motor 101 Is turned ON/OFF in response to the phase exciting signal from the CPU 102 thereby to perform chopping control so as to make the electrical current flowing to the motor constant. In this way, the electrical current is supplied to the stepping motor.

The electrical current sensor 104 for measuring an actual electrical current value supplied to the stepping motor 101 is incorporated into the driving circuit 103, and the electrical current sensor 104 outputs voltage proportional to the measured electrical current. The A/D converter 105 serves to convert the analogue signal outputted from the electrical current sensor 104 into a digital signal and send, to the CPU 102, electrical current value information being supplied to the motor. The CPU 102 observes the actual electrical current of the stepping motor through the A/D converter 105 on the basis of the information from the electrical current sensor 104.

Further, in recent years, a CPU in which an A/D converter is integrated in the same package as a CPU has widely been proposed, and, also in the illustrated embodiment, the CPU incorporating the A/D converter is used. Of course, an arrangement in which an A/D converter is attached to the CPU externally may be used.

The ROM device 107 is a non-volatile memory device. The motor control program is stored in the ROM device 107, and program is loaded to the CPU 102 on demand. The RAM device 108 is a read/write memory device for storing a calculation result of the CPU 102 and for temporarily retarding the calculation result.

Further, in recent years, a CPU in which the ROM 107, RAM 108 and CPU 102 are integrated in the same package has also been proposed, and, when such a CPU is used, the ROM device and the RAM device can be omitted.

The LED 109 is driven by the CPU 102 when the loss of synchronism is generated, thereby informing the user of the fact that the loss of synchronism of the stepping motor 101 is generated.

Next, difference in feature of the actual electrical current value between when the stepping motor 101 is rotated correctly and when the loss of synchronism is generated will be described, and means for detecting the loss of synchronism on the basis of features will be explained.

Figure 2A:
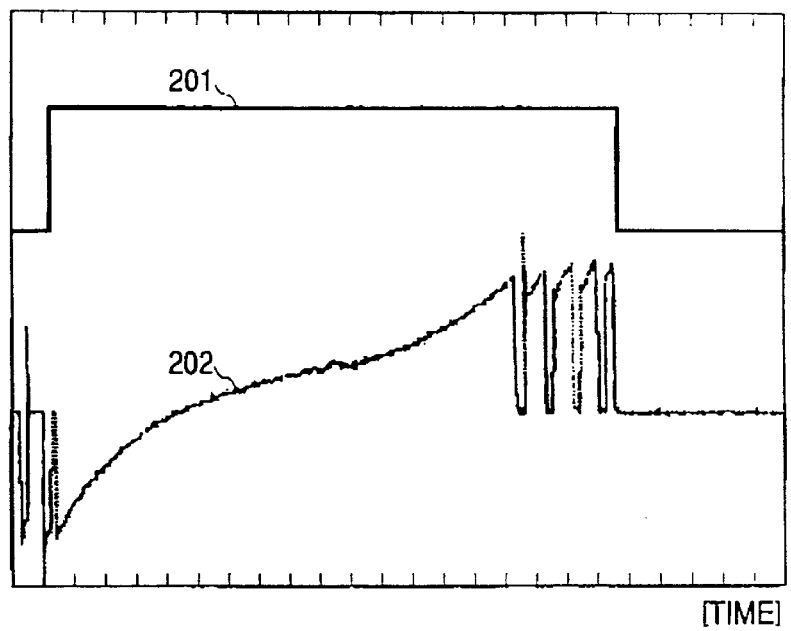
FIGS. 2A and 2B are views for explaining electrical current supplied to a stepping motor when the stepping motor is operated correctly and when loss of synchronism of the stepping motor occurs.
Figure 2B:
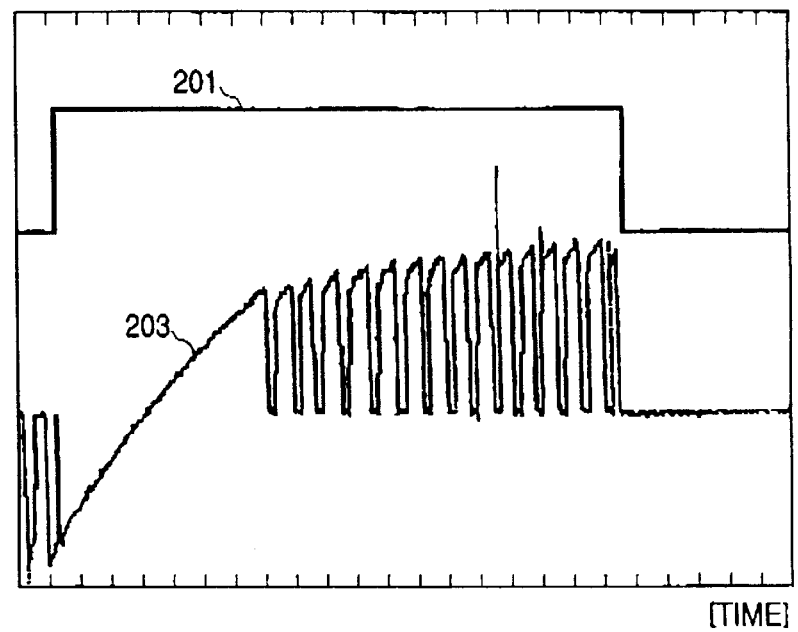

FIG. 2A is a graph showing the phase exciting signal and electrical current response when the stepping motor is rotated correctly. FIG. 2B is a graph showing the phase exciting signal and electrical current response when the loss of synchronism is generated. In the graphs, the reference numeral 201 denotes the phase exciting signal applied to the driving circuit 103; 202 denotes the electrical current response when the stepping motor 101 is rotated correctly; and 203 denotes the electrical current response when the loss of synchronism is generated.

By observing the graph 202 given when the stepping iuotor 101 is rotated correctly, it can be seen that the electrical current supplied to the stepping motor 101 is increased relatively gently. On the other hand, by observing the graph 203 given when the loss of synchronism is generated, it can be seen that the electrical current supplied to the stepping motor 101 is increased relatively abruptly.

From the above fact, it can be seen that, regarding the electrical current supplied to the stepping motor, inclination of the electrical current response tends to become greater when the stepping motor is rotated correctly than when the loss of synchronism is generated. That is to say, the detection of the loss of synchronism of the stepping motor 101 can be effected by always monitoring the inclination of the electrical current response during the operation of the stepping motor and by assuming the occurrence of the loss of synchronism if the inclination becomes greater than a certain threshold value and by sending a loss of synchronism signal.

However, it is considered that the inclination of the electrical current response is varied with other factors (than the loss of synchronism) such as dispersion in property of the stepping motor, increase in temperature of a body of the stepping motor or an atmosphere surrounding the stepping motor, or fluctuation in load of the stepping motor, and thus, it is considered that the inclination of the electrical current response greater than the threshold value can be observed intermittently.

If the inclination of the electrical current response is greater than the threshold value for a sufficient time period, i.e., if the number of the electrical current responses (greater than the threshold value) greater than the predetermined reference number are measured continuously, it is judged that the loss of synchronism of the stepping motor is generated.

Figure 3:
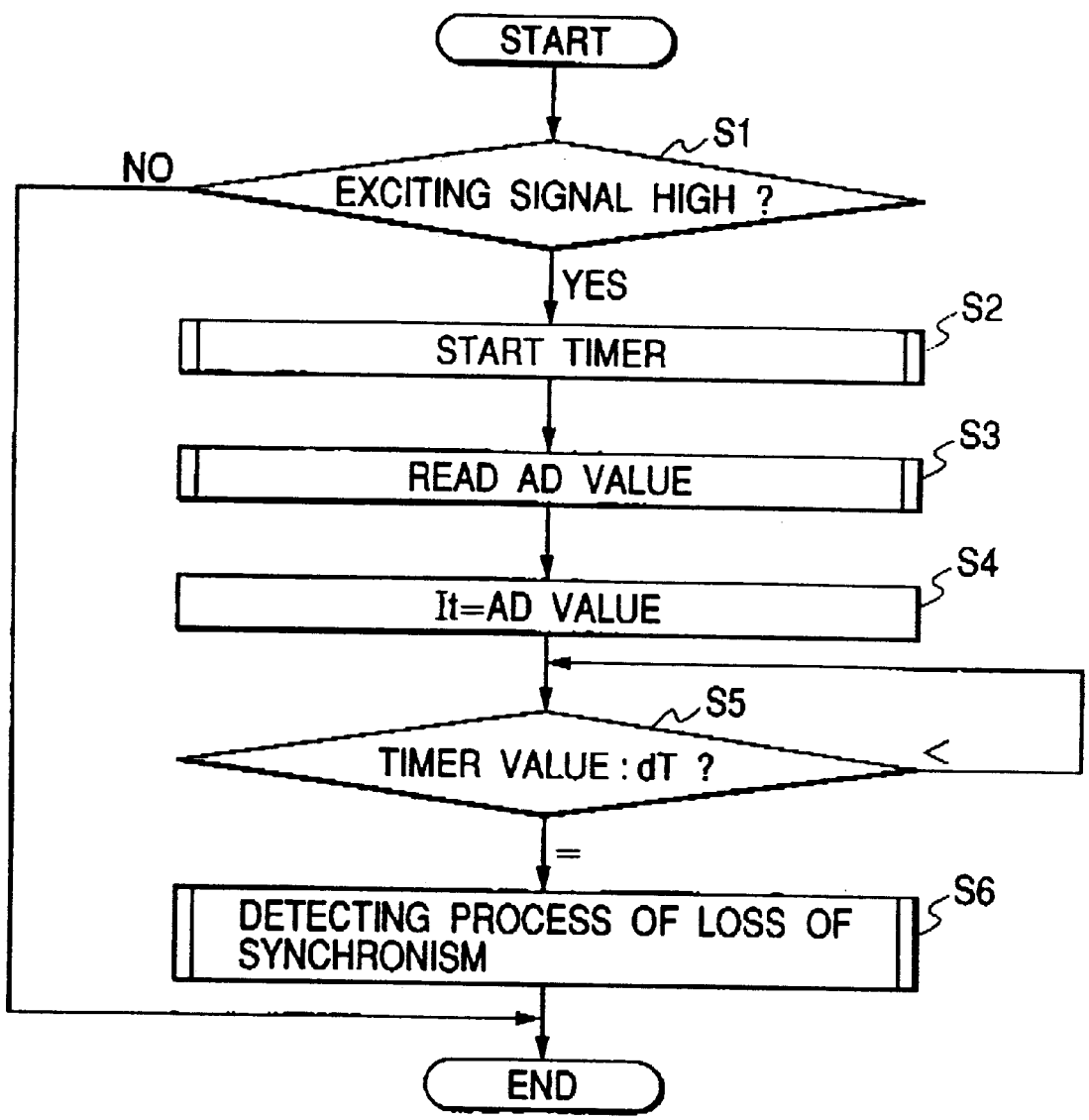
FIG. 3 is a flow chart showing a sequence for calling out a detecting process of loss of synchronism in a first embodiment of the present invention.
Figure 4:
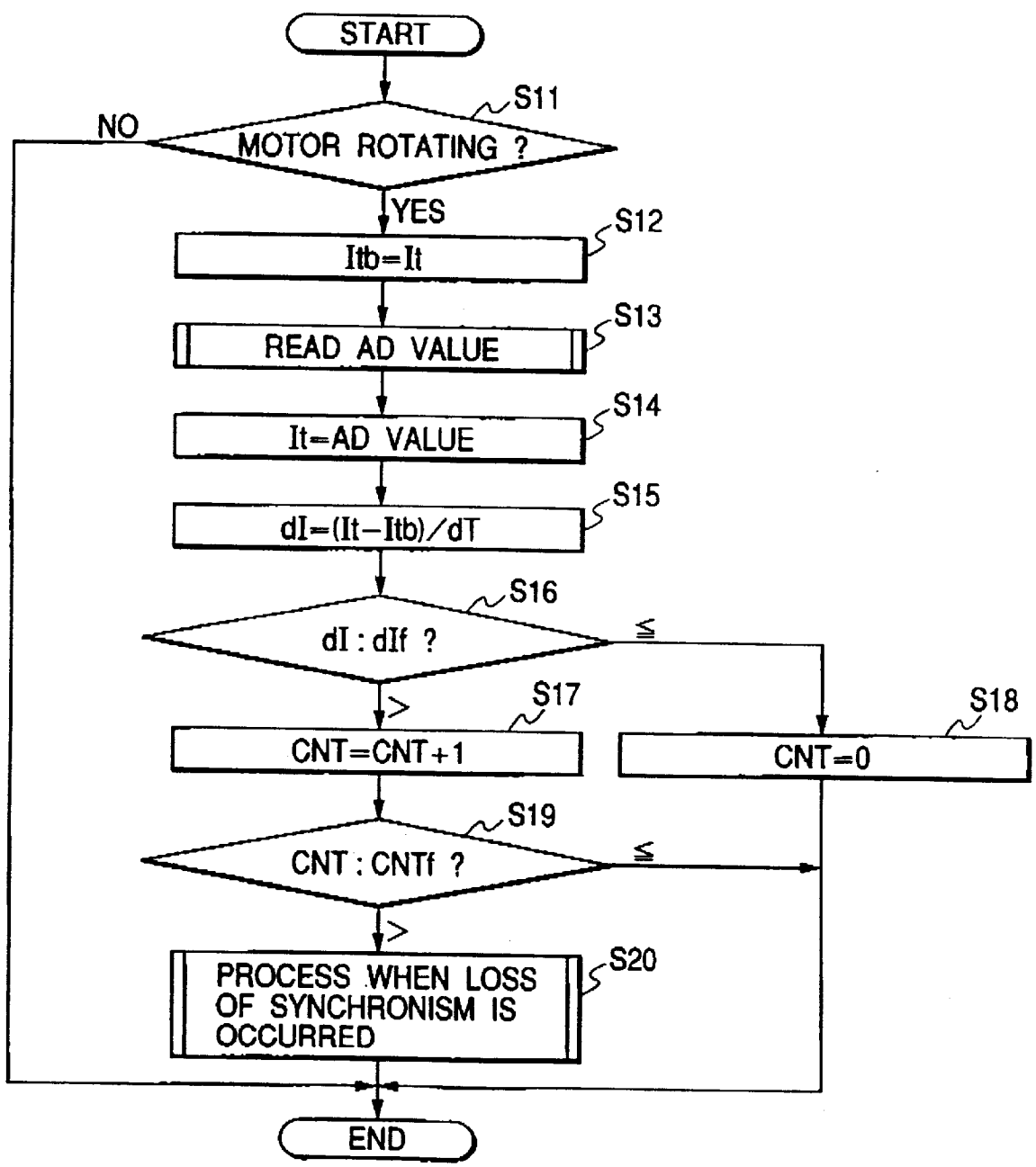
FIG. 4 is a flow chart showing a sequence of the detecting process of loss of synchronism in the first embodiment.

Next, the actual processing flow of the loss of synchronism detecting means carried out by the CPU 102 will be explained with reference to a flow chart. FIG. 3 is a flow chart for judging the calling out the detecting process of loss of synchronism in the first embodiment, and FIG. 4 is a flow chart showing the process for judging the detection of loss of synchronism in the first embodiment.

Here, "dT" is detecting process interval of loss of synchronism, "It" is an electrical current value being presently supplied to the stepping motor 101, "Itb" is an electrical current value at the time before from the present time, "dI" is an electrical current increasing ratio measured, "dIf" is a threshold value of the electrical current increasing ratio for judging the detection of loss of synchronism, "CNT" is a counter for counting the number in which the measured electrical current increasing amount exceeds the threshold value continuously, "CNTf" is a threshold value of the CNT value for judging detection of loss of synchronism, and "ErrFlag" is a flag indicating the fact that the loss of synchronism of the stepping motor is detected.

The judgement for calling out the detecting process of loss of synchronism is called out at a "HIGH" level timing in the period of the phase exciting signal and the process is started. After the starting, this process goes to a step S1 (step is represented by "S" in the flow charts).

In the step S1, it is judged whether the phase exciting signal is "HIGH" level or not. If the phase exciting signal is "HIGH" level, the sequence goes to a step S2; whereas, if the phase exciting signal is "LOW" level, the sequence is ended.

In the step S2, the timer 106 is started to measure the timing for effecting the detecting process of loss of synchronism. After the timer is started, the sequence goes to a step S3.

In the step S3, a value measured by the electrical current sensor 104 of the driving circuit 103 for measuring the electrical current value being presently supplied to the stepping motor 101 is A/D-converted, and the converted value is read-in in the CPU 102. After the reading-in, the sequence goes to a step S4.

In the step S4, the A/D value read-in in the CPU 102 in the step S3 is stored in the variable If, and then, sequence goes to a step S5.

In the step S5, the timer value of the timer 106 started in the step S2 is compared with the detecting process interval dT of loss of synchronism, and the waiting process Is performed until the timer value coincides with dT. When the timer value coincides with dT, the sequence goes to a step S6.

In the step S6, the detecting process of loss of synchronism is called out (refer to FIG. 4).

Next, the detecting process of loss of synchronism will be explained with reference to FIG. 4. The process is called out in the step S6 of FIG. 3, and the detecting process of loss of synchronism is started. After the process is started, the sequence goes to a step S11 in FIG. 4.

In the step S11, it is judged whether the stepping motor 101 is being rotated, i.e., the phase exciting signal is generated by the CPU 102.

If the phase exciting signal is not outputted, the detecting process of loss of synchronism is ended; whereas if the phase exciting signal is outputted, the sequence goes to a step S12.

If the stepping motor 101 is being rotated, in the step S12, the value of the electrical current value It supplied to the stepping motor 101 and read-in in the previous processing is retarded to Itb, and the sequence goes to a step S13.

In the step S13, a value measured by the electrical current sensor 104 of the driving circuit 103 for measuring the electrical current value being presently supplied to the stepping motor 101 is A/D-converted, and the converted value is read-in in the CPU 102. After the reading-in of the A/D value, the sequence goes to a step S14.

In the step S14, the A/D value read-in in the CPU 102 in the step S13 is stored in the variable If, and the then, sequence goes to a step S15.

In the step S15, a difference between the electrical current value If read-in the step S13 and the value of Itb storing the electrical current value measured and read-in before the time dT is determined, and further, a value obtained by dividing the difference by dt which is electrical current measurement period is stored in the variable dI. The calculated dI is an electrical current increasing ratio (per unit time) of the stepping motor 101. Then, the sequence goes to a step 516.

In the step S16, the electrical current increasing ratio dI to be supplied to the stepping motor 101 and calculated in the step S15 is compared with the threshold value dIf of the electrical current increasing ratio. If the value dI is above the threshold value dIf, the sequence goes to a step S17. On the other hand, if the value dI is smaller than the threshold value dIf, it is judged that there is no loss of synchronism of the stepping motor 101, and the sequence goes to a step S18.

In the step S17, since the present electrical current increasing ratio exceeds the threshold value, the increment of the value of the counter CNT is effected, and the sequence goes to a step S19.

In the step S18, since the present electrical current increasing ratio is smaller than the threshold value, the value of the counter CNT is initialized to zero, and the detecting process of loss of synchronism is ended.

In the step S19, if the value of the counter CNT recording the number in which the electrical current increasing ratio exceeds the threshold value continuously is greater than CNTf, it is judged that the loss of synchronism is generated, and the sequence goes to a step S20. On the other hand, if CNT is smaller than CNTf, it is Judged that there is no loss of synchronism, and the detecting process of loss of synchronism is ended.

In the step S20, since it is judged that the loss of synchronism is generated, previously programmed process when loss of synchronism is occurred is performed. Thereafter, the detecting process of loss of synchronism is ended.

Figure 5:
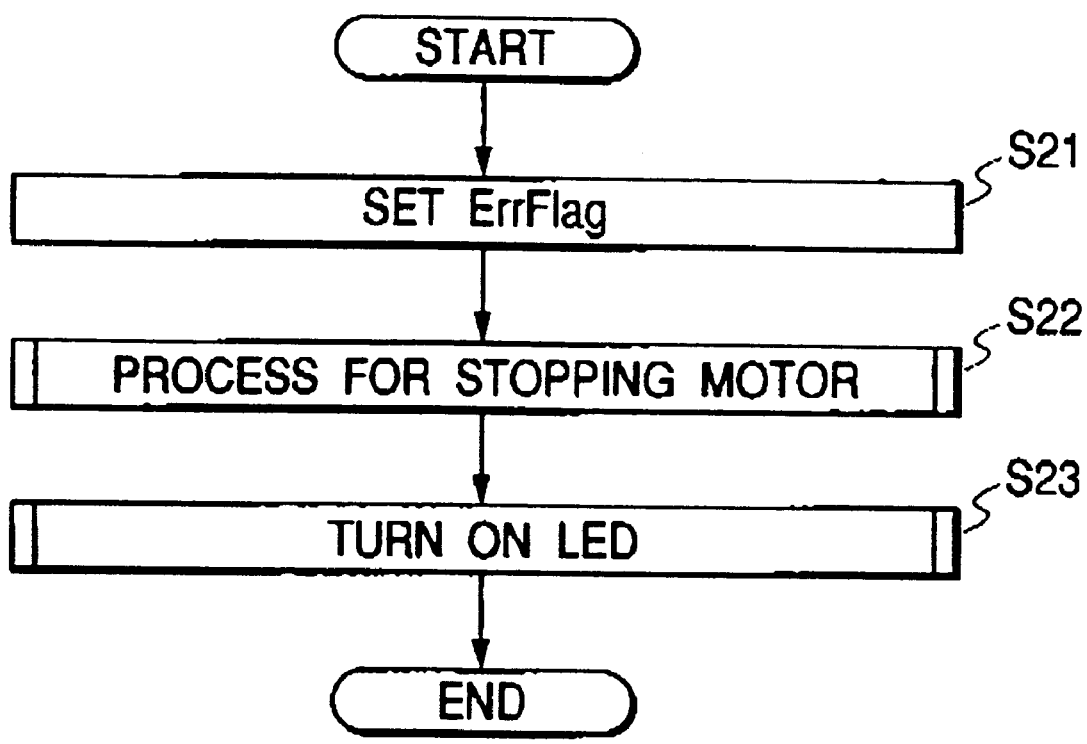
FIG. 5 is a flow chart showing a sequence of a detecting process of loss of synchronism in various embodiments of the present invention.

FIG. 5 is a flow chart showing the process when loss of synchronism is occurred which is executed in the step S20 of FIG. 4.

The process when loss of synchronism is occurred is performed if it is judged that the loss of synchronism of the stepping motor 101 is generated by the detecting process of loss of synchronism. After the process is started, the sequence goes to a step S21 in FIG. 5.

In the step S21, "ErrFlag" is set, and the fact that the loss of synchronism of the stepping motor 101 is generated is informed to other programs executed by the CPU 102. Then, the sequence goes to a step S22.

In the step S22, a process in which the phase exciting signal outputted from the CPU 102 to the driving circuit 103 is cut or a process in which command for cutting the supplying of the electrical current from the driving circuit 103 to the stepping motor 101 is send is performed. By performing such a process, the supplying of the electrical current supplied to the driving circuit can be cut within a sufficiently short time at a time when the loss of synchronism of the stepping motor 101 is generated.

In a step S23, the LED 109 indicating the fact that the loss of synchronism is generated is turned ON. By turning ON the LED 109, it is possible to inform the user of the fact that the loss of synchronism of the stepping motor 101 is generated.

As mentioned above, in the stepping motor driving controlling apparatus according to the first embodiment, it can be seen that the electrical current value of the stepping motor 101 is measured for every predetermined period, and the electrical current increasing amount to be supplied to the stepping motor 101 is calculated on the basis of the measured value, and the increasing ratio per unit time is compared with the threshold value, and, when the number in which the ratio exceeds the threshold value reaches the predetermined number, it can be judged that the loss of synchronism of the stepping motor 101 is generated.

Further, in the illustrated embodiment, the motor stopping process is performed after the loss of synchronism of the stepping motor is detected, thereby preventing damage of a loading device and the like.

Further, the fact that the loss of synchronism of the motor is generated can be informed to the user by turning ON the LED.

Second Embodiment

Next, a stepping motor driving controlling apparatus according to a second embodiment of the present invention will be explained. In the stepping motor driving controlling apparatus according to the second embodiment, since the circuit construction (FIG. 1) and the process when loss of synchronism is occurred (FIG. 5) are the same as those explained in connection with the first embodiment, explanation thereof will be omitted. In the first embodiment, while an example that the electrical current increasing ratio is used for judging whether the loss of synchronism of the stepping motor is generated or not was explained, in the second embodiment, the number of chopping is used for judging whether the loss of synchronism of the stepping motor is generated or not. Now, the second embodiment will be described.

By observing the graph 202 (shown in FIGS. 2A and 2B) given when the stepping motor 101 is rotated correctly, it can be seen that the electrical current supplied to the stepping motor 101 is increased relatively gently, and thus, the number of chopping of the driving circuit 103 is relatively small.

On the other hand, by observing the graph 203 given when the loss of synchronism is generated, it can be seen that the electrical current supplied to the stepping motor 101 is increased relatively abruptly, and thus, the number of chopping of the driving circuit 103 is relatively great.

From the above fact, it can be seen that, regarding the electrical current supplied to the stepping motor 101, the number of chopping in the occurrence of the loss of synchronism tends to be increased in comparison with the normal condition. That is to say, the detection of the loss of synchronism of the stepping motor 101 can be effected by always monitoring the number of chopping during the operation of the stepping motor and by assuming the occurrence of the loss of synchronism if the number of chopping becomes greater than a certain reference number and by sending a loss of synchronism signal.

However, it is considered that the number of chopping is varied with other factors (than the loss of synchronism) such as dispersion in property of the stepping motor, increase in temperature of a body of the stepping motor or an atmosphere surrounding the stepping motor, or fluctuation in load of the stepping motor, and thus, it is considered that the number of chopping greater than the reference number can be observed intermittently.

If the number of chopping is greater than the reference number for a sufficient time period, i.e., if the number of chopping greater than a predetermined second reference number is counted continuously, it is judged that the loss of synchronism of the stepping motor is generated.

Next, a flow of a detecting process of loss of synchronism according to the second embodiment carried out by the CPU 102 will be explained with reference to flow charts shown in FIGS. 6 and 7.

Figure 6:
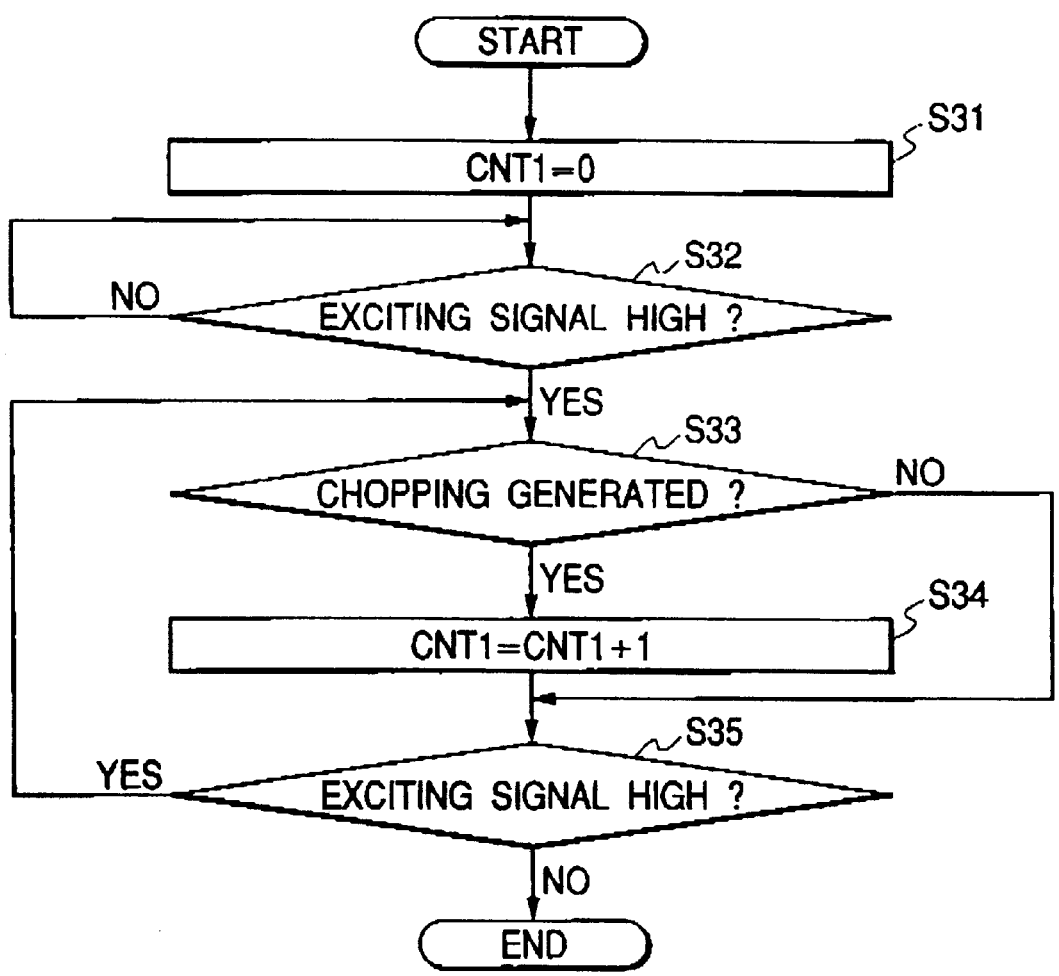
FIG. 6 is a flow chart showing a sequence for calling out a detecting process of loss of synchronism in a second embodiment of the present invention.
Figure 7:
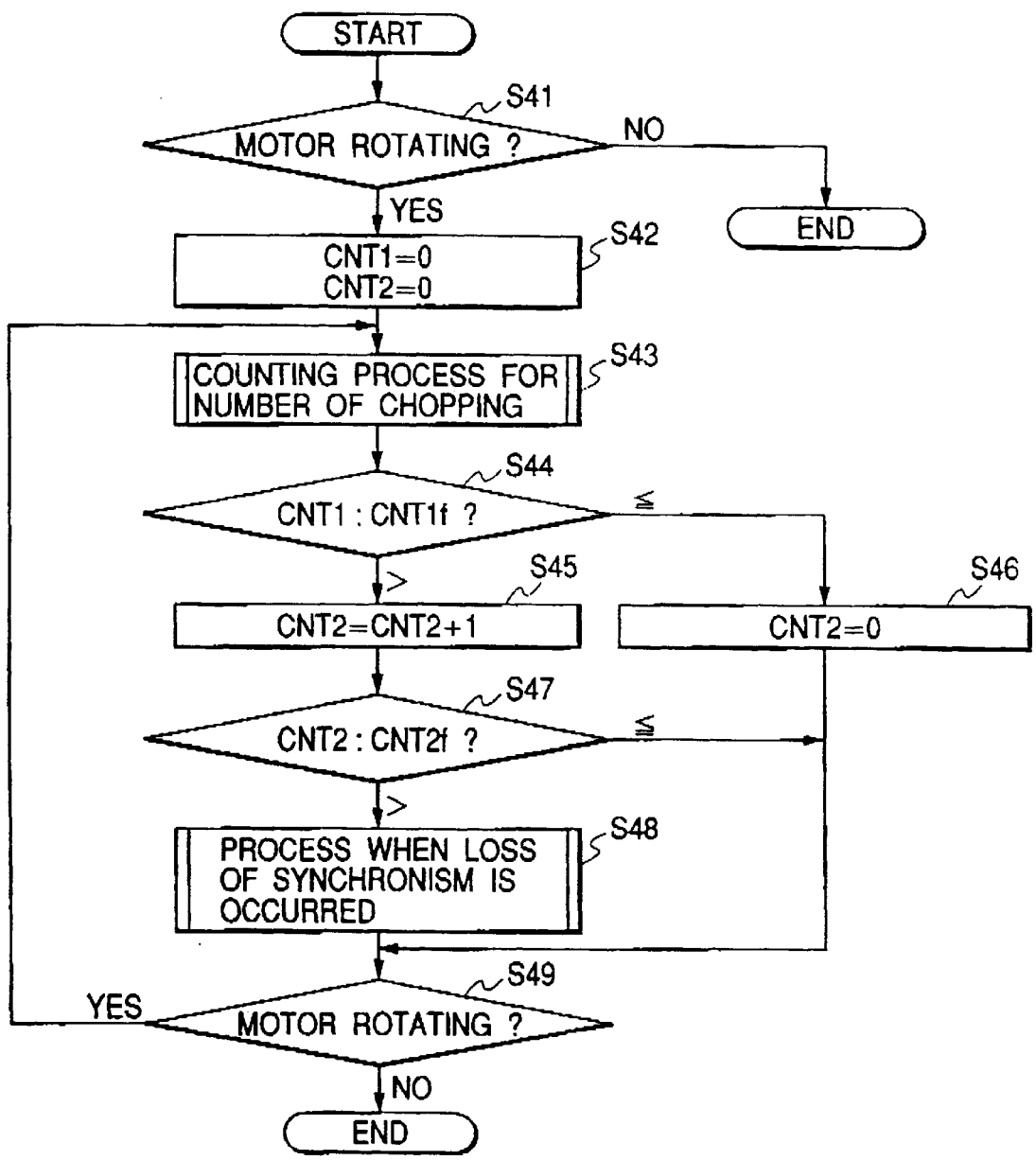
FIG. 7 is a flow chart showing a sequence of the detecting process of loss of synchronism in the second embodiment.

Here, "CNT1" is a variable for recording the number of chopping at "HIGH" level of the phase exciting signal "CNTf" is a constant storing the reference number by which CNTf is compared with CNT1 to judge the detection of the loss of synchronism, "CNT2" is a variable for recording the number in which CNT1 exceeds a value CNT1f continuously, "CNT2f" is a constant storing the reference number by which CNT2f is compared with CNT2 to judge the detection of the loss of synchronism, and "ErrFlag" is a flag indicating the fact that the loss of synchronism of the stepping motor is detected FIG. 6 is a flow chart showing a counting process for number of chopping required for judging the detection of the loss of synchronism in the second embodiment.

The counting process for number of chopping is a process in which the process is called out from the detecting process of loss of synchronism during the rotation of the motor, and the number of chopping is monitored under constant electrical current control of the driving circuit 103, and the number is counted. If the process is called out, the sequence goes to a step S31 (step is represented by "S" in the flow charts).

In the step S31, the CNT1 which is the counter in the CPU 102 for counting the number of chopping is initialized to zero. Then, the sequence goes to a step S32.

In the step S32, the state of the phase exciting signal is observed. If the phase exciting signal is in "HIGH" level, the sequence goes to a step S33; whereas, if the signal is in "LOW" level, a waiting process is performed until the phase exciting signal becomes "HIGH" level.

In a step S33, presence/absence of occurrence of chopping is effected under constant electrical current control of the driving circuit 103. If the chopping is generated, the sequence goes to a step S34. On the other hand, if the chopping is not generated, the sequence goes to a step S35.

In the step S35, the state of the phase exciting signal is observed. If the phase exciting signal is in "HIGH" level, the sequence is returned to the step S33; whereas, if the signal is in "LOW" level, the counting process for number of chopping is ended.

In the process shown in this flow chart, the number of chopping within one period of the phase exciting is counted, and the counted value is stored in the counter CNT1.

Next, the detecting process of loss of synchronism of the second embodiment using the counting process of number of chopping shown in FIG. 6 will be explained. FIG. 7 is a flow chart of the detecting process of loss of synchronism of the second embodiment. After the process is started, the sequence goes to a step S41 in FIG. 7.

In the step S41, it is judged whether the stepping motor 101 is being rotated or not. If the motor is being rotated, the sequence goes to a step S42. On the other hand, if the driving control of the motor is stopped, the detecting process of loss of synchronism is ended.

In the step S42, the counters CNT1, CNT2 are initialized. After the initialization, the sequence goes to a step S43.

In the step S43, the counting process of number of chopping shown in FIG. 6 is called out. As mentioned above, in the counting process of number of chopping, the number of chopping for one period of the phase exciting is counted, and the counted value is stored in CNT1, and then, the sequence is returned to the main processing. After returned from the counting process of number of chopping, the sequence goes to a step S44.

In the step S44, the value of the number CNT1 of chopping is compared with the reference number CNT1f. If CNT1 exceeds the reference number CNT1f, the sequence goes to a step S45. On the other hand, if CNT1 is smaller than the reference number CNT1f, the sequence goes to a step S46.

In the step S45, increment of the value CNT2 as second counting means for counting the number in which CNT1 exceeds the reference number CNT1f is effected, and then, the sequence goes to a step S47.

In the step S46, the value of CNT2 is initialized. After the initialization, the sequence goes to a step S49.

In the step S47, the value of CNT2 counting the number in which CNT1 exceeds the first reference number CNT1f continuously is compared with the second reference number CNT2f. If CNT2 exceeds the reference number CNT2f, the sequence goes to a step S48. On the other hand, if CNT2 is smaller than the reference number CNT2f, the sequence goes to a step S49.

In the step S48, it is judged that the loss of synchronism of the stepping motor 101 is generated, and the previously programmed process when loss of synchronism is occurred is performed. The process when loss of synchronism is occurred is, for example, the process shown in FIG. 5. Thereafter, the sequence goes to the step S49.

In the step S49, it is judged whether the stepping motor 101 is being rotated or not. If the stepping motor is being rotated, the sequence is returned to the step S43, where the detecting process of loss of synchronism is until the motor is stopped. On the other hand, if the motor is stopped, the detecting process of loss of synchronism is ended.

As mentioned above, in the second embodiment, the number of chopping of the driving apparatus when the stepping motor is driven with constant electrical current is counted, and the counted value is compared with the first reference number, and, if the number exceeding the first reference number becomes greater than the second reference number, it can be judged that the loss of synchronism of the stepping motor 101 is generated.

Third Embodiment

Next, a stepping motor driving controlling apparatus according to a third embodiment of the present invention will be explained. In the stepping motor driving controlling apparatus according to the third embodiment, since the circuit construction (FIG. 1) and the process when loss of synchronism is occurred (FIG. 5) are the same as the those explained in connection with the first embodiment, explanation thereof will be omitted. In the first embodiment, while an example that the HIGH level of the exciting signal is detected to start the timer and the electrical current value is read-in and the detecting process of loss of synchronism is effected when the predetermined time indicated by the timer is elapsed was explained, in the third embodiment, at a time when the HIGH level of the exciting signal is detected, the detecting process of loss of synchronism is effected. Incidentally, the detecting process of loss of synchronism itself substantially corresponds to a combination of FIGS. 3 and 4 explained in connection with the first embodiment.

Figure 8:
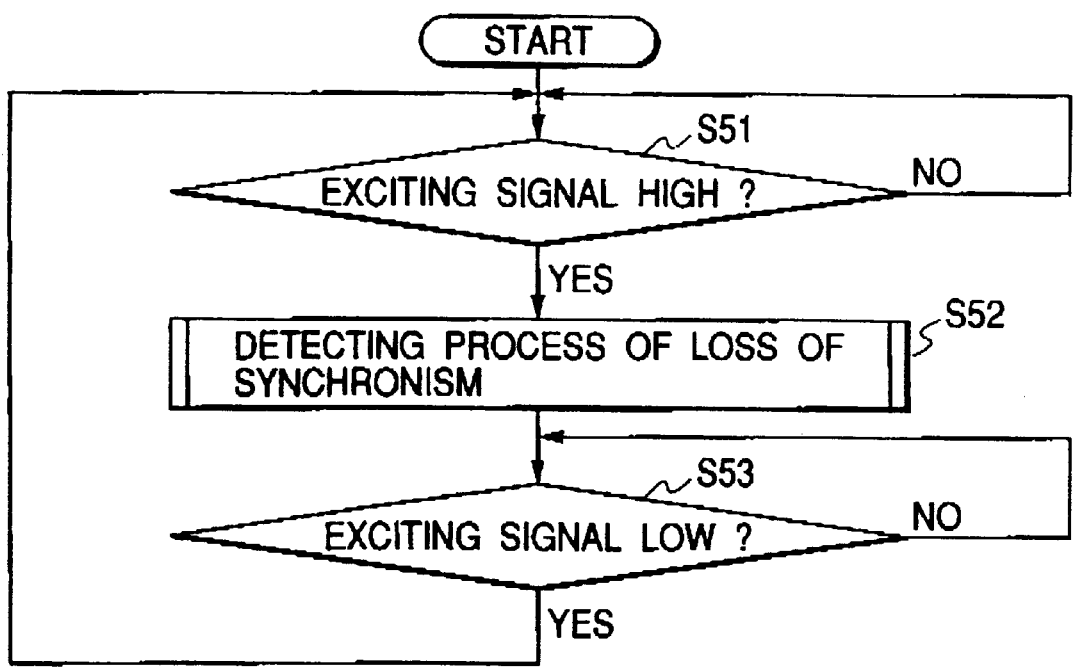
FIG. 8 is a flow chart showing a sequence for monitoring an exciting signal and for calling out a detecting process of loss of synchronism in a third embodiment of the present invention.
Figure 9:
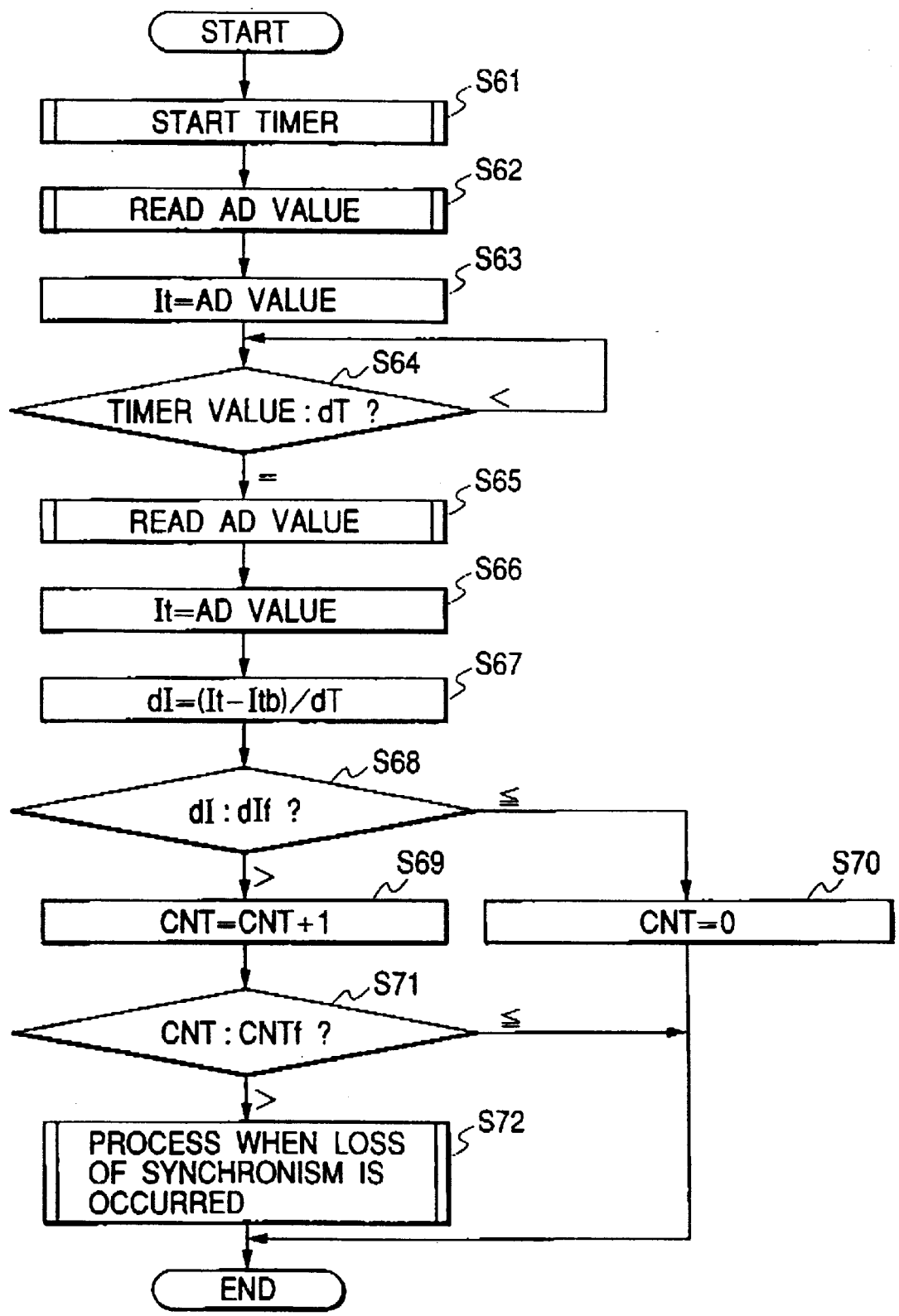
FIG. 9 is a flow chart showing a sequence for calling out the detecting process of loss of synchronism in the third embodiment.

Now, the actual processing flow of the loss of synchronism detecting means executed by the CPU 102 will be explained with reference to flow charts. FIG. 8 is a flow chart showing a sequence for monitoring the exciting signal in the third embodiment and for calling out the detecting process of loss of synchronism. FIG. 9 is a flow chart showing the sequence for judging the detection of loss of synchronism in the third embodiment.

Here, "dT" is detecting process interval of loss of synchronism, "It" is an electrical current value being presently supplied to the stepping motor 101, "Itb" is an electrical current value at the time before dT from the present time, "dI" is an electrical current increasing ratio measured, "dIf" is a threshold value of the electrical current increasing ratio for judging the detection of loss of synchronism, "CNT" is a counter for counting the number in which the measured electrical current increasing amount exceeds the threshold value continuously, "CNTf" is a threshold value of the CNT value for judging detection of loss of synchronism, and "ErrFlag" is a flag indicating the fact that the loss of synchronism of the stepping motor is detected.

The judgement for calling out the detecting process of loss of synchronism is called out by the sequence or task for monitoring the exciting signal and the process is started. First of all, this task will be described with reference to FIG. 8.

The task is started when external electrical power is supplied to the motor driving apparatus. After the task is started, the sequence goes to a step S51 (step is represented by "S" in the flow charts).

In the step S51, it is judged whether the phase exciting signal is "HIGH" level or not. If the phase exciting signal is "HIGH" level, the sequence goes to a step S52; whereas, if the phase exciting signal is "LOW" level, the sequence is returned to the step S51, where the sequence is waiting until the phase exciting signal becomes the HIGH level.

The task for monitoring the exciting signal utilizes timer periodical interruption and is called out at a constant periods. Further, the task is called out at sufficiently shorter time than the frequency of the phase exciting so that the error between the time at which the actual phase exciting signal rises to the HIGH level and the time at which the "HIGH" level is detected by the task can be neglected.

In the step S52, the detecting process of loss of synchronism (refer to FIG. 9) is called out from the task. After the detecting process of loss of synchronism, the sequence goes to a step S53.

In the step S53, it is judged whether the phase exciting signal is "LOW" level or not. If the phase exciting signal is "LOW" level, the sequence is returned to the step S52; whereas, if the phase exciting signal is "HIGH" level, the step S53 is repeated and the sequence is waiting until the phase exciting signal becomes "LOW" level.

Next, the detecting process of loss of synchronism will be explained with reference to FIG. 9. The process is called out in the step S52 of the exciting signal monitoring task (FIG. 8) and the detecting process of loss of synchronism is started. After the process is started, the sequence goes to a step S61.

In the step S61, a process for driving the timer 106 for correctly measuring the electrical current increasing ratio is called out. After the timer is started, the sequence goes to a step S62.

In the step S62, a value measured by the electrical current sensor 104 of the driving circuit 103 for measuring the electrical current value being presently supplied to the stepping motor 101 is A/D-converted, and the converted value is read-in in the CPU 102. After the reading-in of the A/D value, the sequence goes to a step S63.

In the step S63, the A/D value read-in in the CPU 102 in the step S62 is stored in the variable Itb, and then, sequence goes to a step S64.

In the step S64, the timer value of the timer 106 started in the step S61 is compared with the detecting process interval dT of loss of synchronism. If the timer value is smaller than dT, the step S64 is repeated to wait until the timer value coincides with dT. If the timer value coincides with dT, the sequence goes to a step S65 thereby to correctly determine the time interval for measuring the electrical current increasing ratio.

In the step S65, similar to the step S62, a value measured by the electrical current sensor 104 of the driving circuit 103 for measuring the electrical current value being presently supplied to the stepping motor 101 is A/D-converted, and the converted value is read-in in the CPU 102. After the reading-in of the A/D value, the sequence goes to a step S66.

In the step S66, the A/D value read-in in the CPU 102 in the step S65 is stored in the variable It, and then, sequence goes to a step S67.

In the step S67; a difference between the electrical current value it read-in the step S66 and the value of Itb storing the electrical current value measured and read-in before the time dT is determined, and further, a value obtained by dividing the difference by dT which is electrical current measurement period is stored in the variable dI. The calculated dI is an electrical current increasing ratio (per unit time) of the stepping motor 101. Then, the sequence goes to a step S68.

In the step S68, the electrical current increasing ratio dI to be supplied to the stepping motor 101 and calculated in the step S65 is compared with the threshold value dIf of the electrical current increasing ratio. If the value dI is above the threshold value dIf, the sequence goes to a step S69. On the other hand, if the value dI is smaller than the threshold value dIf, it is judged that there is no loss of synchronism of the stepping motor 101, and the sequence goes to a step S70.

In the step S69, since the present electrical current increasing ratio exceeds the threshold value, the increment of the value of the counter CNT is effected, and the sequence goes to a step S71.

In the step S70, since the present electrical current increasing ratio is smaller than the threshold value, the value of the counter CNT is initialized to zero, and the detecting process of loss of synchronism is ended.

In the step S71, the value of the counter CNT recording the number in which the electrical current increasing ratio exceeds the threshold value continuously is compared with the counter threshold value CNTf for judging the loss of synchronism. If CNT is above CNTf, it is judged that the loss of synchronism of the stepping motor 101 is generated, and the sequence goes to a step S72. On the other hand, if CNT is smaller than CNTf, it is judged that there is no loss of synchronism, and the detecting process of loss of synchronism is ended.

In the step S72, since it is judged that the loss of synchronism of the stepping motor 101 is generated, previously programmed process when loss of synchronism is occurred is performed. Thereafter, the detecting process of loss of synchronism is ended.

As mentioned above, the loss of synchronism can be detected only by the stepping motor driving controlling apparatus on the basis of the electrical current increasing ratio or the number of chopping for judging the loss of synchronism without using the conventional loss of synchronism detecting sensor, and, thus, the conventional loss of synchronism detecting sensor and wirings to the sensor can be omitted.

Further, since the loss of synchronism of the stepping motor can be detected at real time, the stepping motor can quickly be returned from the loss of synchronism condition, thereby preventing damage of the apparatus due to the loss of synchronism.

Further, only when the number in which the electrical current increasing ratio exceeds the threshold value continuously becomes greater than the predetermined number, it may be judged that the loss of synchronism is generated. By doing so, if the electrical current increasing ratio temporarily exceeds the threshold value for any reason other than the loss of synchronism of the stepping motor, this fact can be eliminated from the judgement of the loss of synchronism, thereby enhancing the detecting accuracy of the loss of synchronism Further, only when the number of chopping of the motor driving apparatus exceeding the first reference number becomes greater than the second reference number, it may be judged that the loss of synchronism is generated. By doing so, if the number of chopping of the motor driving apparatus temporarily exceeds the first reference number for any reason other than the loss of synchronism of the stepping motor, this fact can be eliminated from the judgement of the loss of synchronism, thereby enhancing the detecting accuracy of the loss of synchronism.

Further, there is provided the timer device in which the HIGH and LOW levels of the phase exciting signal for determining the timing for supplying the electrical current to the coil of the stepping motor are monitored, and the measurement is started at the time instant when the phase exciting signal becomes the HIGH level, and the sufficiently shorter time than the predetermined HIGH level is measured from that time instant. The timer device can calculate the electrical current increasing ratio with high accuracy by measuring the electrical current to be supplied to the stepping motor at the time when the measurement is started in synchronous with the HIGH level of the phase exciting signal and at the time when the set time period from the start of the timer is elapsed.

In this case, furthermore, only when the number in which the electrical current increasing ratio exceeds the threshold value continuously becomes greater than the predetermined number, it may be judged that the loss of synchronism is generated. By doing so, if the electrical current increasing ratio temporarily exceeds the threshold value for any reason other than the loss of synchronism of the stepping motor, this fact can be eliminated from the judgement of the loss of synchronism, thereby enhancing the detecting accuracy of the loss of synchronism.

In the above explanation, the detecting process of loss of synchronism of the stepping motor and the process when loss of synchronism is occurred were described. Now, an embodiment in which such processes are applied to an image forming apparatus will be described.

Fourth Embodiment

Figure 10:
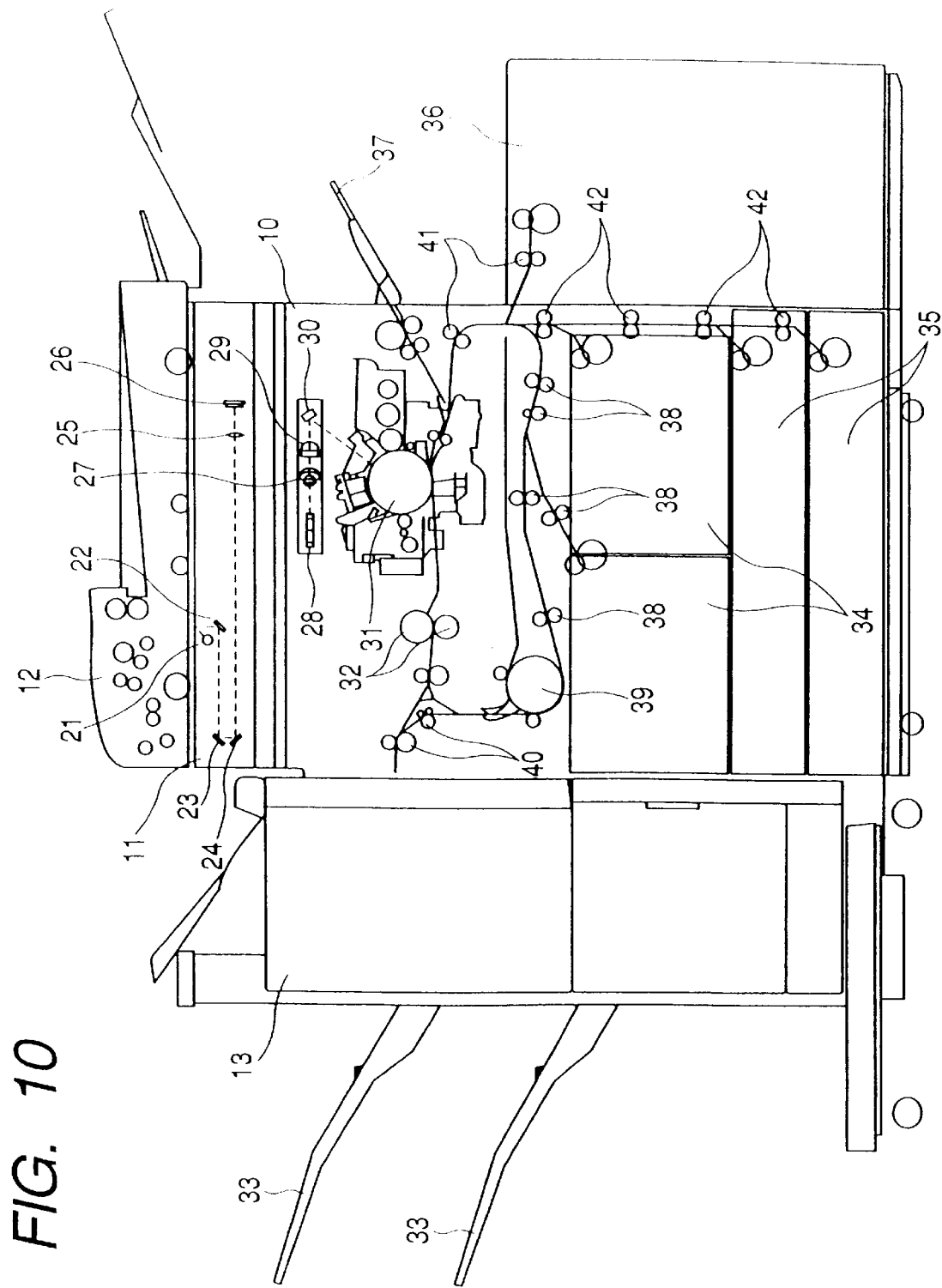
FIG. 10 is a constructional view showing an embodiment to which an image forming apparatus according to the present invention is applied.

FIG. 10 is a constructional view showing an embodiment of an image forming apparatus to which the present invention is applied. The image forming apparatus comprises a main body image outputting portion 10 as a device for printing and outputting an original image on a recording paper, a main body image inputting portion 11 as a device for reading image data from an original, an automatic original feeding device 12 mounted to an upper part of the main body image inputting portion 11, and a sorter 13 for sorting and discharging copied sheets discharged from the main body image outputting portion 10 into a plurality of bins (receptacles).

The image forming apparatus is a digital copying machine in which the original is divided into pixels by a CCD image sensor of the main body image inputting portion 11 as the device for reading image data from the original, and the pixels are read-in the apparatus as the image data, and, after required image processing is effected, the result is stored in an image memory. The image data is transferred to the main body image outputting portion 10, and the image is reproduced on the basis of the image data and copied on the recording paper.

The main body image inputting portion 11 is provided with a light source 21 for scanning the original rested on an original plate on the upper surface of the inputting portion while illuminating the original. The light source 21 receives a driving force from an optical system motor (not shown) to be reciprocally shifted in a left-and-right direction in FIG. 10. Light generated from the light source 21 is reflected by the rested original, thereby obtaining a light image. The light image is sent to a CCD 26 through mirrors 22, 23, 24 and a lens 25. Incidentally, the mirrors 22, 23, 24 are driven integrally with the light source 21. The CCD 26 serves to convert the light into an electrical signal, and the electrical signal is converted into a digital signal (image data).

The read-in original image data is subjected to various correcting processes and image processing which is desired by the user, and the result is stored in the image memory (not shown).

In the main body image outputting portion 10, the image data stored in the image memory is read out, and the digital signal is converted into the analogue signal again, and the analogue signal is amplified to a proper output value by an exposure controlling portion (not shown), and the output value is converted into a light signal by an optical illuminating portion 27. The light signal is propagated through a scanner 28, a lens 29 and a mirror 30 and is illuminated on a photosensitive drum 31, thereby forming an electrostatic latent image. Toner is adhered to the latent image, and the adhered toner is transferred onto a recording paper conveyed through the main body and then is fixed to the recording paper by a fixing roller 32 (i.e., the image data is recorded on the recording paper). Then, the recording paper is sent to the sorter 13.

The sorter 13 is a sorting device disposed at the left side of the main body image outputting portion 10 and serves to sort and discharge the recording papers discharged from the main body image outputting portion 10 into sheet discharge trays 33. The sheet discharge trays 33 are controlled by a main body controlling portion (not shown) so that the outputted recording paper is discharged onto a tray selected by the controlling portion.

Sheet feeding trays 34, 35 are disposed within a lower part of the main body and can store a certain amount of recording papers. The recording paper is conveyed from the sheet feeding tray 34 or 35 by the controlling portion and the image outputting is effected. A sheet feeding deck 36 is disposed as the left side of the main body image outputting portion 10 and can store a large number of recording papers. Similar to the sheet feeding trays 34, 35, the recording paper is conveyed from the sheet feeding deck by the controlling portion and the image outputting is effected.

A manual insertion tray 37 by which the user can feed small number of copy sheets of any document relatively easily is disposed at the left side of the main body image outputting portion 10. The manual insertion tray can be used also when a special recording paper such as an OHP sheet, a thick sheet and a post card.

Sheet conveying rollers 38, 39, 40, 41, 42 serve to actually convey the recording paper when sheet feeding for copy output process is effected. Each of the sheet conveying rollers is connected to a stepping motor as independent drive source via a transmitting device such as gears. The details thereof is shown in FIG. 11.

Figure 11:
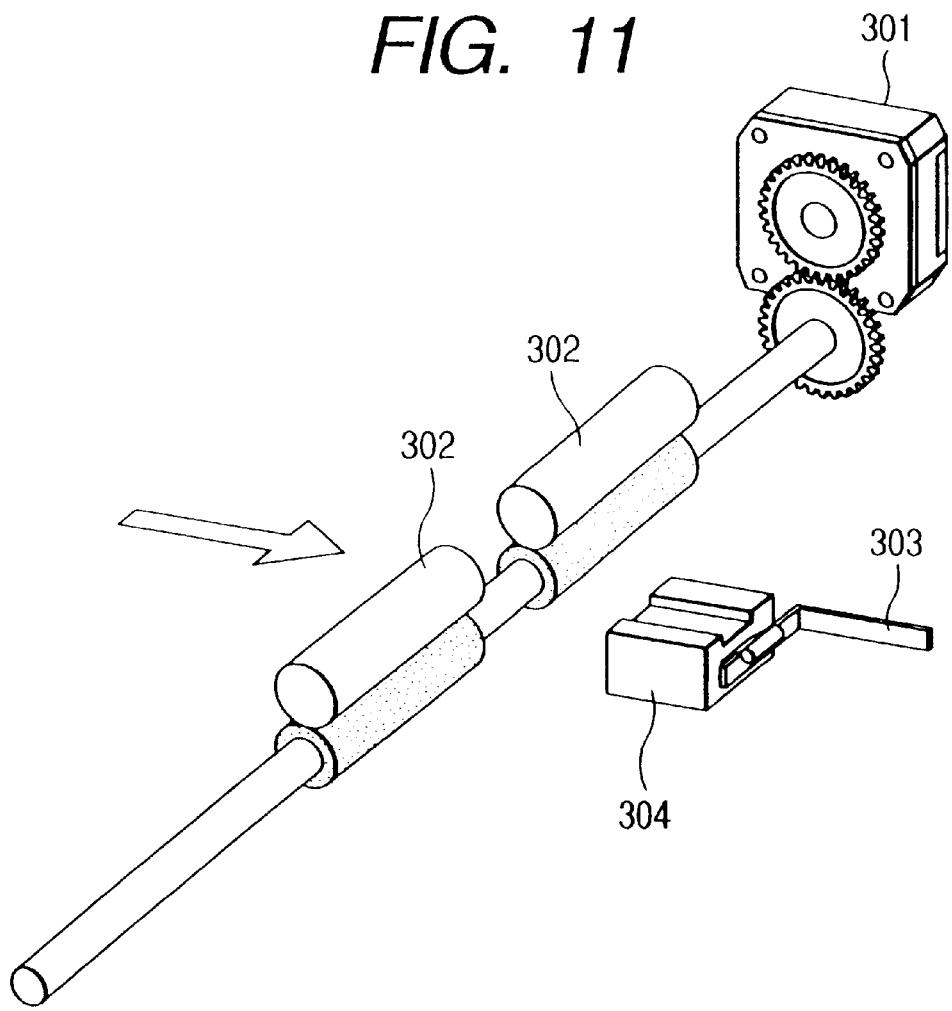
FIG. 11 is a detailed constructional view of a sheet conveying apparatus according to a fourth embodiment of the present invention in the image forming apparatus of the present invention.

FIG. 11 is a detailed constructional view showing a sheet conveying apparatus of the image processing apparatus of the present invention. Actual directions along which the sheet is conveyed are shown by the arrows.

In FIG. 11, a stepping motor 301 acts as a drive source for the sheet conveying apparatus. The feature of the stepping motor is that it is rotated in response to a pulse electrical power. Further, since a rotational angle is changed in proportion to the number of input pulses and a rotational speed is changed in proportion to input frequency, the motor can be driven without using a feedback loop. Due to such feature, the stepping motor is widely used as a drive source for positioning control of open loop and speed control.

The stepping motors are generally grouped on the basis of structure of the motor. The group may include PM type (permanent type) in which a rotor portion is formed from a permanent magnet, VR type (variable reluctance type) in which a rotor portion is formed from a tooth-like iron core and HR type (hybrid type) in which a rotor portion is formed from a tooth-like iron core and a magnet.

Other than the above, there is a stepping motor constituted by a driving windings. The driving windings can be grouped into 2-phase, 3-phase, 5-phase and the like. Further, on the basis of an exciting mode, the motor can be grouped into 1 phase exciting, 2 phase exciting, 1–2 phase exciting and the like. In the illustrated embodiment, a stepping motor of 2 phase exciting HR type is used.

Sheet conveying rollers 302 serve to apply a force to the recording paper to be actually conveyed, thereby conveying the recording paper. The sheet conveying rollers 302 receive a driving force from the stepping motor 301 via gears and a shaft.

A sheet detecting sensor 303 is associated with a photo-interrupter 304 serving to convert response of the sheet detecting sensor into an electrical signal. Although the paper is passed in a direction shown by the arrow, the sheet detecting sensor is disposed immediately behind the sheet conveying rollers. when a leading end of the paper is passed by the sheet detecting sensor 303, one end of the sheet detecting sensor 303 is pushed and the other end of the sensor blocks a path between a light emitting portion and a light receiving portion of the photo-interrupter 304.

A distance between the sheet detecting sensor 303 and the sheet conveying rollers 302 is selected to be smaller than a length of a smallest recording paper available in the image forming apparatus so that, when the stepping motor 301 is operated correctly to drive the sheet conveying rollers 302, the paper is conveyed by the sheet conveying rollers 302, and, when a predetermined time period after the motor is driven is elapsed, the paper is detected by the sheet detecting sensor 303.

When the path between the light emitting portion and the light receiving portion of the photo-interrupter 304 is blocked, an output signal from the photo-interrupter 304 is changed. The controlling portion of the image forming apparatus monitors the signal of the photo-interrupter 304 at predetermined time intervals, so that, when the output signal is changed, it is judged that the paper is detected.

In the illustrated embodiment, if the signal from the photo-interrupter 304 is not the output signal indicating detection of the paper when the predetermined time period after the motor is driven is elapsed, it is judged that the jam occurs.

Figure 12:
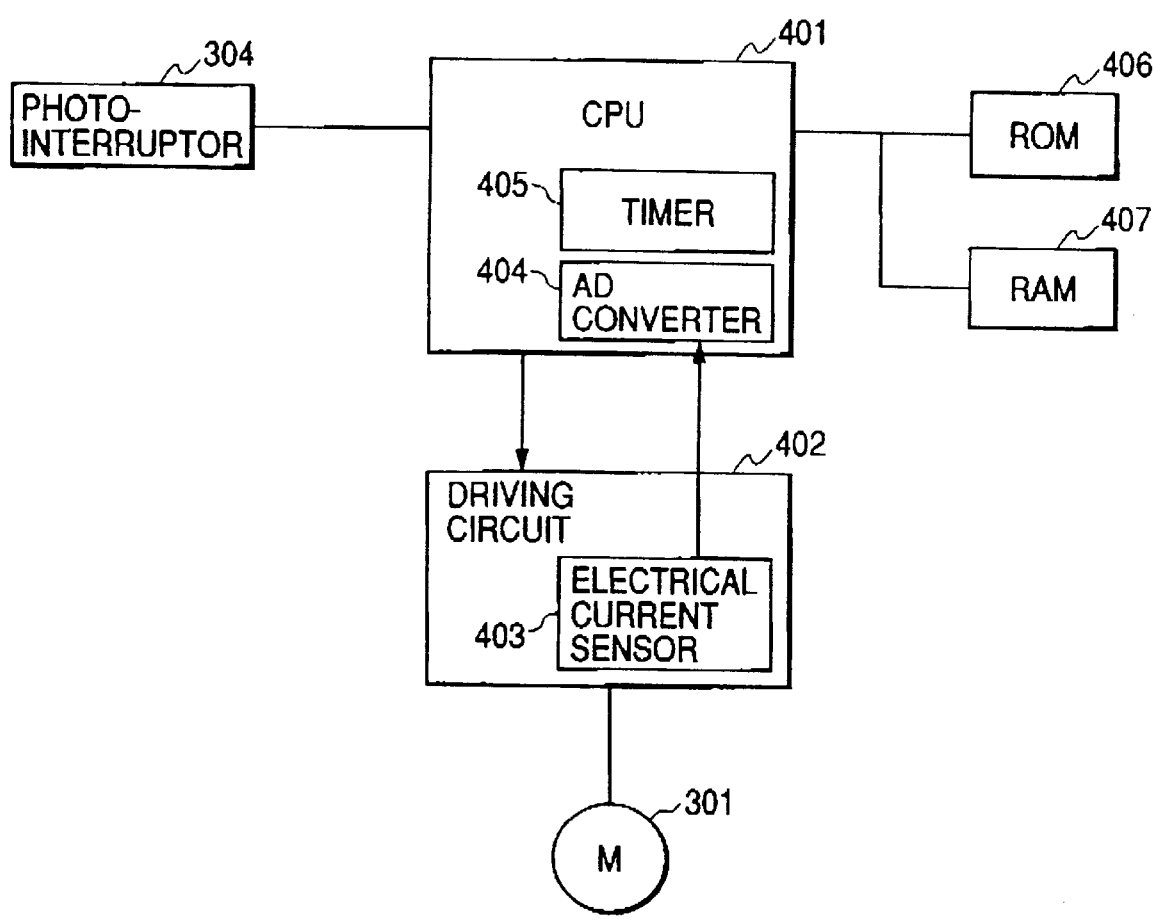
FIG. 12 is a constructional view showing a motor driving apparatus for a stepping motor used as a drive source of the sheet conveying apparatus in the image forming apparatus of the present invention.

FIG. 12 is a constructional view of the motor driving apparatus incorporated into the image forming apparatus, which electrical power supplying and driving control of the stepping motor used as the drive source of the sheet conveying apparatus of the image forming apparatus according to the illustrated embodiment.

In FIG. 12, the motor driving apparatus includes a stepping motor 301 (shown in FIG. 11) to be controlled, a central processing unit (referred to as "CPU" hereinafter) 401 for outputting a driving signal for the stepping motor 301, a driving circuit 402 for supplying electrical current required for rotating the stepping motor, an electrical current sensor 403 for measuring an electrical current value, an A/D converter 404 for converting the electrical current value measured by the electrical current sensor 404 into a digital signal processed by the CPU 401, a timer 405 for measuring a sufficiently short time, a ROM device 406 for storing motor control program, and a RAM device 407 which is temporarily used as a storing area by the CPU 401. The reference numeral 304 denotes the photo-interrupter shown in FIG. 11.

In the motor driving apparatus, the CPU 401 serves to call out the stepping motor control program stored in the ROM device 406 and to output a phase exciting signal as a driving signal for the stepping motor 301 to the driving circuit 402 in accordance with the instruction of the control program. That is to says the CPU outputs the phase exciting signal having frequency corresponding to the target number of revolutions of the motor.

Further, the CPU 401 includes the timer 405 which can be called out and used by the program. The timer is used when the time is measured or when specific interruption processing is generated for every period.

A detecting process of loss of synchronism of the stepping motor 301 is performed by calculation in the CPU 401. In the driving circuit 402, constant electrical current chopping control is constituted by hardware so that the electrical current supplied to the stepping motor 301 is turned ON/OFF in response to the phase exciting signal from the CPU 401 thereby to perform chopping control so as to make the electrical current flowing to the motor constant. In this way, the electrical current is supplied to the stepping motor 301.

The electrical current sensor 403 for measuring an actual electrical current value supplied to the stepping motor 301 is incorporated into the driving circuit 402, and the electrical current sensor 403 outputs voltage proportional to the measured electrical current.

The A/D converter 404 serves to convert the analogue signal outputted from the electrical current sensor 403 into a digital signal and send, to the CPU 401, electrical current value information being supplied to the motor. The CPU 401 observes the information from the electrical current sensor 403 as the actual electrical current of the stepping motor through the A/D converter 404.

Further, in recent years, a CPU in which an A/D converter is integrated in the same package as a CPU has widely been proposed, and, also in the illustrated embodiment, the CPU 401 incorporating the A/D converter is used.

The ROM device 406 is a non-volatile memory device. The motor control program is stored in the ROM device 406, and program is loaded to the CPU 401 on demand. The RAM device 407 is a read/write memory device for storing a calculation result of the CPU 401 and for temporarily retarding the calculation result. Further, in recent years, a CPU in which ROM, RAM and CPU are integrated in the same package has also been proposed, and, when such a CPU is used, the ROM device 406 and the RAM device 407 can be omitted.

Next, difference in feature of the actual electrical current value between when the stepping motor 301 is rotated correctly and when the loss of synchronism is generated will be described, and means for detecting the loss of synchronism on the basis of features will be explained.

Figure 13A:
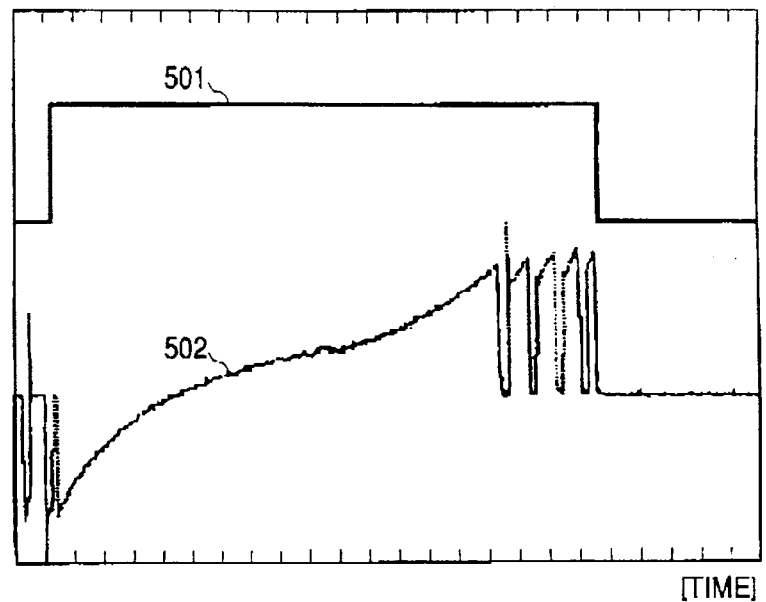
FIGS. 13A and 13B are views for explaining an electrical current supplied to the stepping motor.
Figure 13B:
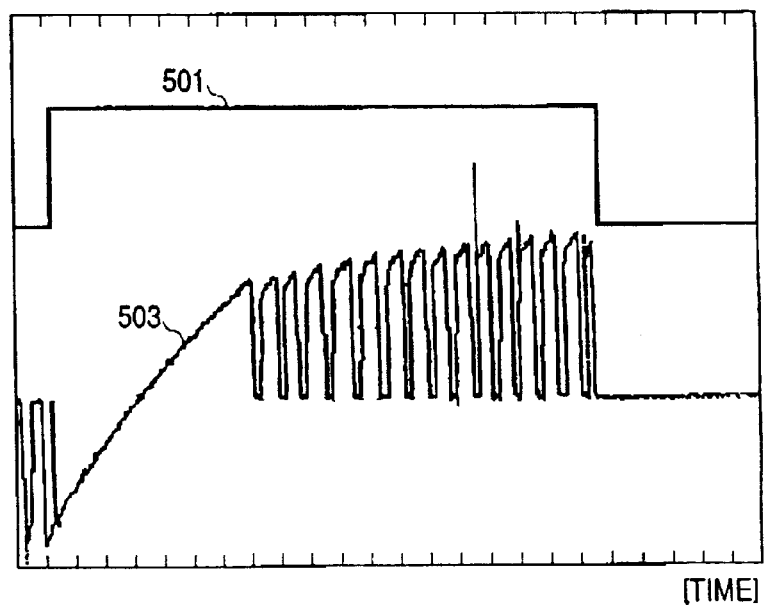

FIG. 13A is a graph showing the phase exciting signal and electrical current response when the stepping motor 301 is rotated correctly. FIG. 13B is a graph showing the phase exciting signal and electrical current response when the loss of synchronism is generated. In the graphs, the reference numeral 501 denotes the phase exciting signal applied to the driving circuit; 502 denotes the electrical current response when the stepping motor is rotated correctly; and 503 denotes the electrical current response when the loss of synchronism is generated.

By observing the graph 502 given when the stepping motor 301 is rotated correctly, it can be seen that the electrical current supplied to the stepping motor 301 is increased relatively gently. On the other hand, by observing the graph 503 given when the loss of synchronism of the stepping motor 301 is generated, it can be seen that the electrical current supplied to the stepping motor 301 is increased relatively abruptly.

From the above fact, it can be seen that, regarding the electrical current supplied to the stepping motor 301, inclination of the electrical current response tends to become greater when the stepping motor is rotated correctly than when the loss of synchronism is generated. That is to say, the detection of the loss of synchronism of the stepping motor can be effected by always monitoring the inclination of the electrical current response during the operation of the stepping motor and by assuming the occurrence of the loss of synchronism if the inclination becomes greater than a certain threshold value and by sending a loss of synchronism signal.

However, it is considered that the inclination of the electrical current response is varied with other factors (than the loss of synchronism) such as dispersion in property of the stepping motor, increase in temperature of a body of the stepping motor or an atmosphere surrounding the stepping motor, or fluctuation in load of the stepping motor, and thus, it is considered that the inclination of the electrical current response greater than the threshold value can be observed intermittently.

If the inclination of the electrical current response is greater than the threshold value for a sufficient time period, i.e., if the number of the electrical current responses (greater than the threshold value) greater than the predetermined reference number are measured continuously, it is judged that the loss of synchronism of the stepping motor is generated.

Figure 15:
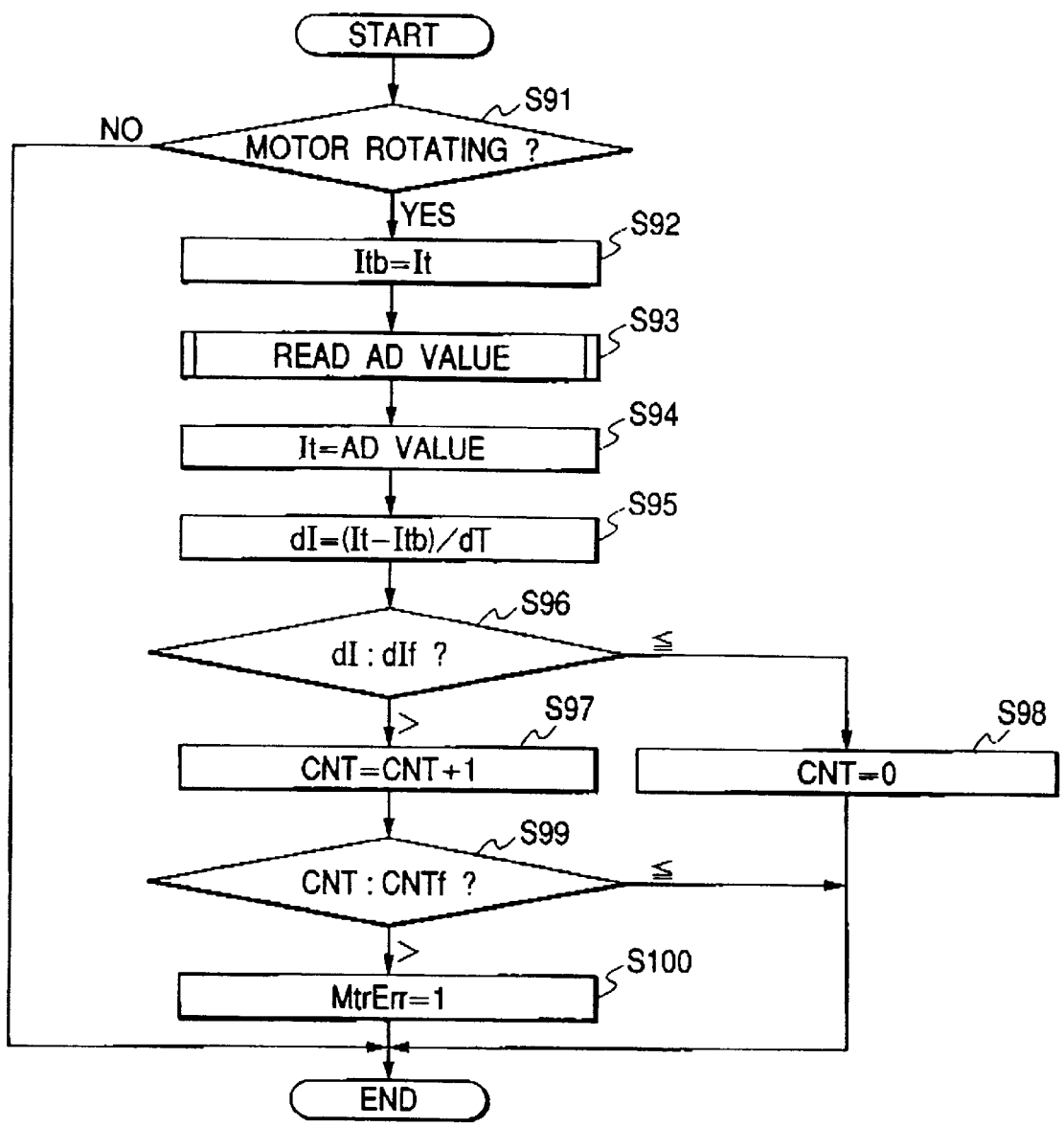
FIG. 15 is a flow chart showing a sequence of the detecting process of loss of synchronism in the fourth embodiment.

Next, the actual processing flow of the loss of synchronism detecting means carried out by the CPU 401 will be explained with reference to flow charts. FIG. 14 is a flow chart for judging the calling out of the detecting process of loss of synchronism in the illustrated embodiment, and FIG. 15 is a flow chart showing the process for judging the detection of loss of synchronism in the illustrated embodiment.

Here, "dT" is detecting process interval of loss of synchronism, "It" is an electrical current value being presently supplied to the stepping motor 101, "Itd" is an electrical current value at the time before dT from the present time "dI" is an electrical current increasing ratio measured, "dIf" Is a threshold value of the electrical current increasing ratio for judging the detection of loss of synchronism, "CNT" is a counter for counting the number in which the measured electrical current increasing amount exceeds the threshold value continuously, "CNTf" is a threshold value of the CNT value for judging detection of loss of synchronism, and "MtrErr" is a flag indicating the fact that the loss of synchronism of the stepping motor 301 is detected.

The judgement for calling out the detecting process of loss of synchronism is called out at a "HIGH" level timing in the period of the phase exciting signal and the process is started. After the starting, this process goes to a step S81 (step is represented by "S" in the flow charts). In the step S81, it is judged whether the phase exciting signal is "HIGH" level or not. If the phase exciting signal is "HIGH" level, the sequence goes to a step S82; whereas, if the phase exciting signal is "LOW" level, the sequence is ended.

In the step S82, the timer 405 is started to measure the timing for effecting the detecting process of loss of synchronism. After the timer is started, the sequence goes to a step S83. In the step S83, a value measured by the electrical current sensor 403 of the driving circuit 402 for measuring the electrical current value being presently supplied to the stepping motor 301 is A/D-converted, and the converted value is read-in in the CPU 401. After the reading-in of the digital value, the sequence goes to a step S84.

In the step S84, the digital value read-in in the CPU 401 tn the step S83 is stored in the variable it, and then, sequence goes to a step S85. In the step S85, the timer value of the timer started in the step S82 is compared with the detecting process interval dT of loss of synchronism, and the waiting process is performed until the timer value coincides with dT. When the timer value coincides with dT, the sequence goes to a step S86.

In the step S86, the detecting process of loss of synchronism is called out, and the detecting process of loss of synchronism shown in FIG. 15 is effected Next, the detecting process of loss of synchronism will be explained with reference to FIG. 15. The process is called out in the step S86 of FIG. 14, and the detecting process of loss of synchronism is started. After the process is started, the sequence goes to a step S91.

In the step S91, it is judged whether the stepping motor 301 is being rotated, i.e., the phase exciting signal is generated by the CPU 401. If the phase exciting signal is not outputted, the detecting process of loss of synchronism is ended; whereas if the phase exciting signal is outputted, the sequence goes to a step S92.

If the stepping motor 301 is being rotated, in the step S92, the value of the electrical current value It supplied to the stepping motor 301 and read-in in the previous processing is retarded to Ttb, and the sequence goes to a step S93.

In the step S93, a value measured by the electrical current sensor 403 of the driving circuit 402 for measuring the electrical current value being presently supplied to the stepping motor 301 is A/D-converted, and the converted value is read-in in the CPU 401. After the reading-in of the digital value, the sequence goes to a step S94.

In the step S94, the digital value read-in in the CPU 401 in the step S93 is stored in the variable It, and the then, sequence goes to a step S95.

In the step S95, a difference between the electrical current value It read-in the step S93 and the value of Itb storing the electrical current value measured and read-in before the time dT is determined, and further, a value obtained by dividing the difference by dT which is electrical current measurement period is stored in the variable dI and calculation is effected. The calculated dI is an electrical current increasing ratio (per unit time) of the stepping motor 301. Then, the sequence goes to a step S96.

In the step S96, the electrical current increasing ratio dI to be supplied to the stepping motor 301 and calculated in the step S95 is compared with the threshold value dIf of the electrical current increasing ratio. If the value dI is above the threshold value dIf, the sequence goes to a step S97. On the other hand, if the value dI is smaller than the threshold value dIf, it is judged that the loss of synchronism of the stepping motor 301 is generated, and the sequence goes to a step S98.

In the step S97, since the present electrical current increasing ratio exceeds the threshold value, the increment of the value of the counter CNT is effected, and the sequence goes to a step S99.

In the step S98, since the present electrical current increasing ratio is smaller than the threshold value, the value of the counter CNT is initialized to zero, and the detecting process of loss of synchronism is ended.

In the step S99, the counter CNT recording the number in which the electrical current increasing ratio exceeds the threshold value continuously is compared with the threshold value CNTf for Judging the loss of synchronism. If CNT is above CNTf, it is judged that the loss of synchronism of the stepping motor is generated, and the sequence goes to a step S100. On the other hand, if CNT is smaller than CNTf, it is judged that there is no loss of synchronism, and the detecting process of loss of synchronism is ended.

In the step S10, since it is judged that the loss of synchronism of the stepping motor 301 is generated, MtrErr is set to 1 in order to inform other processes of the loss of synchronism of the stepping motor 301 Thereafter, the detecting process of loss of synchronism is ended.

Figure 16:
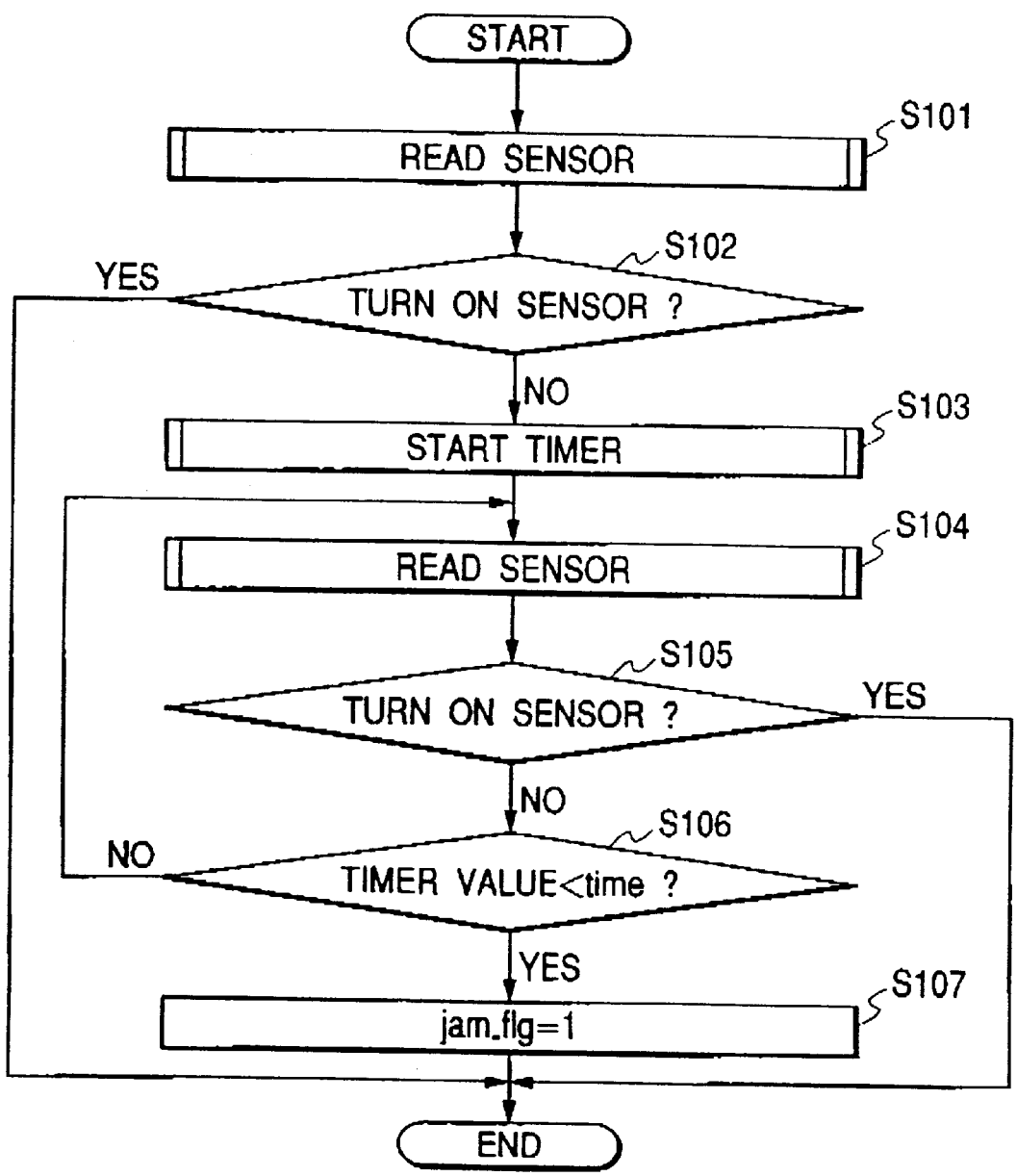
FIG. 16 is a flow chart showing a sequence of a sheet jam detecting process in the fourth embodiment.

Next, a process for detecting presence/absence of the paper in the sheet conveying apparatus will be explained with reference to FIG. 16 This process is called out when the paper is conveyed and it is judged that the loss of synchronism of the stepping motor 301 is generated in the step S100 of FIG. 15.

A jam detecting process in the sheet conveying apparatus will now described with reference to FIG. 16. With the arrangement shown in FIG. 11, this process is called out at a timing slightly faster than an ideal time when the sheet detecting sensor 303 disposed immediately behind the sheet conveying rollers 302 is turned ON, by the controlling portion of the image forming apparatus.

A variable "time" shows a time from when this process is started to when the sheet jam is judged by the sensor 303, and a variable "jam_flg" shows whether or not the jam is judged on the basis of the state of the sensor 303. When this process is started, the sequence goes to a step S101.

In the step S101, the output signal of the photo-interrupter 304 is read, i.e., it is judged whether there is the paper on the sheet detecting sensor 303. Thereafter, the sequence goes to a step S102.

In the step S102, on the basis of the state of the sheet detecting sensor 303 in the previous step S101, the process is branched. That is to say, if there is the recording paper on the sheet detecting sensor 303, since the paper has reached the position of the sheet detecting sensor 303, the process is ended. On the other hand, if there is no recording paper on the sheet detecting sensor 303, the sequence goes to a step S103.

In the step S103, since the paper does not reach the position of the sheet detecting sensor 303 immediately after the process is started, the timer device for measuring whether or not the paper is detected by the sheet detecting sensor 303 till the reference time stored in the variable time is started. After the timer is started, the sequence goes to a step S104.

In the step S104, the output signal of the photo-interrupter 304 is read, i.e., it is judged whether there is the paper on the sheet detecting sensor 303. Thereafter, the sequence goes to a step S105.

In the step S105, on the basis of the state of the sheet detecting sensor 303 in the previous step S101, the process is branched. That is to say, if there is the recording paper on the sheet detecting sensor 303, since the paper has reached the position of the sheet detecting sensor 303, the process is ended. On the other hand, if there is no recording paper on the sheet detecting sensor 303, the sequence goes to a step S106.

In the step S106, the count time of the timer device is compared with the value of the variable time, thereby judging whether the reference time is reached from the start of the process. If the count time does not reach the value of the variable time, the sequence from the step S104 to the step S106 is repeated. On the other hand, if count time becomes equal to or exceeds the value of the variable time, the sequence to a step S107.

In the step S107, within the time period from the time at which the process is started (i.e., from time slightly faster than the time at which the sheet detecting sensor 303 disposed immediately behind the sheet conveying roller 302 is turned ON) to the reference time, since the paper cannot be detected by the sheet detecting sensor 303, the fact that the paper is stopped in front of the sensor is indicated, while the sheet feeding operation is being operated. Accordingly, the variable jam_flg indicating the occurrence of the jam is set to 1, and the process is ended.

Figure 17:
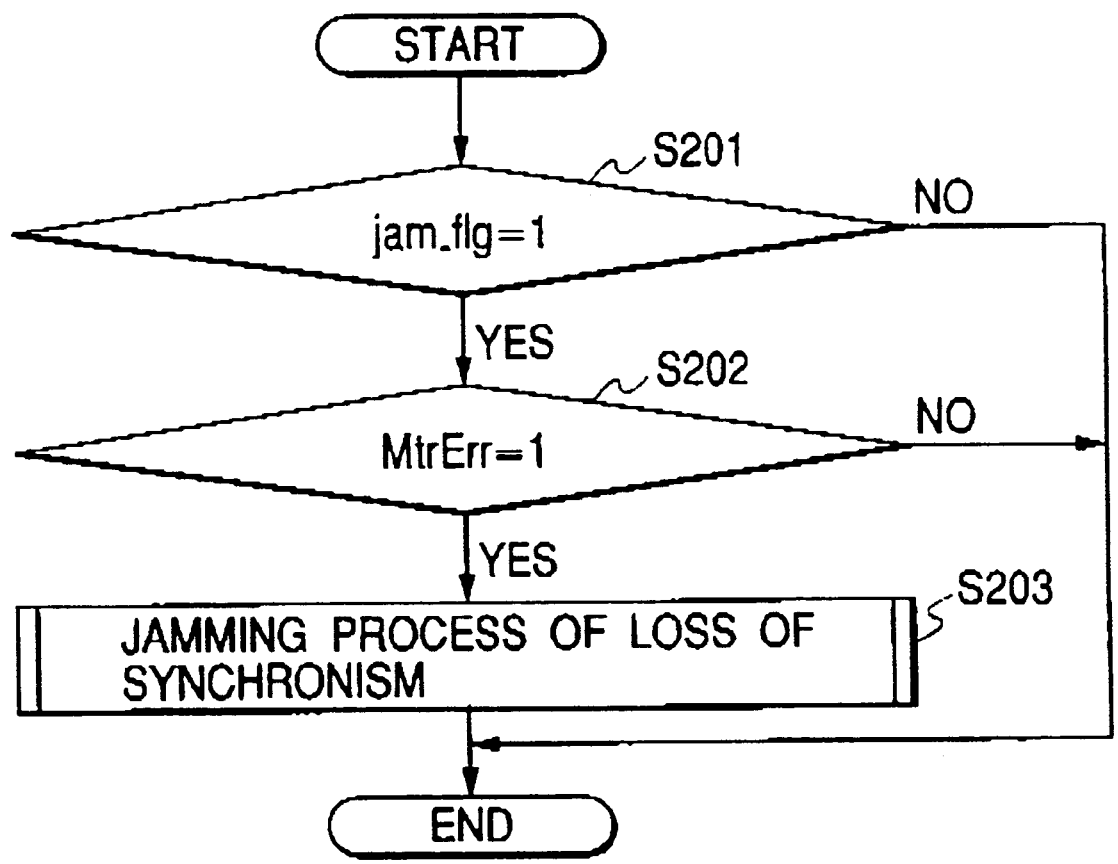
FIG. 17 is a flow chart showing a sequence of a Jam detecting process of loss of synchronism in the fourth embodiment.

Next, the jam judging process of loss of synchronism in the sheet conveying apparatus will be explained with reference to FIG. 17. This process is effected at constant intervals when the stepping motor 301 is being driven to convey the paper by the sheet conveying apparatus. When the process is started, first of all, the sequence goes to a step S201.

In the step S201, the state of the variable MtrErr indicating the judgement of the loss of synchronism of the stepping motor 301 in the detecting process of loss of synchronism explained in connection with FIG. 15, thereby branching the process. That is to say, if the value of the variable MtrErr is 1, the sequence goes to a step S203; whereas, if the value of the variable MtrErr is not 1, the process is ended.

In the step S203, since it is judged that the jam is generated on the sheet detecting sensor 303 and that the loss of synchronism of the stepping motor 301 is generated, it is judged that the jam is generated on the basis of the loss of synchronism of the stepping motor, and the jamming process of loss of synchronism is started.

In the jamming process of loss of synchronism, the fact that the jam is generated on the basis of the loss of synchronism is informed to the user through information transmitting means such as an operating portion.

As mentioned above, in the image forming apparatus in which the stepping motor according to the illustrated embodiment is used as the drive source for sheet conveyance, by detection of the loss of synchronism effected by the motor driving apparatus and detection of the jam effected by the sensor, it can be discriminated whether the jam is caused on the basis of the loss of synchronism of the stepping motor or not.

Fifth Embodiment

Figure 18:
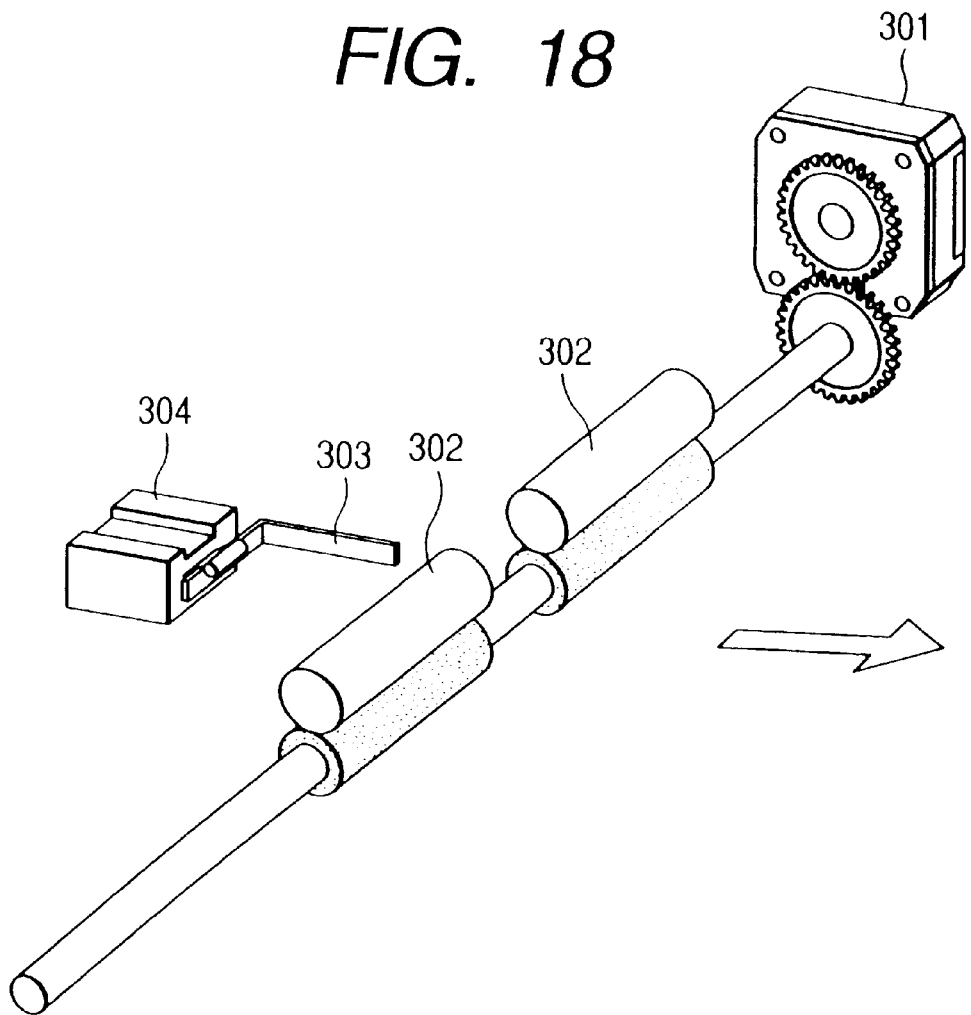
FIG. 18 is a detailed constructional view of a sheet conveying apparatus according to a fifth embodiment of the present invention in the image forming apparatus of the present invention.
Figure 19:
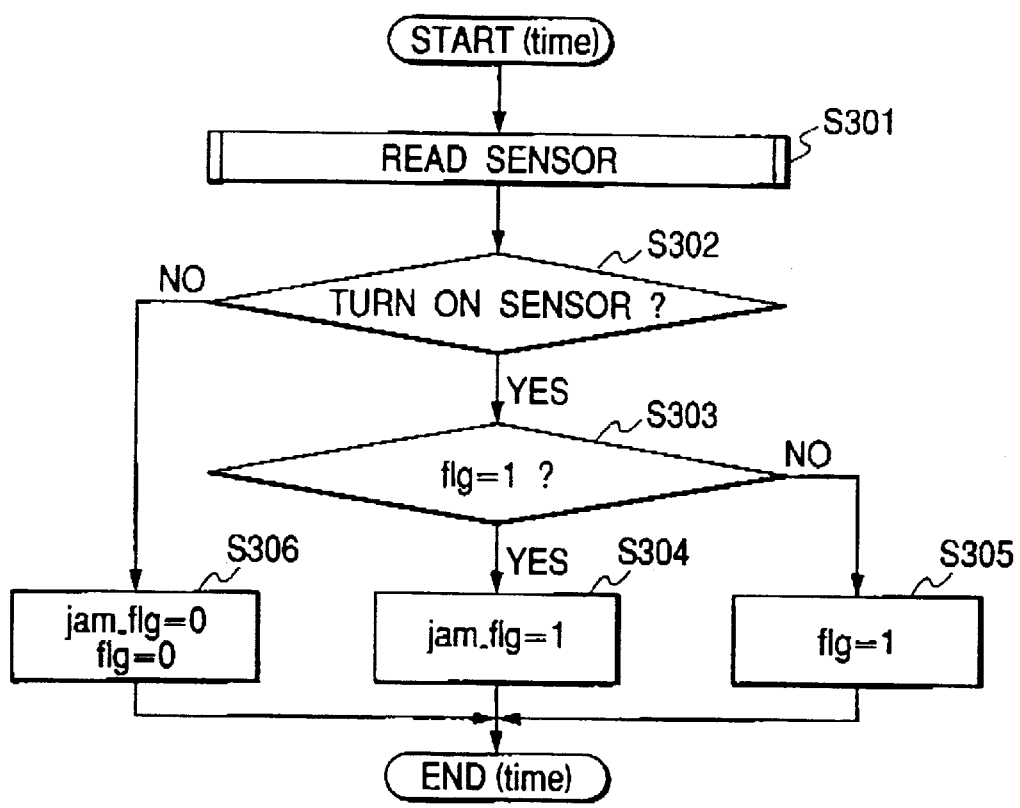
FIG. 19 is a flow chart showing a sequence of a jam detecting process in the fifth embodiment.

FIG. 18 is a detailed constructional view of a sheet conveying apparatus according to a fifth embodiment of the present invention in the image forming apparatus of the present invention, and FIG. 19 is a flow chart showing a sequence of a Jam detecting process in this embodiment. In the fourth embodiment, while an example that the sheet detecting sensor 303 is disposed immediately behind the sheet conveying rollers 302 was explained, in the fifth embodiment, as shown in FIG. 18, the sheet detecting sensor 303 is disposed in front of the sheet conveying rollers 302. Accordingly, as shown in FIG. 19, the jam detecting operation differs from that in the fourth embodiment. However, since the other constructions (FIGS. 10 and 12) and the detecting operation of loss of synchronism (FIGS. 14, 15 and 17) are the same as those in the fourth embodiment, explanation thereof will be omitted. Now, the image forming apparatus according to the fifth embodiment will be explained with reference to FIGS. 18 and 19.

Sheet conveying rollers 302 serve to apply a force to the recording paper to be actually conveyed, thereby conveying the recording paper. The sheet conveying rollers 302 receive a driving force from the stepping motor 301 via gears and a shaft.

A sheet detecting sensor 303 is associated with a photo-interrupter 304 serving to convert response of the sheet detecting sensor into an electrical signal. Although the paper is passed in a direction shown by the arrow, the sheet detecting sensor is disposed in front of the sheet conveying rollers. When a leading end of the paper is passed by the sheet detecting sensor 303, one end of the sheet detecting sensor 303 is pushed and the other end of the sensor blocks a path between a light emitting portion and a light receiving portion of the photo-interrupter 304.

A distance between the sheet detecting sensor 303 and the sheet conveying rollers 302 is selected to be smaller than a length of a smallest recording paper available in the image forming apparatus so that, when the stepping motor 301 is operated correctly to drive the sheet conveying rollers 302, within a predetermined time period after the paper is detected by the sheet detecting sensor 303, paper detection is OFF.

When the path between the light emitting portion and the light receiving portion of the photo-interrupter 304 is blocked, an output signal from the photo-interrupter 304 is changed. The controlling portion of the image forming apparatus monitors the signal of the photo-interrupter 304 at predetermined time intervals, so that, when the output signal is changed, it is judged that the paper is detected.

In the fifth embodiment, if the signal from the photo-interrupter 304 is the output signal indicating detection of the paper for the predetermined time period, it is judged that the jam occurs.

Next, the jam detecting process in the sheet conveying apparatus according to the fifth embodiment will be explained with reference to FIG. 19. While the sheet conveyance is being effected, this process is performed for every times stored in the variable time. The values stored in the variable time different times in according to sizes of sheets to be conveyed by the sheet conveying apparatus and set by the controlling portion.

Further, a variable "flg" is a variable indicating whether the paper is detected by the sheet detecting sensor 303 before the time stored in the variable time, and a variable "jam_flg" shows whether or not the jam is judged on the basis of the state of the sensor 303. When this process is started by the timer device, the sequence goes to a step S301.

In the step S301, the output signal of the photo-interrupter 304 is read, i.e., it is judged whether there is the paper on the sheet detecting sensor 303. Thereafter, the sequence goes to a step S302.

In the step S302, on the basis of the state of the sheet detecting sensor 303 in the previous step S301, the process is branched. That is to say, if there is the recording paper on the sheet detecting sensor 303, the sequence goes to a step S303. On the other hand, if there is no recording paper on the sheet detecting sensor 303, the sequence goes to a step S306.

In the step S303, on the basis of the state of the variable flg, the process is branched. That is to say, if the variable flg is 1, there is a condition that the paper is detected by the sheet detecting sensor 303 before the time stored in the variable time. In this case, the sequence goes to a step S304. On the other hand, if the variable flg is not 1, there is a condition that the paper is not detected by the sheet detecting sensor 303 before the time stored in the variable time. In this case, the sequence goes to a step S305.

In the step S304, it is judged that the paper still exists on the sheet detecting sensor 303 within the time stored in the variable time. Accordingly, it is judged that the paper is stopped in the vicinity of the sensor 303 while the paper is being conveyed, and, accordingly, it is judged that the jam occurs at the position of the sheet detecting sensor 303. Since the jam is judged, the variable jam_flg is set to 1.

In the step S305, since the paper is not detected by the sheet detecting sensor 303 before the time stored in the variable time, the jam does not occur. Further, since it is judged whether the jam occurs or not on the basis of the state of the sheet detecting sensor 303, the variable flg is set to 1.

In the step S306, since there is no paper on the sheet detecting sensor 303, the variables are initialized.

After the steps S304, S305 and S306 are finished, the process is ended, and, after the time stored in the variable time, the process is called out.

As mentioned above, since the motor controlling apparatus for driving the stepping motor incorporated into the image forming apparatus is provided with the loss of synchronism detecting means for measuring the electrical current increasing ratio of the electrical current supplied to the motor and for judging that the loss of synchronism of the stepping motor is generated if the electrical current increasing ratio exceeds the threshold value, detection of loss of synchronism can be effected only by the motor driving apparatus incorporated into the image forming apparatus.

On the other hand, there is provided means for judging that the sheet is not conveyed and for emitting the jam occurrence signal if the sheet is not detected by the sheet detecting sensor disposed immediately behind the sheet conveying roller driven by the stepping motor along the sheet passing direction in the sheet conveying path within the predetermined time period from the time at which the sheet is to be detected, and it is designed so that, when the controlling device of the image forming apparatus receives the loss of synchronism signal and the jam occurrence signal substantially simultaneously, it is judged that the jam occurs on the basis of the loss of synchronism of the stepping motor. With this arrangement, if the jam occurs, it is possible to discriminate whether the cause of the jam is the loss of synchronism of the stepping motor or other factors.

Further, there is provided means for judging that the sheet is not conveyed and for emitting the jam occurrence signal if sheet detecting condition of the sheet detecting sensor is continued for the predetermined time period immediately after the sheet is detected by the sheet detecting sensor disposed in front of the sheet conveying roller driven by the stepping motor, and it is designed so that, when the controlling device of the image forming apparatus receives the loss of synchronism signal and the jam occurrence signal substantially simultaneously, it is judged that the jam occurs on the basis of the loss of synchronism of the stepping motor. With this arrangement, if the jam occurs, it is possible to discriminate whether the cause of the jam is the loss of synchronism of the stepping motor or other factors.

Furthermore, the motor driving apparatus in which, if the electrical current increasing ratio exceeds the threshold value continuously by the predetermined number or more, it is judged that the loss of synchronism is generated is provided. With this arrangement, if the electrical current increasing ratio temporarily exceeds the threshold value for any reason other than the loss of synchronism of the stepping motor, this fact can be eliminated from the judgement of the loss of synchronism, thereby judging the loss of synchronism with higher accuracy.

Sixth Embodiment

In the fourth and fifth embodiments, while an example that detecting process of the loss of synchronism of the stepping motor and the detecting process of the jam in the image forming apparatus are carried out in consideration of the increasing ratio of the electrical current supplied to the stepping motor was explained.

Now, an embodiment in which such detecting processes are carried out in consideration of the number of constant electrical current chopping for driving the stepping motor will be explained.

Incidentally, the constructions of the image forming apparatus sheet conveying apparatus and motor driving apparatus are the similar to those in the fourth embodiment explained in connection with FIGS. 10 to 12. Further, the property of the electrical current supplied to the stepping motor is similar to that shown in FIGS. 13A and 13B.

As mentioned above, FIG. 13A is a graph showing the electrical current response when the stepping motor 301 is rotated correctly, and FIG. 13B is a graph showing the electrical current response when the loss of synchronism is generated. In the graphs, the reference numeral 501 denotes the phase exciting signal applied to the driving circuit; 502 denotes the electrical current response when the stepping motor is rotated correctly; and 503 denotes the electrical current response when the loss of synchronism is generated.

By observing the graph 502 given when the stepping motor is rotated correctly, it can be seen that the electrical current supplied to the stepping motor is increased relatively gently, and, accordingly, the number of chopping of the driving circuit is relatively small. On the other hand, by observing the graph 503 given when the loss of synchronism of the stepping motor is generated, it can be seen that the electrical current supplied to the stepping motor is increased relatively abruptly, and accordingly, the number of chopping of the driving circuit is relatively great.

From the above fact, it can be seen that the number of chopping of the driving circuit in the electrical current supplied to the stepping motor tends to increase in the loss of synchronism more than in the normal operation. That is to say, the detection of the loss of synchronism of the stepping motor can be effected by always monitoring the number of chopping during the operation of the stepping motor and by assuming the occurrence of the loss of synchronism if the number of chopping exceeds a certain reference number and by sending a loss of synchronism signal.

However, it is considered that the number of chopping of the driving circuit is varied with other factors (than the loss of synchronism) such as dispersion in property of the stepping motor, increase in temperature of a body of the stepping motor or an atmosphere surrounding the stepping motor, or fluctuation in load of the stepping motor, and thus, it is considered that the number of chopping greater than the reference number can be observed intermittently.

If the number of chopping of the driving circuit is greater than the reference number for a sufficient time period, i.e., if the number of chopping is counted continuously by a predetermined second reference number or more, it is judged that the loss of synchronism of the stepping motor is generated.

Figure 20:
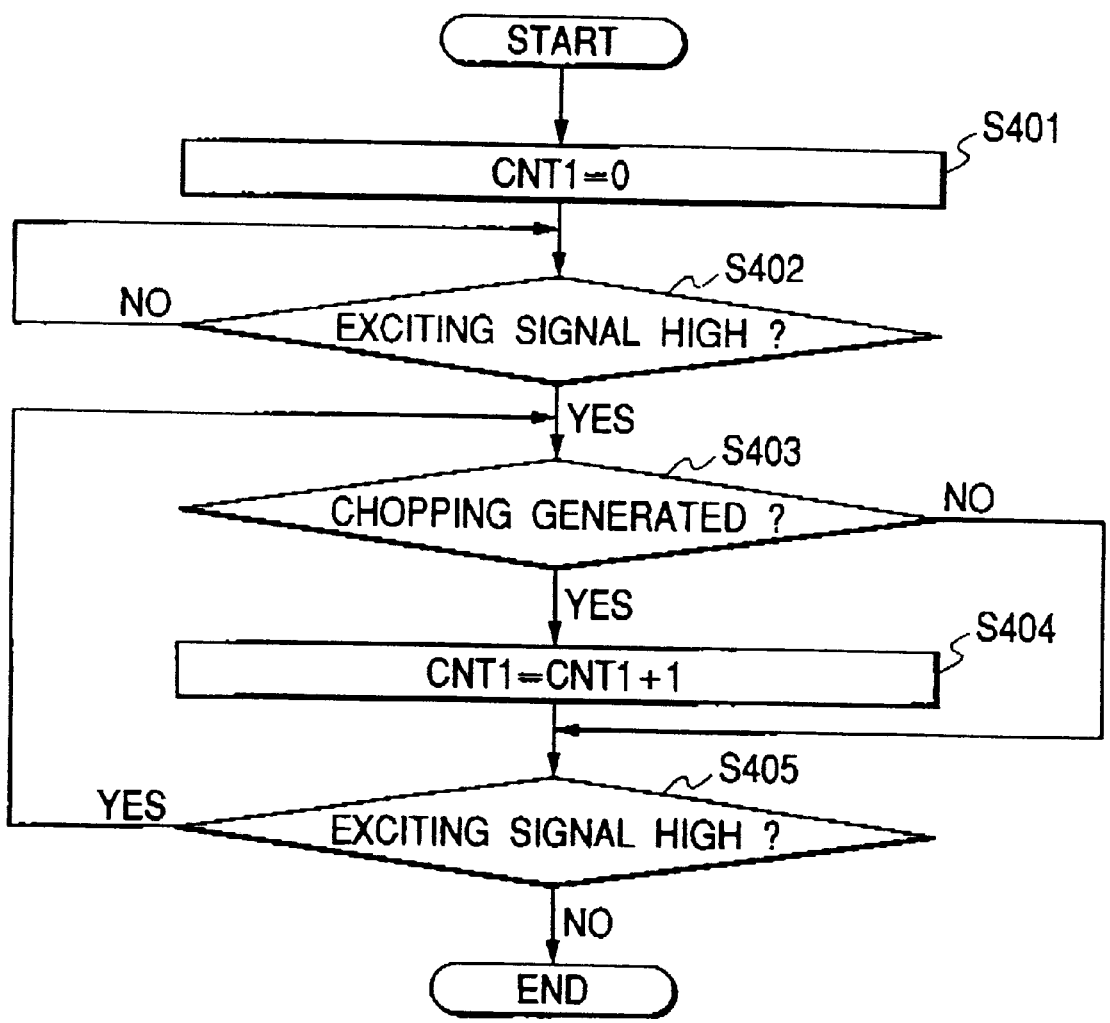
FIG. 20 is a flow chart showing a sequence for monitoring an exciting signal and for calling out a detecting process of loss of synchronism in the embodiment.
Figure 21:
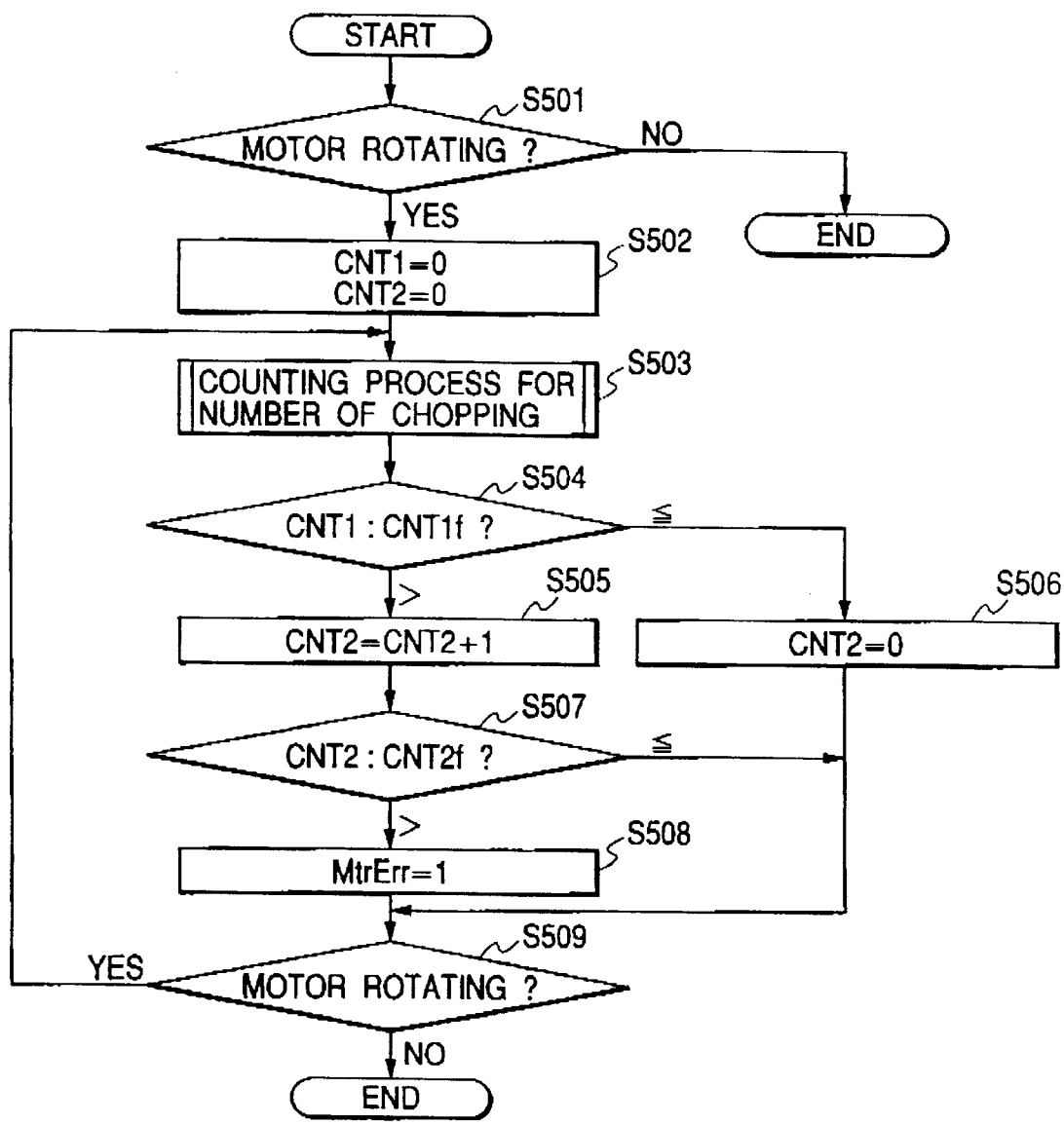
FIG. 21 is a flow chart showing a sequence of a detecting process of loss of synchronism in a sixth embodiment of the present invention.

Next, the actual processing flow of the loss of synchronism detecting means carried out by the CPU 401 will be explained with reference to flow charts. FIG. 20 is a flow chart for judging the calling out of the detecting process of loss of synchronism in the illustrated embodiment, and FIG. 21 is a flow chart showing the process for judging the detection of loss of synchronism in the illustrated embodiment.

Here, "CNT1" is a variable for recording the number of chopping when the phase exciting signal is in "HIGH" level, "CNT1f" is a variable for storing the reference number to be compared with CNT1 and used for judging the loss of synchronism, "CNT2" is a variable for recording the number that the CNT1 exceeds the CNT1f continuously, "CONT2f" is a variable for storing the reference number to be compared with CNT1 and used for judging the loss of synchronism, and "MtrErr" is a flag indicating the fact that the loss of synchronism of the stepping motor is detected.

FIG. 20 is a flow chart showing a counting process for number of chopping required for judging the detection of the loss of synchronism in the illustrated embodiment.

The counting process for number of chopping is called out from the detecting process of loss of synchronism during the rotation of the motor and serves to monitor the number of chopping under the constant electrical current control of the driving apparatus and to count such number. When the process is called out, the sequence goes to a step S401 (step is represented by "S" in the flow charts).

In the step S401, CNT1 as a counter for counting the number of chopping is initialized to zero. Then, the sequence goes to a step S402.

In the step S402, the state of the phase exciting signal is observed. If the phase exciting signal is in HIGH level, the sequence goes to a step S403; whereas, if the phase exciting signal is in LOW level, the sequence is waiting until the phase exciting signal becomes the HIGH level.

In the step S403, presence/absence of the chopping under the constant electrical current control of the driving apparatus is detected. If the chopping is generated, the sequence goes to a step S404; whereas, if the chopping is not generated, the sequence goes to a step S405.

In the step S404, the increment of CNT1 as the counter for counting the number of chopping is effected, and then, the sequence goes to the step S405.

In the step S405, the state of the phase exciting signal is observed. If the phase exciting signal is in HIGH level, the sequence is returned to the step S403; whereas, if the phase exciting signal is in LOW level, the counting process for number of chopping is ended.

In the above-mentioned process, the number of chopping at one period of the phase exciting is counted, and the value is stored in the counter CUT1.

Next, the detecting process of loss of synchronism based on the count of the number of chopping shown in FIG. 20 will be explained. FIG. 21 is a flow chart showing the detecting process of loss of synchronism in the illustrated embodiment. After the process is started, the sequence goes to a step S501.

In the step S501, it is judged whether the stepping motor 301 is being rotated. If the motor is being rotated, the sequence goes to a step S502. On the other hand, if the motor driving control is stopped, the detecting process of loss of synchronism is ended.

In the step S502, the counters CNT1, CNT2 are initialized. After the initialization, the sequence goes to a step S503.

In the step S503, the counting process for number of chopping explained in connection with FIG. 20 is called out. As mentioned above, in the counting process for number of chopping, the number of chopping at one period of the phase exciting is counted, and the value is stored in the CNT1, and the sequence is restored. After returned from the counting process for number of chopping, the sequence goes to a step S504.

In the step S504, the value of CNT1 indicating the number of chopping is compared with the CNT1f indicating the reference number. If CNT1 exceeds CNT1f, the sequence goes to a step S505. On the other hand, if CNT1 is smaller than CNT1f, the sequence goes to a step S506.

In the stop S505, increment of the value of CNT2 as second counting means for counting the number that CNT1 exceeds the reference number CNT1f continuously is effected, and then, the sequence goes to a step S507.

In the step S506, the value of CNT2 is initialized. After the initialization, the sequence goes to a step S509.

In the step S507, the value of CNT2 counting the number that CNT1 exceeds the first reference number CNT1f continuously is compared with the second reference number CNT2f. If CNT2 exceeds the reference number CNT2f, the sequence goes to a step S508. On the other hand, if CNT2 is smaller than the reference number CNT2f, the sequence goes to a step S509.

In the step S508, it is judged that the loss of synchronism of the stepping motor 301 is generated, and MtrErr is set to 1 in order to inform other processes of the loss of synchronism of the stepping motor 301. Thereafter, the detecting process of loss of synchronism is ended.

In the step S509, it is judged whether the stepping motor 301 is being rotated. If the motor is being rotated, the sequence is returned to the step S503, where the detecting process of loss of synchronism is continued until the motor is stopped. On the other hand, if the motor driving control is stopped, the detecting process of loss of synchronism is ended.

Figure 22:
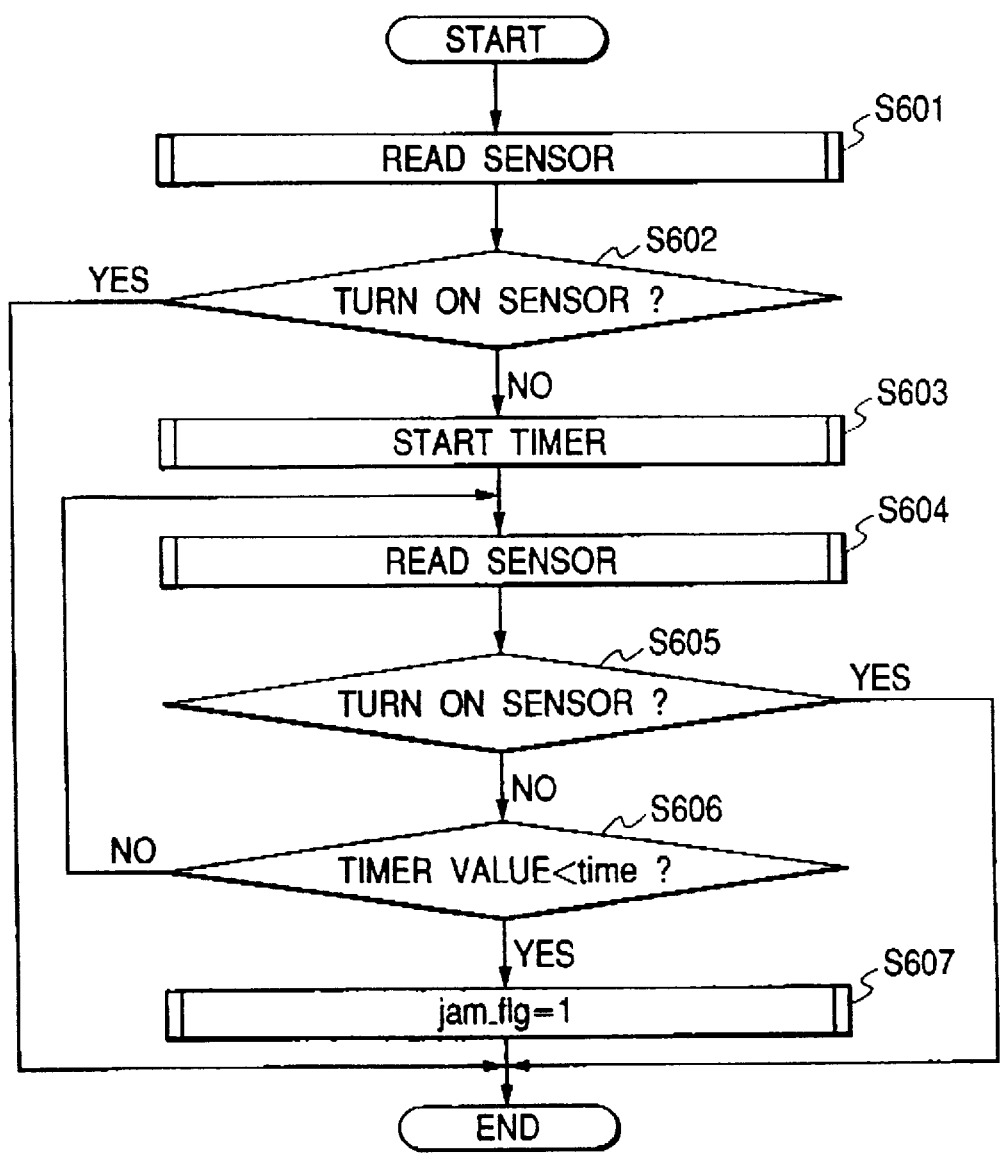
FIG. 22 is a flow chart showing a sequence of a jam detecting process in the sixth embodiment.

Next, the jam detecting process in the sheet conveying apparatus shown in FIG. 11 will be explained with reference to FIG. 22. This process is called out at a timing slightly faster than an ideal time when the sheet detecting sensor 303 disposed immediately behind the sheet conveying rollers 302 is turned ON, by the controlling portion of the image forming apparatus.

A variable "time" shows a time from when this process is started to when the sheet jam is judged by the sensor, and a variable "jam_flg" shows whether or not the jam is judged on the basis of the state of the sensor. When this process is started, the sequence goes to a step S601.

In the step S601, the output signal of the photo-interrupter 304 is read, i.e., it is Judged whether there is the paper on the sheet detecting sensor 303. Thereafter, the sequence goes to a step S602.

In the step S602, on the basis of the state of the sheet detecting sensor 303 in the previous step S601, the process is branched. That is to say, if there is the recording paper on the sheet detecting sensor 303, since the paper has reached the position of the sheet detecting sensor 303, the process is ended. On the other hand, if there is no recording paper on the sheet detecting sensor 303, the sequence goes to a step S603.

In the step S603, since the paper does not reach the position of the sheet detecting sensor 303 immediately after the process is started, the timer device for measuring whether or not the paper is detected by the sheet detecting sensor 303 till the reference time stored in the variable time is started. After the timer is started, the sequence goes to a step S604.

In the step S604, the output signal of the photo-interrupter 304 is read, i.e., it is judged whether there is the paper on the sheet detecting sensor 303. Thereafter, the sequence goes to a step S605.

In the step S605, on the basis of the state of the sheet detecting sensor 303 in the previous step S604, the process is branched. That is to say, if there is the recording paper on the sheet detecting sensor 303, since the paper has reached the position of the sheet detecting sensor 303, the process is ended. On the other hand, if there is no recording paper on the sheet detecting sensor 303, the sequence goes to a step S606.

In the step S606, the count time of the timer device is compared with the value of the variable time, thereby judging whether the reference time is reached from the start of the process. If the count time does not reach the value of the variable time, the sequence from the step S604 to the step S606 is repeated. On the other hand, if count time becomes equal to or exceeds the value of the variable time, the sequence goes to a step S607.

In the step S607, within the time period from the time at which the process is started (i.e., from time slightly faster than the time at which the sheet detecting sensor 303 disposed immediately behind the sheet conveying roller 302 is turned ON) to the reference time, since the paper cannot be detected by the sheet detecting sensor 303, the fact that the paper is stopped in front of the sensor is indicated, while the sheet feeding operation is being operated. Accordingly, the variable jam_flg indicating the occurrence of the jam is set to 1, and the process is ended.

Figure 23:
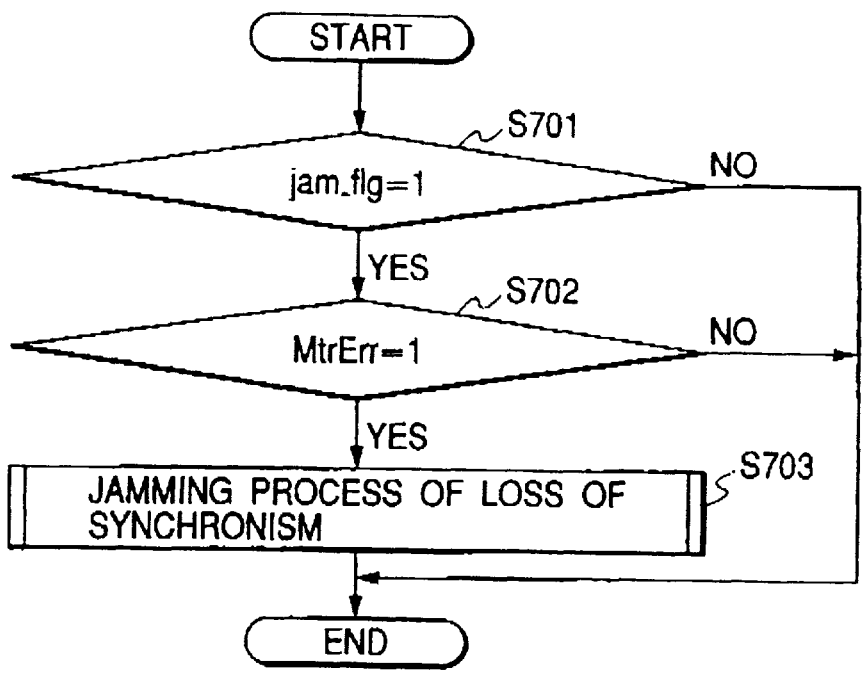
FIG. 23 is a flow chart showing a sequence of a jam detecting process of loss of synchronism in the sixth embodiment.

Next, the jam judging process of loss of synchronism in the sheet conveying apparatus will be explained with reference to FIG. 23. This process is effected at constant intervals when the stepping motor 301 is being driven to convey the paper by the sheet conveying apparatus. When the process is started, first of all, the sequence goes to a step S701.

In the step S701, the state of the variable jam_flg indicating the jam judgement of the jam detecting process is judged, thereby branching the process. That is to say, if the value of the variable jam_flg is 1, the sequence goes to a step S702; whereas, if the variable jam_flg is not 1, the process is ended.

In the step S702, the condition of the variable MtrErr indicating the judgement of the loss of synchronism of the stepping motor 301 in the detecting process of loss of synchronism explained in connection with FIG. 21 is judged, thereby branching the process. That is to say, if the value of the variable MtrErr is 1, the sequence goes to a step S703. On the other hand, if the value of the variable MtrErr is not 1, the process is ended.

In the step S703, since it is judged that the jam is generated on the sheet detecting sensor 303 and that the loss of synchronism of the stepping motor 301 is generated, it is judged that the jam is generated on the basis of the loss of synchronism of the stepping motor 301, and the jamming process of loss of synchronism is started In the jamming process of loss of synchronism, the fact that the jam is generated on the basis of the loss of synchronism is informed to the user through information transmitting means such as an operating portion.

As mentioned above, in the image forming apparatus in which the stepping motor according to the illustrated embodiment is used as the drive source for sheet conveyance, by detection of the loss of synchronism effected by the motor driving apparatus and detection of the jam effected by the sensor, it can be discriminated whether the jam is caused on the basis of the loss of synchronism of the stepping motor or not.

Seventh Embodiment

Figure 24:
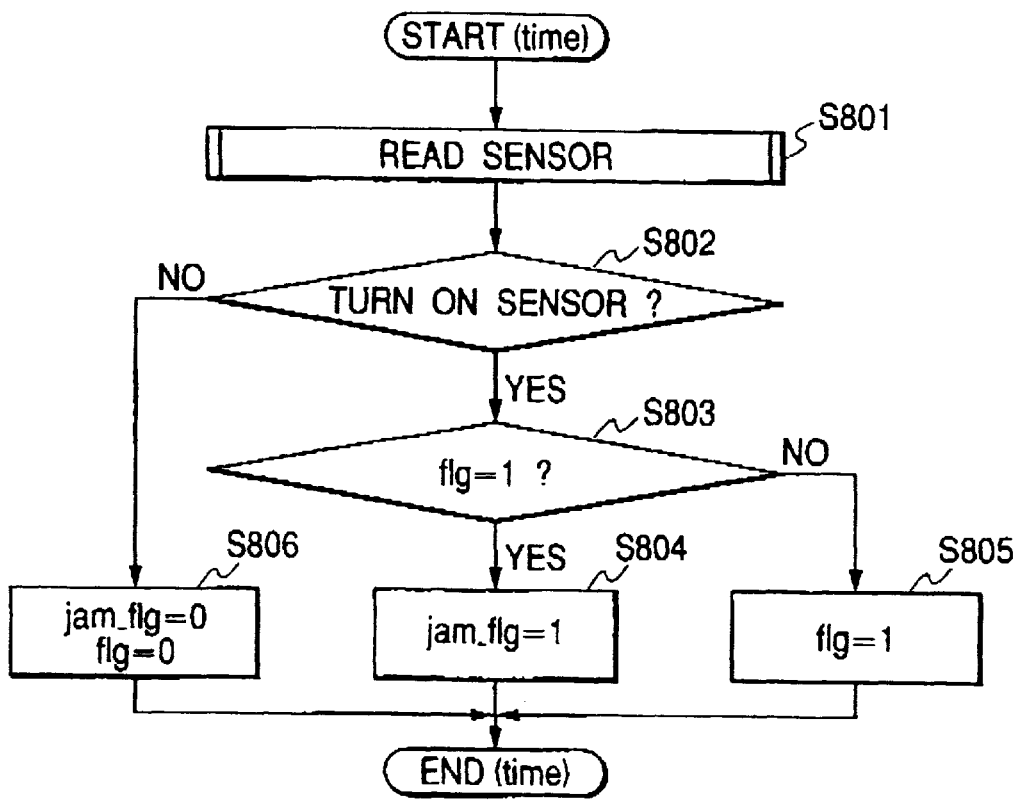
FIG. 24 is a flow chart showing a sequence of a jam detecting process in a seventh embodiment of the present invention.

FIG. 24 is a flow chart showing a sequence of a jam detecting process in a seventh embodiment of the present invention. In the sixth embodiment, while an example that the sheet detecting sensor 303 is disposed immediately behind the sheet conveying rollers 302 was explained, in the seventh embodiment, as is in the fifth embodiment shown in FIG. 18, the sheet detecting sensor 303 is disposed in front of the sheet conveying rollers 302. Accordingly, as shown in FIG. 24, the jam detecting operation differs from that in the sixth embodiment. However, since the other constructions (FIGS. 10 and 12) and the detecting operation of loss of synchronism (FIGS. 20, 21 and 23) are the same as those in the sixth embodiment, explanation thereof will be omitted. Next, the image forming apparatus according to the fifth embodiment will be explained with reference to FIGS. 18 and 24.

Now, the jam detecting process In the sheet conveying apparatus according to the seventh embodiment will be explained with reference to FIG. 24. While the sheet conveyance is being effected, this process is performed for every timers stored in the variable time by the timer device. The value stored in the variable time different timers in according to sizes of sheets to be conveyed by the sheet conveying apparatus and set by the controlling portion.

Further, a variable "flg" is a variable indicating whether the paper is detected by the sheet detecting sensor before the time stored in the variable time, and a variable "jam_flg" shows whether or not the jam is judged on the basis of the state of the sensor. When the process is started by the timer device, the sequence goes to a step S801.

In the step S808, the output signal of the photo-interrupter 304 is read, i.e., it is judged whether there is the paper on the sheet detecting sensor 303. Thereafter, the sequence goes to a step S802.

In the step S802, on the basis of the state of the sheet detecting sensor 303 in the previous step S801, the process is branched. That is to say, if there is the recording paper on the sheet detecting sensor 303, the sequence goes to a step S803. On the other hand, if there is no recording paper on the sheet detecting sensor 303, the sequence goes to a step S806.

In the step S803, on the basis of the state of the variable fig, the process is branched. That is to say, if the variable flg is 1, there is a condition that the paper is detected by the sheet detecting sensor 303 before the time stored in the variable time. In this case, the sequence goes to a step S804. On the other hand, if the variable flg is not 1, there is a condition that the paper is not detected by the sheet detecting sensor 303 before the time stored in the variable time. In this case, the sequence goes to a step S805.

In the step S804, it is judged that the paper still exists on the sheet detecting sensor 303 within the time stored in the variable time. Accordingly, it is judged that the paper is stopped in the vicinity of the sensor 303 while the paper is being conveyed, and, accordingly, it is judged that the jam occurs at the position of the sheet detecting sensor 303 Since the jam is judged, the variable jam_flg is set to 1.

In the step S805, since the paper is not detected by the sheet detecting sensor 303 before the time stored in the variable time, the jam does not occur. Further, since it is judged whether the jam occurs or not on the basis of the next state of the sheet detecting sensor 303, the variable flg is set to 1.

In the step S806, since there is no paper on the sheet detecting sensor 303, the variables are initialized.

After the steps S804, S805 and S806 are finished, the process is ended, and, after the time stored in the variable time, the process is called out.

Eighth Embodiment

Figure 25:
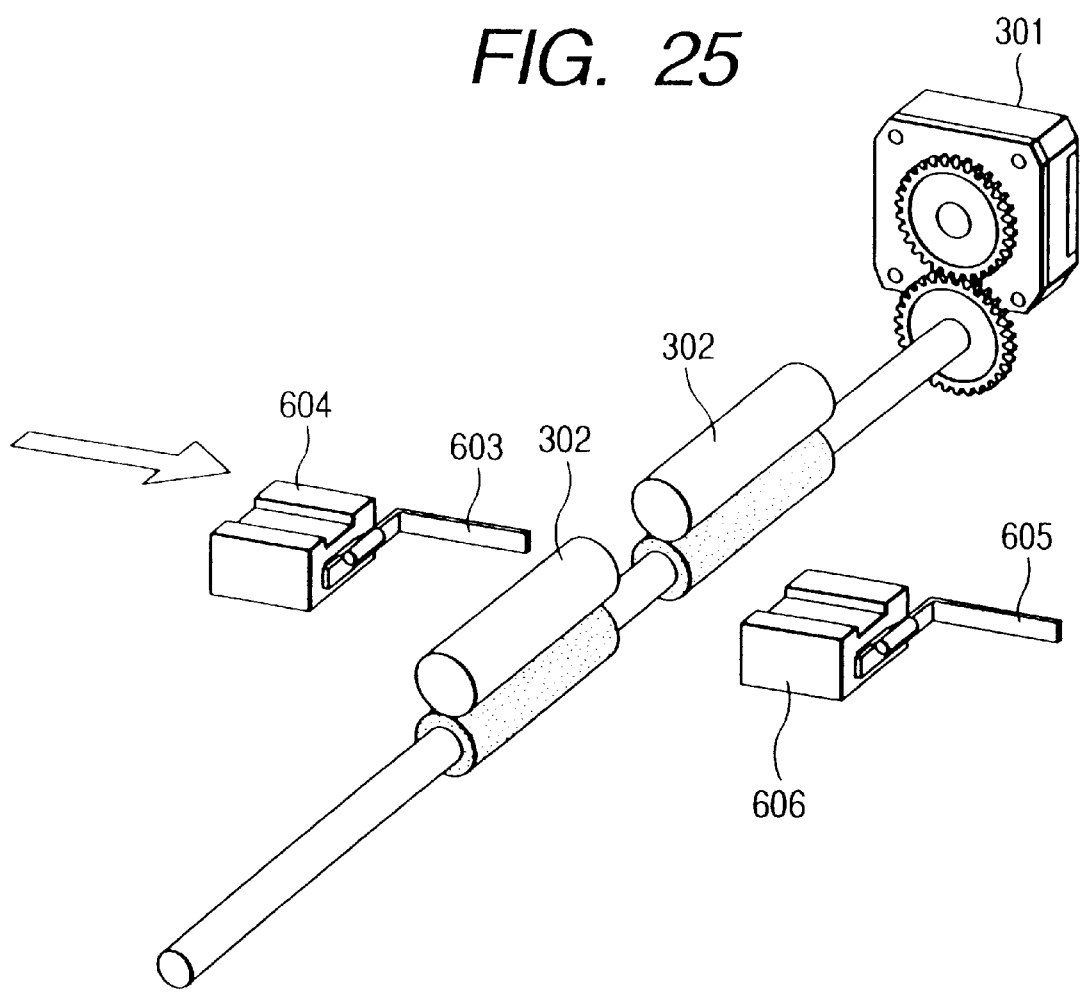
FIG. 25 is a detailed constructional view of a sheet conveying apparatus according to an eighth embodiment of the present invention in the image forming apparatus of the present invention.
Figure 26:
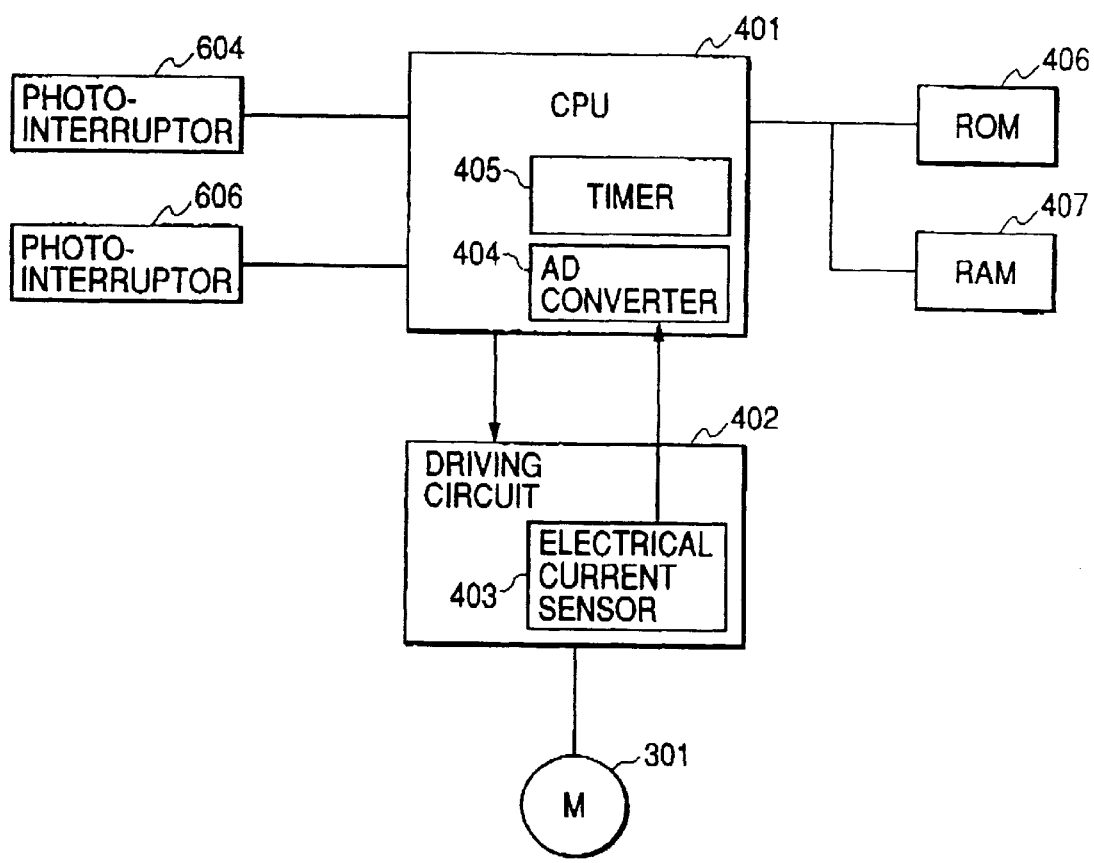
FIG. 26 is a constructional view of a stepping motor driving apparatus used as a drive source of the sheet conveying apparatus according to the eighth embodiment.
Figure 27:
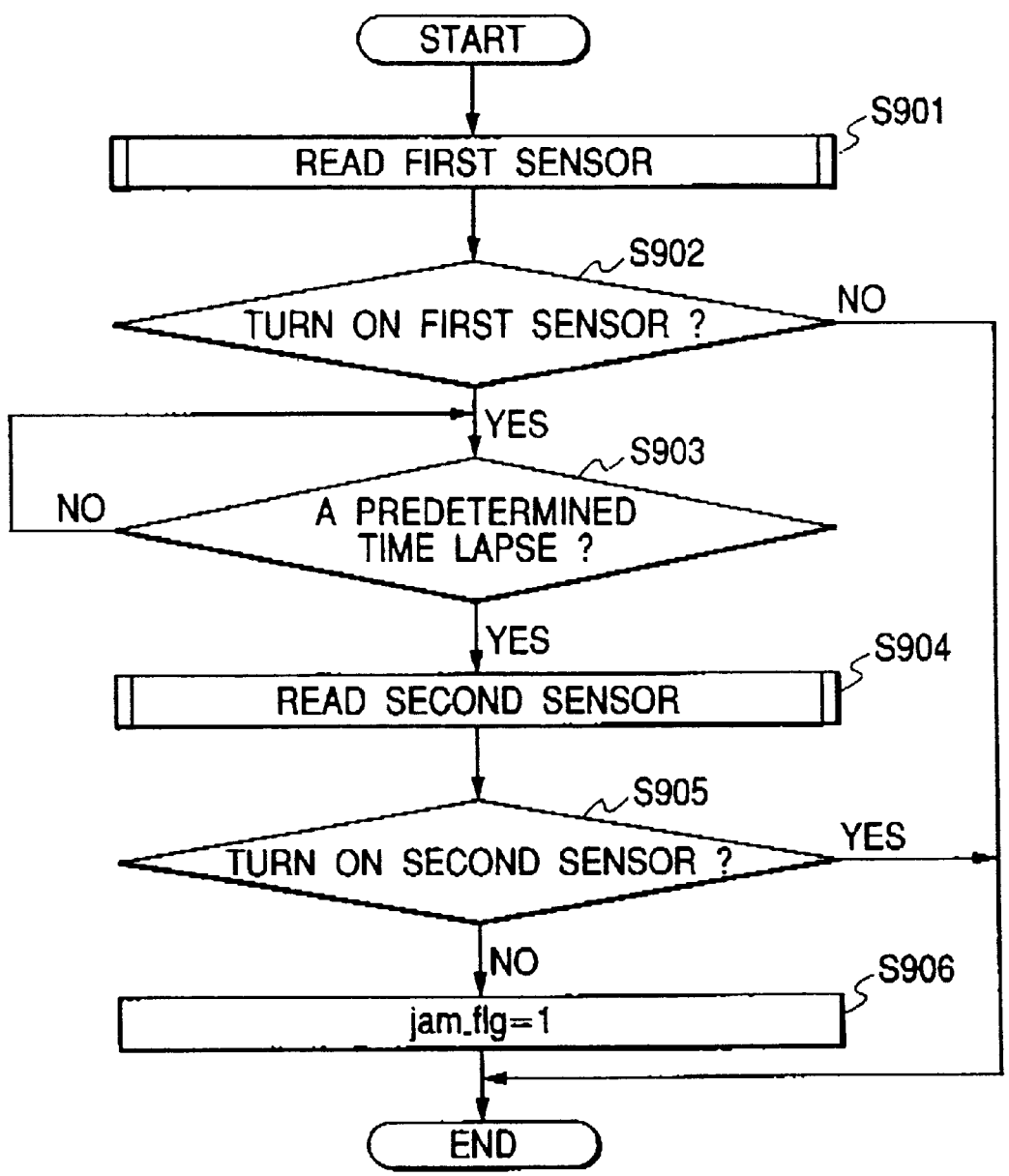
FIG. 27 is a flow chart showing a sequence of a jam detecting process in the eighth embodiment.

FIG. 25 is a detailed constructional view of a sheet conveying apparatus according to an eighth embodiment of the present invention in the image forming apparatus of the present invention, FIG. 26 is a constructional view of a motor driving apparatus, and FIG. 27 is a flow chart showing a sequence of a jam detecting process. Although the sheet detecting sensor 303 was disposed immediately behind the sheet conveying rollers 302 in the sixth embodiment and the sheet detecting sensor 303 was disposed in front of the sheet conveying rollers 302 in the seventh embodiment, in the eighth embodiment, two sheet detecting sensors 603, 605 are used, and the first sheet detecting sensor 603 is disposed in front of the sheet conveying rollers 302 and the second sheet detecting sensor 605 is disposed immediately behind the sheet conveying rollers 302. Accordingly, similar to the sixth and seventh embodiments, although the jam can be detected by using either one of the sheet detecting sensors, as shown in FIG. 27, the jam can be detected by using two sheet detecting sensors. Incidentally, the flow chart shown in FIG. 27 is merely an example that two sheet detecting sensors are used. Incidentally, since the other constructions (FIG. 10) and the detecting operation of loss of synchronism (FIGS. 20, 21 and 23) are the same as those in the aforementioned embodiment, explanation thereof will be omitted. Next, the image forming apparatus according to the eighth embodiment will be explained.

In FIG. 25, the sheet conveying rollers 302 serve to apply a force to the recording paper to be actually conveyed, thereby conveying the recording paper. The sheet conveying rollers 302 receive a driving force from the stepping motor 301 via gears and a shaft.

The sheet detecting sensors 603, 605 are associated with photo-interrupters 604, 606 serving to convert responses of the sheet detecting sensors into electrical signals. Although the paper is passed in a direction shown by the arrow, when a leading end of the paper is passed by the sheet detecting sensor 603 or 605, one end of the sheet detecting sensor 603 or 605 is pushed and the other end blocks a path between a light emitting portion and a light receiving portion of the photo-interrupter 604 or 606.

Distances between the sheet detecting sensors 603, 605 and the sheet conveying rollers 302 are selected to be smaller than a length of a smallest recording paper available in the image forming apparatus so that, when the stepping motor 301 is operated correctly to drive the sheet conveying rollers 302, sheet detection becomes OFF when a predetermined time period is elapsed after the paper is detected by the sheet detecting sensor 603, and the paper is detected by the sheet detecting sensor 605 when a predetermined time period is elapsed after the sheet conveying rollers 302 start to convey the paper.

When the paths between the light emitting portion and the light receiving portion of the photo-interrupters 604 and 606 are blocked, output signals from the photo-interrupters 604 and 606 are changed. The controlling portion of the image forming apparatus monitors the signals of the photo-interrupter 604 and 606 at predetermined time intervals, so that, when the output signals are changed, it is judged that the paper is detected.

In the eighth embodiment, as shown in FIG. 25, the sheet detecting sensors 603, 605 and the photo-interrupters 604, 606 are disposed in front of and behind the sheet conveying rollers 302, respectively to judge whether there is the paper on the sheet conveying rollers 302 or not.

In FIG. 12, the motor driving apparatus includes a stepping motor 301 to be controlled, a central processing unit (referred to as "CPU" hereinafter) 401 for outputting a driving signal for the stepping motor, a driving circuit 402 for supplying electrical current required for rotating the stepping motor, an electrical current sensor 403 for measuring an electrical current value, an A/D converter 404 for converting the electrical current value measured by the electrical current sensor into a digital signal processed by the CPU, a timer 405 for measuring a sufficiently short time, a ROM device 406 for storing motor control program, and a RAM device 407 which is temporarily used as a storing area by the CPU. The reference numerals 604, 606 denote the photo-interrupter.

Next, a jam detecting process in the sheet conveying apparatus according to the eighth embodiment will be explained with reference to FIG. 27.

In a step S901, the output signal of the photo-interrupter 604 associated with the first detecting sensor 603 is read, and then, the sequence goes to a step S902.

In the step S902, it is judged whether the first detecting sensor 603 is ON or not, i.e., it is judged whether there is the paper on the first sheet detecting sensor 603. If the first detecting sensor 603 is ON, the sequence goes to a step S903; whereas, if the first detecting sensor 603 is not ON, the process is ended.

In the step S903, after a previously set predetermined time period (time period till the paper is detected by the second detecting sensor 605 in the normal operation) is elapsed, the sequence goes to a step S904.

In the step S904, the second detecting sensor 605 is read, and then, the sequence goes to a step S905.

In the step S905, It is judged whether the second detecting sensor 605 is ON or not. If ON, it is judged that the normal (correct) operation is effected, and the process is ended; whereas, if not ON, it is judged that the jam occurs, and the sequence goes to a step S907.

In the step S907, the variable jam_flg indicating the occurrence of the jam is set to 1, and the process is ended.

As mentioned above, since the motor controlling apparatus for driving the stepping motor incorporated into the image forming apparatus is provided with means for measuring the number of chopping, and comparing means for comparing the measured number of chopping with the predetermined reference number, so that it is judged that the loss of synchronism is generated if the measured number of chopping exceeds the reference number, detection of loss of synchronism can be effected only by the motor driving apparatus incorporated into the image forming apparatus.

On the other hand, there is provided means for judging that the sheet is not conveyed and for emitting the jam occurrence signal if the sheet is not detected by the sheet detecting sensor disposed immediately behind the sheet conveying rollers driven by the stepping motor along the sheet passing direction in the sheet conveying path within the predetermined time period from the time at which the sheet is to be detected or if the sheet detecting condition of the sheet detecting sensor disposed immediately in front of the sheet conveying rollers driven by the stepping motor is continued to exceed the predetermined time period from the detection of the sheet or if the sheet is not detected by the second sheet detecting sensor immediately behind the sheet conveying rollers within the predetermined time period after the sheet is not detected by the second sheet detecting sensor immediately in front of the sheet conveying rollers driven by the stepping motor, and it is designed so that, when the controlling device of the image forming apparatus receives the loss of synchronism signal and the jam occurrence signal substantially simultaneously, it is judged that the jam occurs on the basis of the loss of synchronism of the stepping motor With this arrangement, if the jam occurs, it is possible to discriminate whether the cause of the jam is the loss of synchronism of the stepping motor or other factors.

Furthermore, the motor driving apparatus in which, if the number of chopping exceeds the predetermined reference number continuously becomes greater than the predetermined number, it is judged that the loss of synchronism is generated is provided. With this arrangement, if the number of chopping temporarily exceeds the reference number for any reason other than the loss of synchronism of the stepping motor, this fact can be eliminated from the judgement of the loss of synchronism, thereby judging the loss of synchronism with higher accuracy.

Ninth Embodiment

In the eighth embodiment, the jam detection of the paper conveyed by the driving of the stepping motor was explained. Now, in the sheet conveying apparatus according to the eighth embodiment shown in FIG. 25, an embodiment in which, if the loss of synchronism is generated, it is not regarded as error immediately, but re-conveyance of the paper is carried out will be explained.

Incidentally, since the construction of the image forming apparatus is the same as that shown in FIG. 10 and the sheet conveying apparatus and the motor driving apparatus are the same as those in the eighth embodiment shown in FIGS. 25 and 26, explanation thereof will be omitted.

Figure 28:
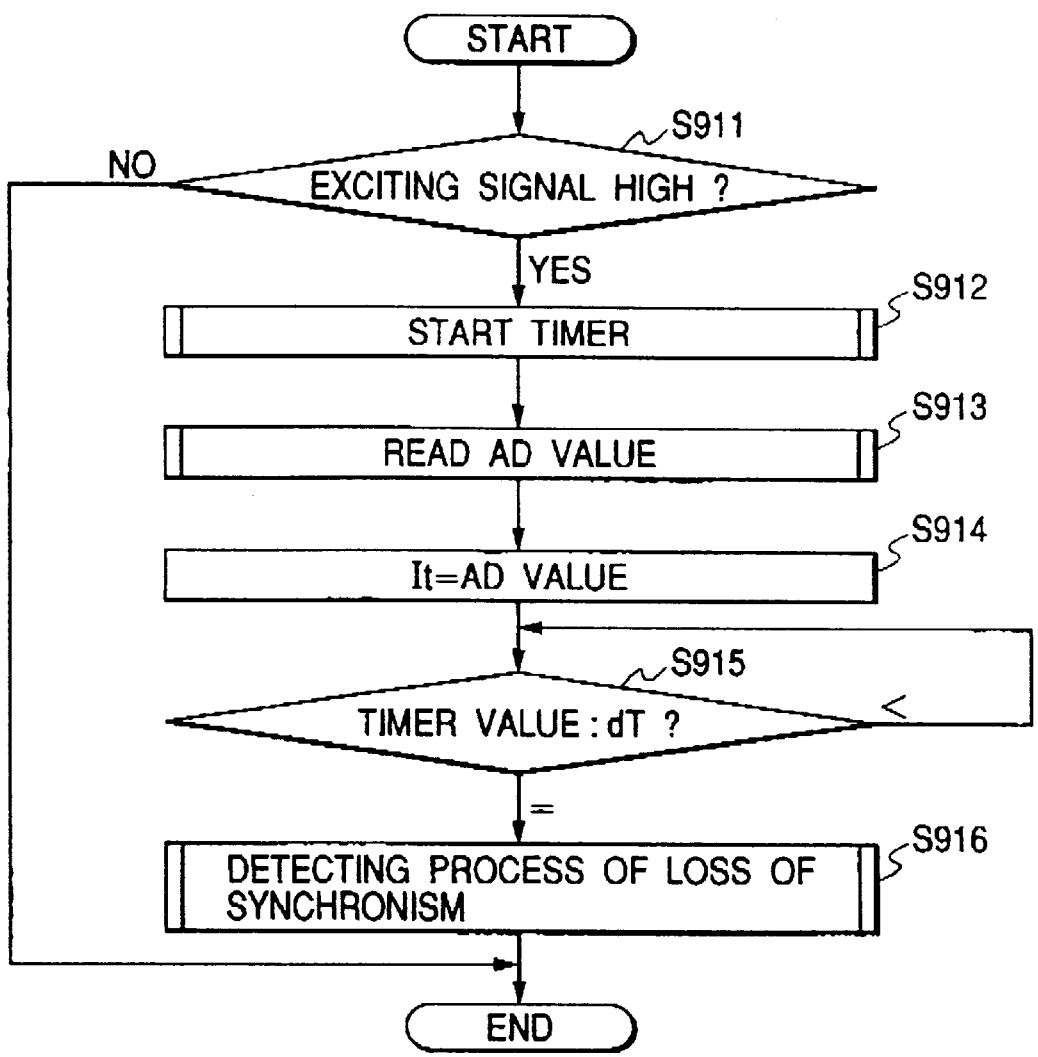
FIG. 28 is a flow chart showing a sequence for monitoring an exciting signal and for calling out a detecting process of loss of synchronism in a ninth embodiment of the present invention.
Figure 29:
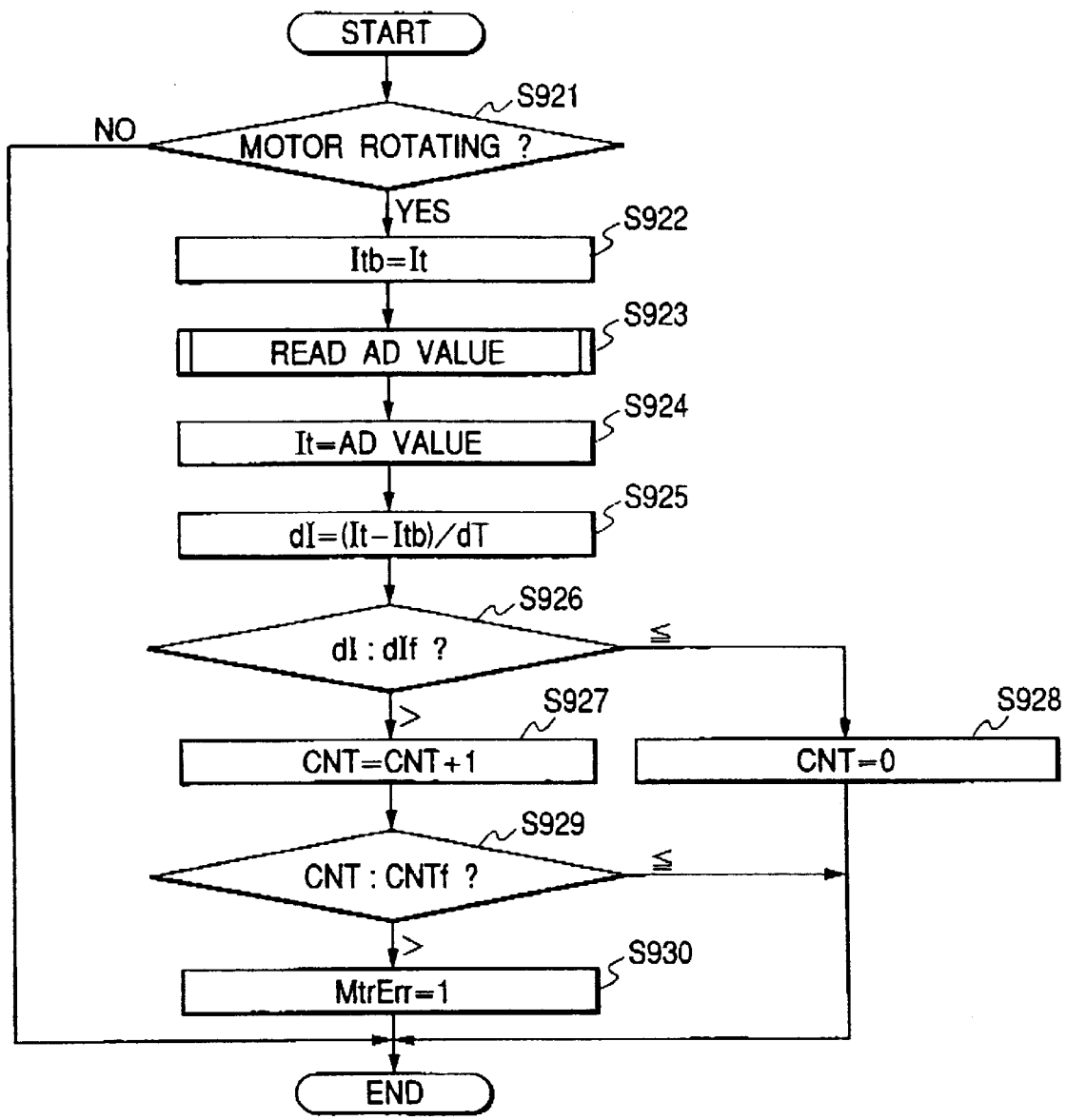
FIG. 29 is a flow chart showing a sequence of a jam detecting process of loss of synchronism in the ninth embodiment.

Next, the actual processing flow of the loss of synchronism detecting means carried out by the CPU 401 of FIG. 26 in the ninth embodiment will be explained with reference to flow charts. FIG. 28 is a flow chart for judging that calling out of the detecting process of loss of synchronism in the illustrated embodiment, and FIG. 29 is a flow chart showing the process for effecting the detection of loss of synchronism in the illustrated embodiment.

Here, "dT" is detecting process interval of loss of synchronism, "It" is an electrical current value being presently supplied to the stepping motor 101, "Itd" is an electrical current value at the time before dT from the present time, "dI" is an electrical current increasing ratio measured, "dIf" is a threshold value of the electrical current increasing ratio for judging the detection of loss of synchronism, "CNT" is a counter for counting the number in which the measured electrical current increasing amount exceeds the threshold value continuously, "CNTf" is a threshold value of the CNT value for judging detection of loss of synchronism, and "MtrErr" is a flag indicating the fact that the loss of synchronism of the stepping motor 301 is detected.

The judgement for calling out the detecting process of loss of synchronism is called out at a "HIGH" level timing in the period of the phase exciting signal and the process is started. After the starting, this process goes to a step S911 (step is represented by "S" in the flow charts). In the step S911, it is judged whether the phase exciting signal is "HIGH" level or not. If the phase exciting signal is "HIGH" level, the sequence goes to a step S912; whereas, if the phase exciting signal is "LOW" level, the sequence is ended.

In the step S912, the timer is started to measure the timing for effecting the detecting process of loss of synchronism. After the timer is started, the sequence goes to a step S913. In the step S913, a value measured by the electrical current sensor 403 of the driving circuit 402 for measuring the electrical current value being presently supplied to the stepping motor 301 is A/D-converted, and the converted value is read-in in the CPU 401. After the reading-in of the digital value, the sequence goes to a step S914.

In the step S914, the digital value read-in in the CPU 401 in the step S913 is stored in the variable It, and then, sequence goes to a step S915. In the step S915, the timer value of the timer started in the step S912 is compared with the predetermined detecting process interval dT of loss of synchronism, and the waiting process is performed until the timer value coincides with dT. When the timer value coincides with dT, the sequence goes to a step S916.

In the step S916, the detecting process of loss of synchronism is called out, and the detecting process of loss of synchronism shown in FIG. 29 is executed.

Next, the detecting process of loss of synchronism will be explained with reference to FIG. 29. The process is called out in the step S916 of FIG. 28, and the detecting process of loss of synchronism is started. After the process is started, the sequence goes to a step S921.

In the step S921, it is judged whether the stepping motor 301 is being rotated, i.e., the phase exciting signal is generated by the CPU 401. If the phase exciting signal is not outputted, the detecting process of loss of synchronism is ended; whereas if the phase exciting signal is outputted, the sequence goes to a step S922.

If the stepping motor 301 is being rotated, in the step S922, the value of the electrical current value It supplied to the stepping motor 301 and read-in in the previous processing is retarded to Itb, and the sequence goes to a step S923.

In the step S923, a value measured by the electrical current sensor 403 of the driving circuit 402 for measuring the electrical current value being presently supplied to the stepping motor 301 is A/D-converted, and the converted value is read-in in the CPU 401. After the reading-in of the digital value, the sequence goes to a step S924.

In the step S924, the digital value read-in in the CPU 401 in the step S923 is stored in the variable It, and the then, sequence goes to a step S925.

In the step S925, a difference between the electrical current value It read-in the step S923 and the value of Itb storing the electrical current value measured and read-in before the time dT is determined, and further, a value obtained by dividing the difference by dT which is electrical current measurement period is stored in the variable dI. The calculated dI is an electrical current increasing ratio (per unit time) of the stepping motor 301. Then, the sequence goes to a step S926.

In the step S926, the electrical current increasing ratio dI to be supplied to the stepping motor 301 and calculated in the step S925 is compared with the threshold value dIf of the electrical current increasing ratio. If the value dI is above the threshold value dIf, the sequence goes to a step S927. On the other hand, if the value dI is smaller than the threshold value dIf, it is judged that there is no loss of synchronism of the stepping motor 301, and the sequence goes to a step S928.

In the step S927, since the present electrical current increasing ratio exceeds the threshold value, the increment of the value of the counter CNT is effected, and the sequence goes to a step S929.

In the step S928, since the present electrical current increasing ratio is smaller than the threshold value, the value of the counter CNT is initialized to zero, and the detecting process of loss of synchronism is ended.

In the step S929, if the value of the counter CNT recording the number in which the electrical current increasing ratio exceeds the threshold value continuously is compared with the counter threshold value CNTf for judging the loss of synchronism. If CNT is above CNTf, it is judged that the loss of synchronism of the stepping motor 301 is generated, and the sequence goes to a step S930. On the other hand, if CNT is smaller than CNTf, it is judged that there is no loss of synchronism, and the detecting process of loss of synchronism is ended.

In the step S930, since it is judged that the loss of synchronism is generated, a sheet presence/absence detecting process for detecting presence/absence of the paper by the sensors 603, 605 disposed in front of and behind the sheet conveying rollers 302 is performed. Thereafter, the detecting process of loss of synchronism is ended.

Figure 30:
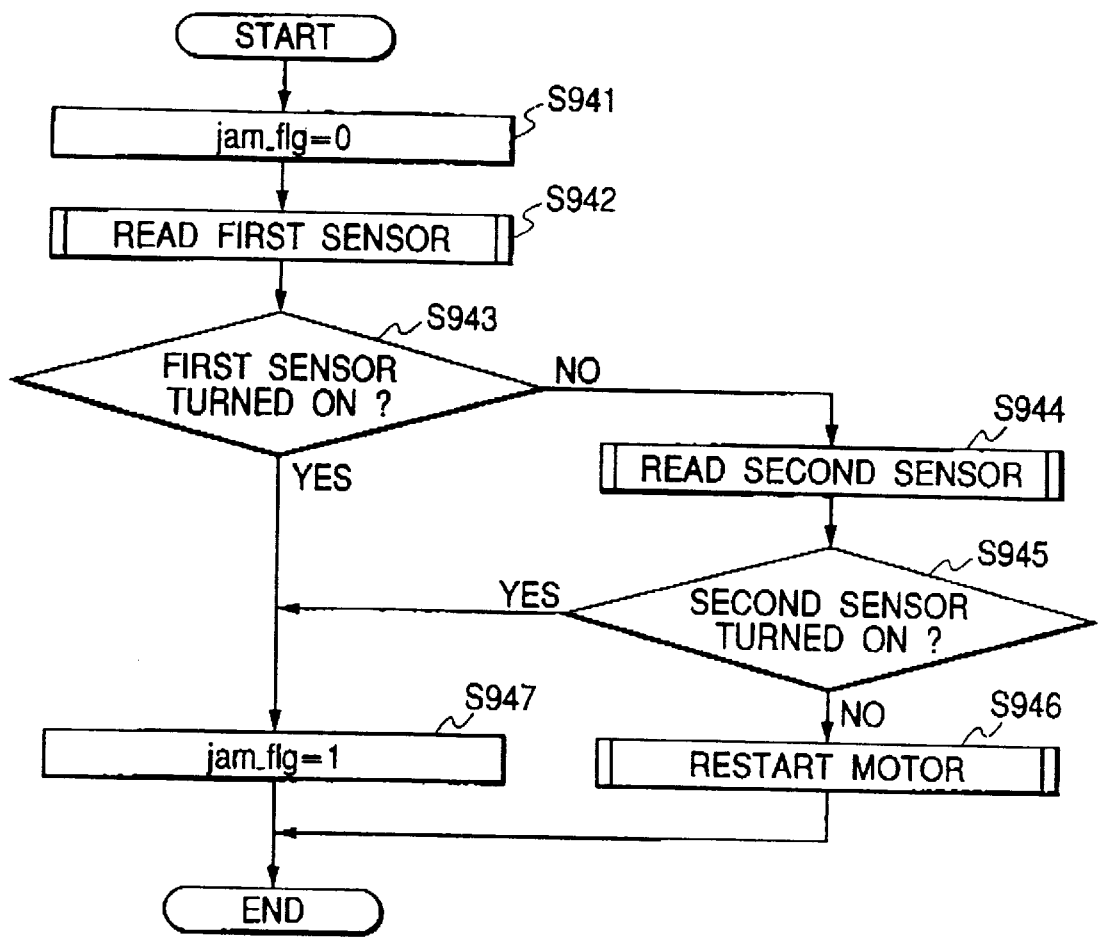
FIG. 30 is a flow chart showing a sequence of a sheet presence/absence detecting process for detecting presence/absence of the sheet.

Next, a process for detecting presence/absence of the paper in the sheet conveying apparatus will be explained with reference to FIG. 30. This process is called out when the paper is conveyed and it is judged that the loss of synchronism of the stepping motor 301 is generated in the step S930 of FIG. 29.

A variable "jam_flg" shows whether or not the jam is judged on the basis of the state of the sensor. When this process is started, the sequence goes to a step S941.

In the step S941, the variable jam_flg is set to 0, and the output signal of the photo-interrupter 604 associated with the first sheet detecting sensor is read, i.e., it is judged whether there is the paper on the first sheet detecting sensor 603. Thereafter, the sequence goes to a step S943.

In the step S943, on the basis of the state of the first sheet detecting sensor 603 in the previous step S942, the process is branched. That is to say, if there is the recording paper on the first sheet detecting sensor 603, since the paper has reached the position of the first sheet detecting sensor 603 and it is judged that the paper exists on the sheet conveying rollers 302, the process goes to a step S947. On the other hand, if there is no recording paper on the sheet detecting sensor 603, the sequence goes to a step S944.

In the step S944, the output signal of the photo-interrupter 606 associated with the second sheet detecting sensor 605 is read, i.e., it is judged whether there is the paper on the second sheet detecting sensor 605. Thereafter, the sequence goes to a step S945.

In the step S945, on the basis of the state of the second sheet detecting sensor 605 in the previous step S944, the process is branched. That is to say, if there is the recording paper on the second sheet detecting sensor 605, since the paper has reached the position of the second sheet detecting sensor 605 and it is judged that the paper exists on the sheet conveying rollers 302, the process goes to the step S947. On the other hand, if there is no recording paper on the sheet detecting sensor 605, the sequence goes to a step S946.

In the step S946, although the loss of synchronism of the stepping motor 301 is generated, since there is no paper on the sheet conveying rollers 302 driven by the stepping motor 301 not to cause the jam, a process for calling out a re-starting process for the stepping motor 301 is effected. After the step S946, the process is ended.

In the step S947, since the loss of synchronism of the stepping motor 301 is generated and there is the paper on the sheet conveying rollers 302 driven by the stepping motor 301, it is judged that the jam occurs. Accordingly, the variable jam_flg indicating the fact that the jam occurs is set to 1, and the process is ended.

Figure 31:
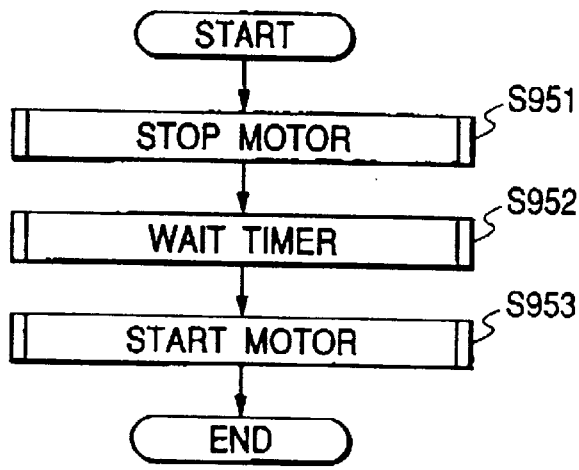
FIG. 31 is a flow chart for re-driving the stepping motor in the ninth embodiment.

Next, the re-starting process for the stepping motor in the sheet conveying apparatus will be explained with reference to FIG. 31. This process is called out in the step S946 when it is judged that the jam does not occur since there is no paper on the sheet conveying rollers 302 driven by the stepping motor 301 in which the loss of synchronism is generated, in the detecting process of presence/absence of paper in the sheet conveying apparatus explained in connection with FIG. 30.

In a step S951, supplying of the electrical current to the stepping motor 301 in which the loss of synchronism is generated is stopped. Thereafter, the sequence goes to a step S952. In the step S952, a timer wait process for waiting by a predetermined time period is effected in order to remove a counter electromotive force accumulated in the coil of the stepping motor 301 which was excited. After this process, the sequence goes to a step S953. In the step S953, a re-starting process for the stepping motor 301 is effected. After the stepping motor is started correctly, the process is ended.

As mentioned above, in the image forming apparatus according to the illustrated embodiment in which the stepping motor is used as the drive source for sheet conveyance, by the detection of the loss of synchronism effected by the motor driving apparatus incorporated into the image forming apparatus and the jam detection effected by the sensors disposed in front of the driving apparatus, it can be discriminated whether the jam is generated on the basis of the loss of synchronism of the stepping motor or not.

As mentioned above, since the motor controlling apparatus for driving the stepping motor incorporated into the image forming apparatus is provided with the loss of synchronism detecting means for measuring the electrical current increasing ratio of the electrical current supplied to the motor and for judging that the loss of synchronism of the stepping motor is generated if the electrical current increasing ratio exceeds the threshold value, detection of loss of synchronism can be effected only by the motor driving apparatus incorporated into the image forming apparatus.

On the other hand, the sheet conveying path includes at least the first sheet detecting sensor disposed in front of the sheet conveying rollers driven by the stepping motor and the second sheet detecting sensor disposed immediately behind the sheet conveying rollers, and, it is designed so that, if it is judged that the loss of synchronism of the stepping motor is generated on the basis of the change in the electrical current increasing ratio, it is observed whether there is the sheet on the respective sheet detecting sensors disposed in front of and behind the sheet conveying rollers in the sheet conveying path, and, if the paper is not detected by the sheet detecting sensors disposed in front of and behind the sheet conveying rollers, the supplying of the electrical current to the stepping motor is temporarily stopped and the stepping motor is re-started again.

With the arrangement as mentioned above, even if the loss of synchronism of the stepping motor is generated, so long as the paper does not exist on the sheet conveying rollers driven by the stepping motor in which the loss of synchronism is generated, it is possible to re-start the stepping motor before the paper reaches the sheet conveying rollers, thereby enhancing the operating efficiency since the copying process may not be stopped.

Further, in the image forming apparatus using the motor driving apparatus, there is provided a motor driving apparatus in which the loss of synchronism is generated if the electrical current increasing ratio exceeds the threshold value continuously by the predetermined number or more. With this arrangement, if the electrical current increasing ratio temporarily exceeds the threshold value for any reason other than the loss of synchronism of the stepping motor, this fact can be eliminated from the judgement of the loss of synchronism, thereby detecting the loss of synchronism with high accuracy.

While the present invention was explained with reference to several embodiments thereof, the present invention is not limited to such embodiments, but, various alterations and modifications can be made within the scope of the invention.

What is claimed is:

1. A stepping motor driving controlling apparatus for effecting driving by switching phase exciting of exciting electrical current supplied to an exciting coil of a stepping motor whenever a driving signal is applied to a motor drive circuit, comprising:

measuring means for measuring a change in the electrical current value flowing through the exciting coil of the stepping motor for a predetermined time period; and generating means for generating a signal of loss of synchronism when a measurement result of the change in the electrical current value measured by said measuring means during the predetermined time period exceeds a threshold value.

2. A stepping motor driving controlling apparatus according to claim 1, wherein the predetermined time period is a time period set by a timer, and said measuring means measures the change in the electrical current value at the time period intervals set by the timer.

3. A stepping motor driving controlling apparatus according to claim 2, wherein the time period set by the timer is set in a one phase exciting area of the stepping motor and within one phase exciting time.

4. A stepping motor driving controlling apparatus according to claim 2, wherein the time period set by the timer has a setting start time synchronous with rising-up of one phase exciting of the stepping motor, and the time period is set within one phase exciting time.

5. A stepping motor driving controlling apparatus according to claim 1, wherein the change in electrical current value measured by said measuring means is an increasing ratio of electrical current flowing through the exciting coil.

6. A stepping motor driving controlling apparatus according to claim 1, wherein supplying of the electrical current to said exciting coil of said motor is effected under constant electric current chopper control, and the change in electrical current value measured by the measuring means is chopping number of the electrical current within one phase exciting area of said motor.

7. A stepping motor driving controlling apparatus for effecting driving by switching phase exciting of exciting electrical current supplied to an exciting coil of a stepping motor whenever a driving signal is applied to a motor drive circuit, comprising:

measuring means for measuring a change in electrical current value flowing through the exciting coil in a one phase exciting area of the stepping motor for a predetermined time period set by a timer;

memory means for storing a measurement result of the change in the electrical current value obtained by measurement of said measuring means during the predetermined time period;

comparing means for comparing the measurement result stored in said memory means with a threshold value; and generating means for generating a signal of loss of synchronism when the stored measurement result is greater than the threshold value.

8. A stepping motor driving controlling apparatus according to claim 7, wherein the time period set by the timer starts synchronous with rising-up of one phase exciting of the stepping motor, and the time period is set within one phase exciting time.

9. A stepping motor driving controlling apparatus according to claim 7, wherein the change in the electrical current value measured by said measuring means is an increasing ratio of the electrical current flowing through the exciting coil.

10. A stepping motor driving controlling apparatus according to claim 7, wherein supplying of the electrical current to said exciting coil of said motor is effected under constant electric current chopper control, and the change in electrical current value measured by the measuring means is chopping number of the electrical current within one phase exciting area of said motor.

11. A stepping motor driving controlling apparatus for supplying electrical current to a stepping motor rotating by successively switching phases of the stepping motor under constant electrical current chopper control, comprising:

motor driving means for supplying the electrical current to the stepping motor under the constant electrical current chopper control;

measuring means for measuring the electrical current value flowing through the stepping motor in said motor driving means;

timer means for measuring a predetermined time;

control means for emitting a measurement command to said measuring means at predetermined time intervals previously set by said timer means and for reading an electrical current value obtained by measurement of said measuring means;

memory means for storing the electrical current value read by said control means;

calculating means for calculating an electrical current increasing ratio at the predetermined time intervals by using the electrical current value stored in said memory means;

comparing means for comparing the electrical current increasing ratio obtained by said calculating means with a threshold value; and generating means for generating a loss of synchronism signal when the electrical current increasing ratio is greater than the threshold value in said comparing means.

12. A stepping motor driving controlling apparatus for supplying electrical current to a stepping motor rotating by successively switching phases of the stepping motor under constant electrical current chopper control, comprising:

motor driving means for supplying the electrical current to the stepping motor under the constant electrical current chopper control;

measuring means for measuring the electrical current value flowing through the stepping motor in said motor driving means;

timer means for measuring a predetermined time;

control means for emitting a measurement command to said measuring means at predetermined time intervals previously set by said timer means and for reading an electrical current value obtained by measurement of said measuring means;

memory means for storing the electrical current value obtained by said control means;

calculating means for calculating an electrical current increasing ratio at the predetermined time intervals by using the electrical current value stored in said memory means;

first comparing means for comparing the electrical current increasing ratio obtained by said calculating means with a threshold value;

count means counting the number that the electrical current increasing ratio exceeds the threshold value continuously in said first comparing means;

second comparing means for comparing the number counted by said count means with a reference number; and generating means for generating a loss of synchronism signal when the number counted by said count means exceeds the reference number in said second comparing means.

13. A stepping motor driving controlling apparatus according to claim 1 or 2, further comprising means for storing and altering a drive setting parameter of said stepping motor.

14. A stepping motor driving controlling apparatus according to any one of claims 1 to 3, wherein control and detection of loss of synchronism of a plurality of motors can be effected.

15. A stepping motor driving controlling method for effecting driving by switching phase exciting of exciting electrical current supplied to an exciting coil of a stepping motor whenever a driving signal is applied to a motor drive circuit, comprising a measuring step of measuring a change in the electrical current value flowing through the exciting coil of the stepping motor for a predetermined time period; and a generating step of generating a signal of loss of synchronism when a measurement result of the change in electrical current value measured in said measuring step during the predetermined time period exceeds a threshold value.

16. A stepping motor driving controlling method according to claim 15, wherein said the predetermined time period is a time period set by a timer, and the change in electrical current value is measured at the time period intervals set by the timer.

17. A stepping motor driving controlling method according to claim 16, wherein the time period set by the timer is set in a one phase exciting area of the stepping motor and within one phase exciting time.

18. A stepping motor driving controlling method according to claim 16, wherein the time period set by the timer starts synchronous with rising-up of one phase exciting of the stepping motor, and the time period is set within one phase exciting time.

19. A stepping motor driving controlling apparatus according to claim 15, wherein the change in the electrical current value measured in said measuring step is an increasing ratio of electrical current flowing through the exciting coil.

20. A stepping motor driving controlling method for effecting driving by switching phase exciting of exciting electrical current supplied to an exciting coil of a stepping motor whenever a driving signal is applied to a motor drive circuit, comprising:

a measuring step of measuring a change in an electrical current value flowing through the exciting coil in a one phase exciting area of the stepping motor for a predetermined time period set by a timer;

a storing step of storing a measurement result of the change in the electrical current value obtained in said measuring step during the predetermined time period;

a comparing step of comparing the measurement result stored in said storing step with a threshold value; and a generating step of generating a signal of loss of synchronism when the stored measurement result is greater than the threshold value.

21. A stepping motor driving controlling method according to claim 20, wherein the time period set by the timer starts synchronous with rising-up of one phase exciting of the stepping motor, and the time period is set within one phase exciting time.

22. A stepping motor driving controlling method according to claim 20, wherein the change in the electrical current value measured in said measuring step is an increasing ratio of electrical current flowing through the exciting coil.

23. A stepping motor driving controlling method for supplying electrical current to a stepping motor rotating by successively switching phases of the stepping motor under constant electrical current chopper control, comprising:

a supplying step of supplying the electrical current to the stepping motor under the constant electrical current chopper control;

a measuring step of measuring the electrical current value flowing through the stepping motor;

an emitting step of emitting a measurement command at predetermined time intervals;

a reading step of reading an electrical current value measured in accordance with the measurement command in said measuring step;

a storing step of storing the electrical current value read in said reading step;

a calculating step of calculating an electrical current increasing ratio at the predetermined time intervals by using the electrical current value stored in said storing step;

a comparing step of comparing the electrical current increasing ratio obtained in said calculating step with a threshold value; and a generating step of generating a loss of synchronism signal when the electrical current increasing ratio is greater than threshold value in said comparing step.

24. A stepping motor driving controlling method for supplying electrical current to a stepping motor rotating by successively switching phases of the stepping motor under constant electrical current chopper control, comprising:

a supplying step of supplying the electrical current to the stepping motor under the constant electrical current chopper control;

a measuring step of measuring the electrical current value flowing through the stepping motor;

an emitting step of a measurement command at predetermined time intervals;

a reading step of reading an electrical current value measured in accordance with the measurement command emitted in said emitting step;

a calculating step of calculating an electrical current increasing ratio at the predetermined time intervals by using the electrical current value stored in said storing step;

a first comparing step of comparing the electrical current increasing ratio obtained in said calculating step with a threshold value;

a counting step of counting the number that the electrical current increasing ratio exceeds the threshold value continuously in said first comparing step;

a second comparing step of comparing the number counted in said counting step with a reference number; and a generating step of generating a loss of synchronism signal when the number counted in said counting step exceeds the reference number in said second comparing step.

* * * * *

UNITED STATES PATENT AND TRADEMARK OFFICE
CERTIFICATE OF CORRECTION

PATENT NO. : 6,476,578 B2
DATED : November 5, 2002
INVENTOR(S) : Tomoyasu Yoshikawa et al.

It is certified that error appears in the above-identified patent and that said Letters Patent is hereby corrected as shown below:

Title page,
Item [57], ABSTRACT,
Line 1, "synchronis" should read -- synchronism --.

Column 4,
Line 27, "an Image" should read -- an image --.
Line 31, "coil" should read -- coil. --.
Line 62, "drawings" should read -- drawings. --.

Column 7,
Line 9, "Is" should read -- is --.
Line 64, "iuotor" should read -- motor --.

Column 8,
Line 40, "before from" should read -- before dT from --.

Column 9,
Line 9, "Is" should read -- is --.
Line 39, "the" (3$^{rd}$ occurrence) should be deleted.
Line 48, "step 516." should read -- step S16. --.

Column 10,
Line 4, "Judged" should read -- judged --.

Column 11,
Line 55, "detected" should read -- detected. --.

Column 13,
Line 23, "as the those" should read -- as those --.

Column 14,
Line 8, "a" should be deleted.
Line 57, "AID" should read -- A/D --.
Line 61, "S67;" should read -- S67, --.
Line 62, "it" should read -- It --.

Column 15,
Line 56, "synchronism" should read -- synchronism. --.

Column 19,
Line 6, "says" should read -- say, --.

UNITED STATES PATENT AND TRADEMARK OFFICE
CERTIFICATE OF CORRECTION

PATENT NO. : 6,476,578 B2
DATED : November 5, 2002
INVENTOR(S) : Tomoyasu Yoshikawa et al.

It is certified that error appears in the above-identified patent and that said Letters Patent is hereby corrected as shown below:

Column 21,
Line 7, "tn the step" should read -- in the step --; and "variable it," should read -- Variable It, --.
Line 16, "effected" should read -- effected. --.
Line 40, "the then," should read -- then, the --.

Column 22,
Line 4, "Judging" should read -- judging --.
Line 10, "S10," should read -- S100, --.
Line 13, "301" should read -- 301. --.
Line 17, "FIG. 16" should read -- FIG. 16. --.
Line 22, "described" should read -- be described --.

Column 23,
Line 5, "sequence to" should read -- sequence goes to --.

Column 24,
Line 38, "times" should read -- time --.
Line 39, "different times in" should read -- differ --.

Column 27,
Line 49, "CUT1." should read -- CNT1. --.

Column 28,
Line 49, "Judged" should read -- judged --.

Column 29,
Line 56, "started" should read -- started. --.

Column 30,
Line 21, "In" should read -- in --.
Line 35, "S808," should read -- S802, --.
Line 46, "fig, the" should read -- flg, the --.
Line 50, "303" should read -- 303. --.

Column 32,
Line 39, "It is" should read -- it is --.

Column 33,
Line 9, "motor" should read -- motor. --.

UNITED STATES PATENT AND TRADEMARK OFFICE
CERTIFICATE OF CORRECTION

PATENT NO. : 6,476,578 B2
DATED : November 5, 2002
INVENTOR(S) : Tomoyasu Yoshikawa et al.

It is certified that error appears in the above-identified patent and that said Letters Patent is hereby corrected as shown below:

Column 39,
Line 35, "comprising" should read -- comprising: --.

Signed and Sealed this

Thirteenth Day of May, 2003

JAMES E. ROGAN
*Director of the United States Patent and Trademark Office*